United States Patent [19]
Sano et al.

[11] Patent Number: 5,587,985
[45] Date of Patent: Dec. 24, 1996

[54] SIGNAL PROCESSING DEVICE FOR AN OPTICAL INFORMATION REPRODUCING APPARATUS

[75] Inventors: Kousei Sano, Neyagawa; Shin-ichi Kadowaki, Hirakata, both of Japan

[73] Assignee: Matsushita Electric Industrial Co., Ltd., Osaka, Japan

[21] Appl. No.: 533,527

[22] Filed: Sep. 25, 1995

Related U.S. Application Data

[62] Division of Ser. No. 207,859, Mar. 8, 1994.

[30] Foreign Application Priority Data

Mar. 9, 1993 [JP] Japan ................................. 5-47701
Mar. 10, 1993 [JP] Japan ................................. 5-48917
Apr. 2, 1993 [JP] Japan ................................. 5-76636

[51] Int. Cl.⁶ ............................................. G11B 7/00
[52] U.S. Cl. ......................... 369/124; 369/121; 369/54; 369/44.32; 369/44.34; 369/44.25; 369/109
[58] Field of Search ...................... 369/121, 124, 369/48, 54, 58, 59, 32, 109, 44.25, 44.27, 44.36, 44.37, 44.38, 44.32

[56] References Cited

U.S. PATENT DOCUMENTS

| | | | |
|---|---|---|---|
| 4,547,872 | 10/1985 | Henmi et al. | 369/121 |
| 4,742,505 | 5/1988 | Takeuchi et al. | 369/121 |
| 4,933,925 | 6/1990 | Yamaguchi et al. | 369/44.27 |
| 5,070,495 | 12/1991 | Bletscher, Jr. et al. | 364/116 |
| 5,166,914 | 11/1992 | Shimada et al. | 369/48 |
| 5,181,161 | 1/1993 | Hirose et al. | 369/48 |
| 5,339,302 | 8/1994 | Takahashi et al. | 369/54 |
| 5,361,247 | 11/1994 | Fuji et al. | 369/48 |
| 5,442,618 | 8/1995 | Dewey et al. | 369/124 |

FOREIGN PATENT DOCUMENTS

| | | |
|---|---|---|
| 57-58248 | 4/1982 | Japan . |
| 59-8104 | 1/1984 | Japan . |
| 60-69842 | 4/1985 | Japan . |
| 61-131245 | 6/1986 | Japan . |
| 2-199676 | 8/1990 | Japan . |
| 2-257474 | 10/1990 | Japan . |
| 2-282937 | 11/1990 | Japan . |
| 3-178040 | 8/1991 | Japan . |
| 4-19836 | 1/1992 | Japan . |
| 4-89661 | 3/1992 | Japan . |

OTHER PUBLICATIONS

K. Kayanuma et al., "High Track Density Magneto–Optical Recording Using a Crosstalk Canceler", *SPIE, vol. 1316 Optical/Data Storage (1990)*, pp. 35–39.

*Primary Examiner*—Loha Ben
*Attorney, Agent, or Firm*—Ratner & Prestia

[57] ABSTRACT

A signal processing device used for an apparatus capable of optically reproducing information from a recording medium is disclosed. In the signal processing device, a signal including information recorded at positions adjacent to a prescribed position is multiplied by k. The multiplied signal is subtracted from a signal mainly including information recorded at the prescribed position. In the signal processing device, the coefficient k is adjusted as follows. In one case, the coefficient k is varied depending on the signal strength. In another case, the processed signals are held at appropriate timings and a signal used as an index is obtained from two or more such signals. The coefficient k is optimized based on the index. In yet another case, the coefficient k is periodically varied in a synchronous manner with the fundamental period of the information recorded on the recording medium.

29 Claims, 37 Drawing Sheets

FIG. 37(a)
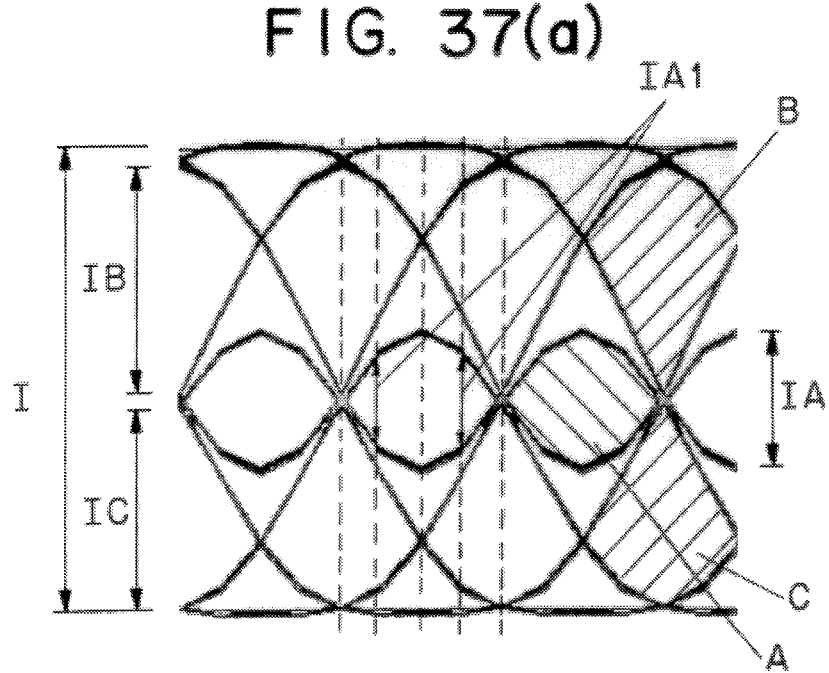
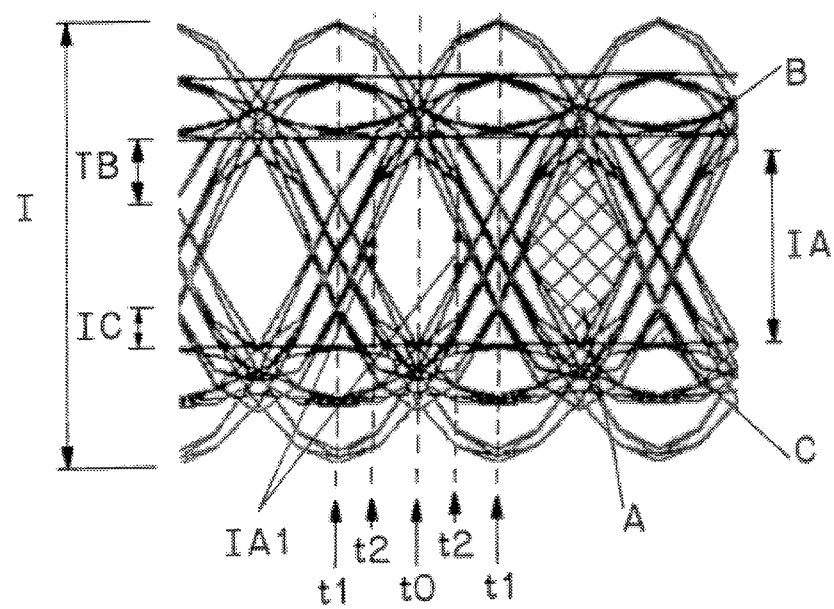
FIG. 37(b)

1

SIGNAL PROCESSING DEVICE FOR AN OPTICAL INFORMATION REPRODUCING APPARATUS

This application is a division of application Ser. No. 08/207,859, filed Mar. 8, 1994, (status: pending).

BACKGROUND OF THE INVENTION

1. Field of the Invention

The present invention relates to a signal processor for processing signals which are reproduced in an information input/output apparatus for optically recording and reproducing information.

2. Description of the Related Art

Japanese Laid-Open Patent Publication No. 57-58248 discloses a method for reducing crosstalk. In the disclosed method, three tracks which are adjacent to each other on an information recording medium are simultaneously irradiated with light beams. Signals from the tracks on both sides of the center track are multiplied by a predetermined coefficient and then subtracted from the signal from the center track. Accordingly the crosstalk can be reduced, However, the publication fails to mention how the coefficient is actually converged, In Japanese Laid-Open Patent Publication No. 59-8104, a method of perturbation is shown as a method for adjusting how the signals from the tracks on both sides of the center track are subtracted from the signal from the center track. In the method of perturbation, a small amount of crosstalk is forcedly generated, and a phase of level variation of the crosstalk is detected, whereby an optimum point is obtained. However, in the method of perturbation, some slight amount of crosstalk inevitably remains in principle, and an oscillator is essentially required.

In Japanese Laid-Open Patent Publication No. 2-257474, a least-mean-square (LMS) error method is used for determining a coefficient considering the distortionless condition of the intersymbol interference in accordance with the employed modulation system. Specifically, a coefficient is determined by the LMS method so that the Nyquist's first criterion is satisfied.

In Japanese Laid-Open Patent Publication No. 2-281423, the error signal power is minimized by using a recording signal as a reference signal. However, according to this method, the recording signal to be recorded on the information recording medium is compared witch a signal reproduced therefrom, So that it is impossible to reproduce information from a read-only information recording medium.

In Japanese Laid-Open Patent Publication No. 3-40225, the error signal power is minimized by comparing a preamble signal with a reference signal. In the case where the preamble signal is recorded on he information recording medium, the storage capacity of the information recording medium is reduced. Moreover, information cannot be reproduced from an information recording medium on which such a preamble signal is not recorded.

None of the above publications describes how a coefficient is determined so as to minimize the crosstalk occurring in an information recording medium. In addition, in the conventional case where a coefficient used in the crosstalk reducing device is constant, the crosstalk cannot be sufficiently reduced when information is to be reproduced from a recording medium having a small track pitch. Furthermore, in the conventional case where a coefficient used in an equalizer for reducing the intersymbol interference is constant, there exists no coefficient which can suppress the edge shift and can increase the noise margin.

SUMMARY OF THE INVENTION

The apparatus capable of optically reproducing information from e recording medium of this invention, includes: an optical pickup head for outputting a first signal mainly including information recorded at a desired position and a second signal including information recorded at positions adjacent to the desired position, when information is to be reproduced by a light beam from the recording medium having tracks in which the information are recorded; an operation circuit for receiving the first and second signals and for performing an adding or subtracting operation; a variable gain amplifier for controlling the level or polarity of the first or second signal which is input into the operation circuit; and a signal processing means for receiving the first signal of a signal output from the operation circuit end for outputting a signal for adjusting a gain of the variable gain amplifier.

According to another aspect of the invention, the apparatus capable of optically reproducing information from a recording medium, includes: an optical pickup head for outputting a first signal mainly including information recorded at a desired position and a second signal including information recorded at positions adjacent to the desired position, when information is to be reproduced by a light beam from the recording medium having tracks in which the information is recorded by digitally and selectively forming optically readable marks having discrete lengths substantially corresponding to integer multiples of T, where T is a fundamental period of the marks; an operation circuit for receiving the first and second signals and for performing an adding or subtracting operation; a variable gain amplifier for controlling the level or polarity of the first or second signal which is input into the operation circuit; a clock signal generator for generating a clock signal indicating a timing which is synchronized with edges of digital information recorded as marks or spaces on the recording medium; a sample and hold circuit for repeatedly sampling and holding a signal output from the operation circuit the timing indicated by the clock signal; and a signal processing means for receiving a signal output from the sample and hold circuit and for adjusting a gain of variable gain amplifier based on two or more signals at a signal detection point which is a position indicated by the clock signal.

According to another aspect of the invention, the apparatus capable of optically reproducing information from a recording medium, includes: an optical pickup head in which, when information is to be reproduced by a light beam from the recording medium having tracks in which the information are recorded by digitally and selectively forming optically readable marks having discrete lengths substantially corresponding to integer multiples of T, where T is a fundamental period of the marks, a desired position on a series of tracks on the recording medium is defined as a first position, and at least one position located apart from the first position by any integer multiple of T is defined as second position group, the integer excluding 0, optical pickup head optically and simultaneously reading the first position and the second position group while moving relative to the recording medium, and the optical pickup head outputting a main signal mainly including information recorded at the first position and an adjacent signal group including information recorded at the second position group; a first signal processor for outputting a signal represented by:

$$S(0)-k_1 \cdot S(n_1 \cdot T)-k_2 \cdot S(n_2 \cdot T) \ldots k_N \cdot S(n_N \cdot T)$$

where N is an arbitrary natural number, and i is an integer equal to or smaller than N, where if it is assumed that $k_i$ is a real number larger, than 0 and equal to or smaller than 1, the ith variable gain amplifier includes a group of N variable gain amplifiers which outputs signals obtained by multiplying the input signal by $k_i$, and an operation circuit which performs an adding or subtracting operation for two or more signals, where the main signal mainly including the information recorded at the first position is represented by S(0), and a signal including the information recorded at a position located apart from the first position by x is represented by S(x), and where $n_1$ to $n_N$ are integers excluding 0 which are not over-lapped, and the adjacent signal groups including the information recorded at the second position group are represented by $S(n_1 \cdot T)$ $S(n_2 \cdot T), \ldots, S(n_N \cdot T)$; a clock signal generator for generating and outputting a clock signal which is synchronized with the information recorded on the recording medium; and a second signal processor for, in response to the clock signal, periodically varying the coefficient in a synchronous manner with the information recorded on the recording medium.

According to another aspect of the invention, the apparatus capable of optically reading information recorded at a desired position on a recording medium, includes: optical pickup means for converging light on the recording medium and for generating a first signal and a second signal based on an intensity of the light reflected from the recording medium, the first signal mainly including a component representing information recorded at the desired position, the second signal including information recorded at positions adjacent to the desired position; and signal processing means for removing information other than the information recorded at the desired position from the first signal by using the second signal, wherein the signal processing means includes means for subtracting a product of the second signal and a predetermined coefficient from the first signal and means for adjusting the predetermined coefficient depending on the ratio of the information recorded at the desired position included in the first signal to the other information included in the first signal.

Thus, the invention described herein makes possible the advantages of (1) providing a crosstalk reducing device as a signal processor used in an optical information reproducing apparatus which reproduces information from an information recording medium with a reduced crosstalk occurring in the reproduction and at a low error rate, (2) providing a crosstalk reducing device capable of determining a coefficient used therein, even when a preamble signal is not recorded on an information recording medium, and (3) providing an equalizer as a signal processor used in an optical information reproducing apparatus which reproduces information from an information recording medium with reduced crosstalk occurring in the reproduction and at a low error rate.

These and other advantages of the present invention will become apparent to those skilled in the art upon reading and understanding the following detailed description with reference to the accompanying figures.

BRIEF DESCRIPTION OF THE DRAWINGS

FIG. 35 shows the eye pattern obtained by using the equalizer in the twelfth example of the invention.

FIGS. 37A and 37B show the eye patterns obtained by using conventional equalizers.

DESCRIPTION OF THE PREFERRED EMBODIMENTS

Hereinafter, examples of optical information reproducing apparatus according to the invention will be described in detail with reference to FIGS. 1 through 45.

In the first to third example, a coefficient used in a crosstalk reducing device is varied depending on the recorded signal.

Figure 1:
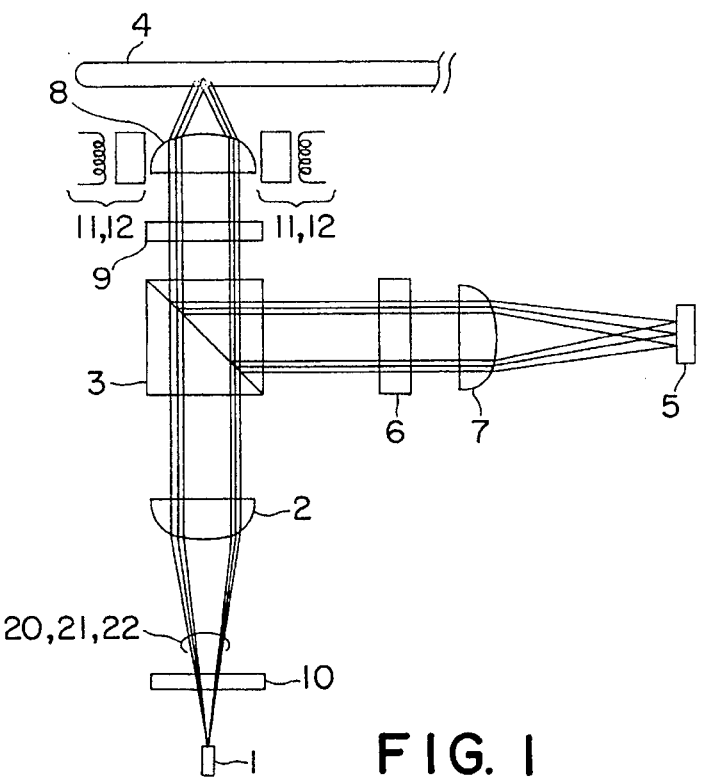
FIG. 1 shows the construction of an optical system of an optical information reproducing apparatus in a first example of the invention.

In the first example of the invention, in a crosstalk reducing device of the optical information reproducing apparatus which uses three beams, a coefficient used in the crosstalk reducing device is varied as a linear function of a read-cut signal. FIG. 1 shows the construction of an optical system of the optical information reproducing apparatus. The construction of the optical system is well known. For example, the construction in which three beams are produced from three laser diodes is disclosed in Japanese Laid-Open Patent Publication No. 57-58248, and the construction in which three beams are produced by using one laser diode and one diffraction grating is disclosed in Japanese Laid-Open Patent Publication No. 60-69842.

As is shown in FIG. 1, the optical system is designed in the following manner. A divergent beam including linearly polarized light which is emitted from a laser diode 1 is transmitted through a diffraction grating 10, so as to be three beams, i.e., a 0th order diffracted beam 20 and plus and minus first order diffracted beams 21, 22. The three beams 20–22 are transmitted through collimator lens 2, so as to be parallel beams. Then, the three beams are transmitted through a polarizing beam splitter 3 and a quarter-wave plate 9, so as to be circularly polarized light beams. The three beams 20–22 of circularly polarized light are transmitted through an object lens 8 and then converged on an information recording medium 4. On the information recording medium 4, information is recorded as marks or spaces, and the marks or spaces constitute tracks. The beams 20–22 which are converged by a lens 8 form spots on the respective tracks. The beams 20–22 which are reflected from and diffracted by the information recording medium 4 are again transmitted through the lens 8, and then transmitted through the quarter-wave plate 9, so as to be linearly polarized light beams which have a polarizing direction different from that of the beams emitted from the light source (laser diode) 1 by 90 degrees. The linearly polarized light beams 20–22 enter the polarizing beam splitter 3. The beams 20–22 which enter the polarizing beam splitter 3 are reflected and directed to a cylindrical lens 6. The beams 20–22 are transmitted through the cylindrical lens 6, so as to be astigmatic beams. Then, the beams 20–22 are converged by a lens 7 and received by a photodetector 5.

Figure 2:
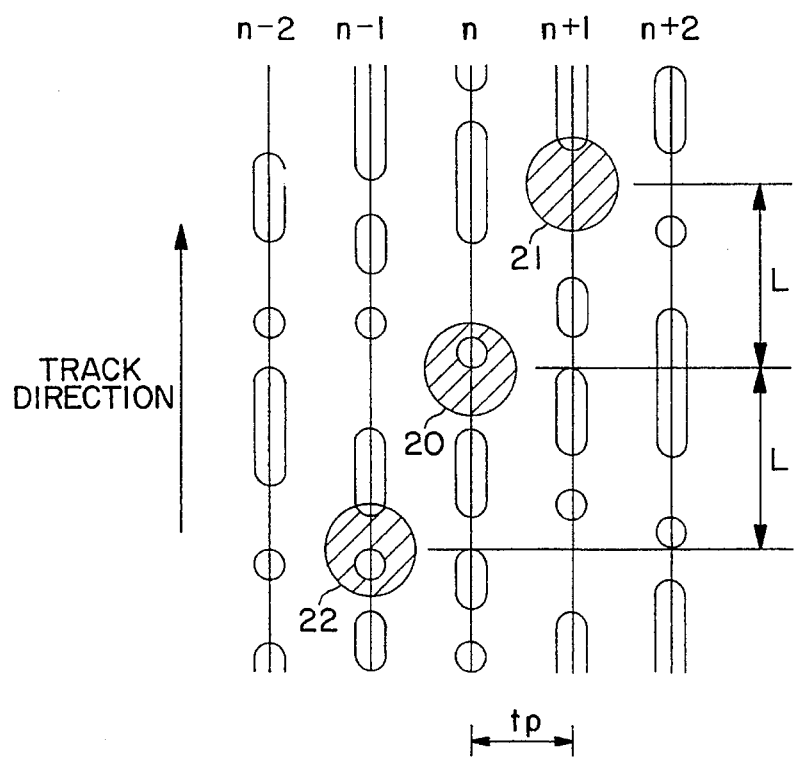
FIG. 2 shows the relationship between the tracks and light beams on an information recording medium in the first example of the invention.

FIG. 2 shows the relationship between the tracks and the beams 20–22 on the information recording medium 4. In FIG. 2, the information recording medium 4 is shown in an enlarged manner. The respective tracks are indicated by n−2, n−1, n, n+1, and n+2. In the tracks, information is recorded as marks or spaces. The information recorded in a desired track on the information recording medium 4 is read by using the beam 20. In the case shown in FIG. 2, the information recorded in the track n is read. Herein, n is a positive integer which is equal to or smaller than the number of tracks. When the beam 20 is located on the endmost track, there may occur a case where the beam 21 or 22 is not located on any track. As the track pitch tp is decreased, in addition to the information recorded in the track n, the information recorded in the adjacent tracks n–1 and n+1 is simultaneously read by using the beam 20. This causes crosstalk and hence the signal quality during the reading of the information recorded in the track n by the beam 20 is deteriorated. The beams 21 and 22 are located on the tracks n–1 and n+1, respectively, so that the information recorded thereon is read out. In order that different photodetective portions receive the beams 20–22, respectively, with the simple optical system shown in FIG. 1, the beam spots 20–22 are separated from each other by a distance L along the track direction.

Figure 3:
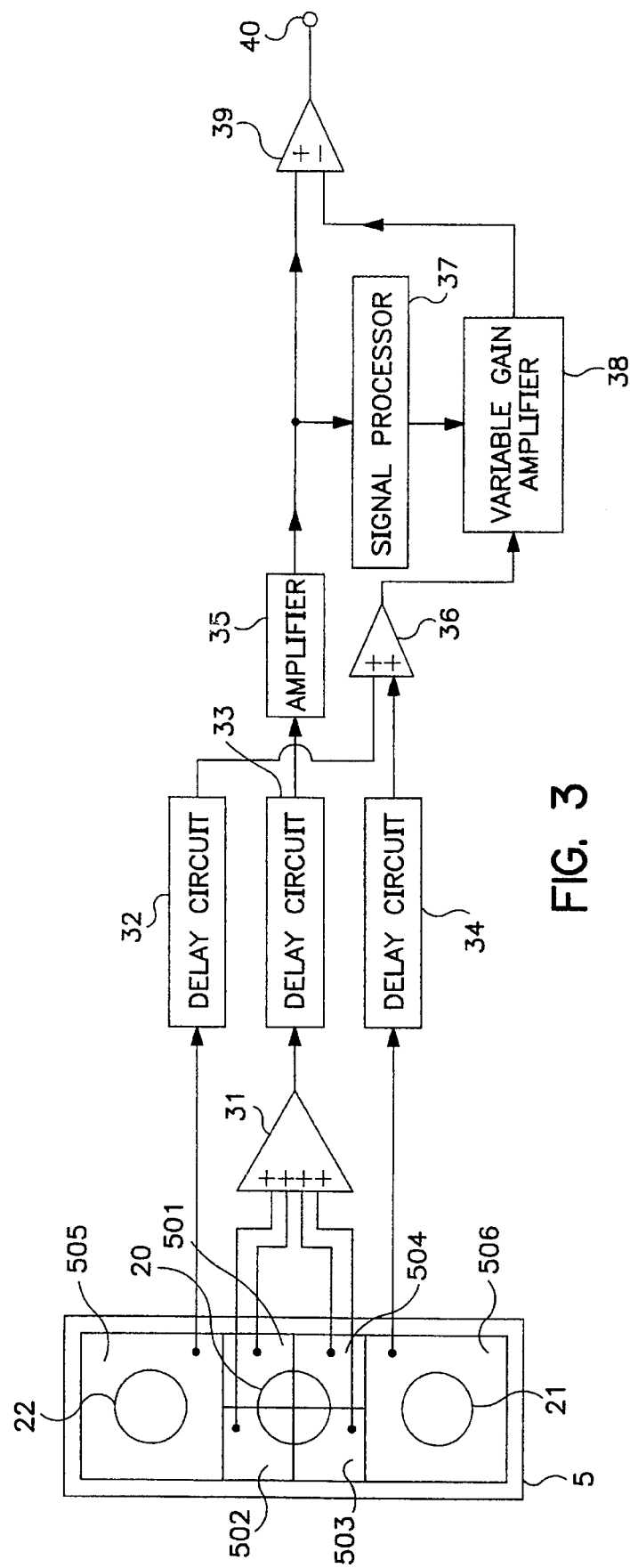
FIG. 3 shows the construction of an electric circuit system of the crosstalk reducing device in the first example of the invention.

FIG. 3 shows the relationship between the photodetector 5 and the beams 20–22 received by the photodetector 5 in the optical system shown in FIG. 1. FIG. 3 also shows the construction of an electric circuit system of the crosstalk reducing device. The photodetector 5 consists of photodetective portions 501–506. The beam 20 is received by the photodetective portions 501–504, the beam 21 is received by the photodetective portion 505, and the beam 22 is received by the photodetective portion 506. By performing the desired operations to the signals output from the photodetective portions 501–504, a focusing error signal and a tracking error signal are obtained. Herein, the focusing error signal is obtained by an astigmatic method and the tracking error signal is obtained by a push-pull method. Detailed descriptions of operation circuits for obtaining the focusing error signal and the tracking error signal are omitted so as not to obscure the description of the present invention with unnecessary detail. The focusing error signal is obtained by performing a differential operation between the sum of signals output from the photodetective portions 501 and 503 and the sum of signals output from the photodetective portions 502 and 504.

The tracking error signal is obtained by performing a differential operation between the sum of signals output from the photodetective portions 501 and 502 and the sum of signals output from the photodetective portions 503 and 504. The focusing error signal and the tracking error signal are supplied to actuators 11 and 12 shown in FIG. 1, respectively, so as to perform the focusing control and the tracking control.

The information recorded in the desired track n on the information recording medium 4 is obtained by adding the signals output from the photodetective portions 501–504 in an adder 31 as shown in FIG. 3. The information from the adjacent tracks n–1 and n+1 is obtained by the signals output from the photodetective portions 505 and 506.

The signals output from the photodetective portion 505, the adder 31 and the photodetective portion 506 are input into delay circuits 32–34, respectively. The delay circuits 32–34 correct time delays of information due to the beam spots 20–22 on the information recording medium 4 being separated from each other by a distance L along the track direction. As is disclosed in Japanese Laid-Open Patent Publication No. 61-287056, in an arrangement where the spot of a beam for reading information recorded in a desired track and the spots of beams for reading information recorded in the adjacent tracks have no distance therebetween along the track direction, the delay circuits 32–34 are not required. The signal output from the delay circuit 33 mainly includes the information recorded in the desired track. An amplifier 35 amplifies the signal output from the delay circuit 33. The amplified signal is input into a signal processor 37 and a subtracter 39. The signal processor 37 receives the signal output from the amplifier 35 and outputs a control signal which controls the gain of a variable gain amplifier 38. The signals output from the delay circuits 32 and 34 include the information recorded in the tracks adjacent to the desired track, respectively. The adder 36 adds the signals output from the delay circuits 32 and 34. The variable gain amplifier 38 in which the gain thereof can be adjusted from a positive to a negative one amplifies the signal output from the adder 36. The subtracter 39 subtracts the output signal of the variable gain amplifier 38 from the output signal of the amplifier 35, and outputs the signal indicating the obtained difference. The output signal of the subtracter 39 is output to a terminal 40.

In the case where a disk is used for the information recording medium 4, an axis which supports the center of the disk is rotated by means of a motor. The signal output from the terminal 40 is input into a control circuit which outputs a signal. By the signal output from the control circuit, the motor is controlled. In the case where the information recorded on the information recording medium 4 is an FM-modulated video signal, the signal output from the terminal 40 is demodulated by a demodulator, so as to be a composite signal which is then input into video equipment. In another case where the information recorded on the information recording medium 4 is a digital voice signal, the signal output from the terminal 40 is decoded by a decoder. The decoded signal is input into an error correction circuit which corrects any errors in the decoded signal. Then, the decoded signal is input into a digital-analog converter. The analog signal output from the digital-analog converter is amplified by an amplifier, and then fed into a loud speaker as a voice signal.

Figure 4:
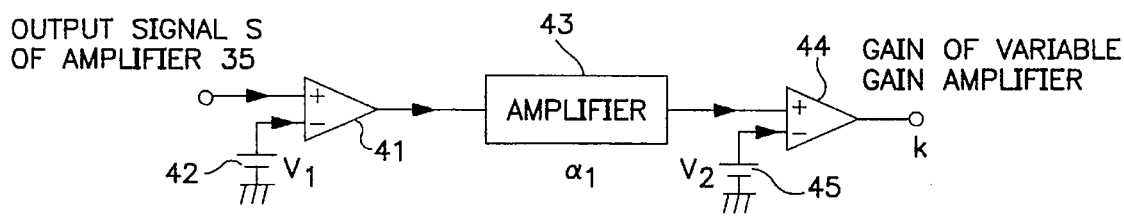
FIG. 4 shows the construction of a signal processor in the crosstalk reducing device in the first example of the invention.

In this example, the signal processor 37 controls the gain of the variable gain amplifier 38 so that the gain varies as a linear function of the signal obtained from the amplifier 35. FIG. 4 shows specific and exemplary circuitry of the signal processor 37 in this example. The signal amplified by the amplifier 35 is input into a subtracter 41. The subtracter 41 subtracts a voltage v1 produced by a constant voltage source 42 from the output signal of the amplifier 35, and outputs a signal indicating the obtained difference. The output signal of the subtracter 41 is amplified by $\alpha 1$ in an amplifier 43. The output signal of the amplifier 43 is input into a subtracter 44. The subtracter 44 subtracts a voltage v2 produced by a constant voltage source 45 from the output signal of the amplifier 43, and outputs a signal indicating the obtained difference. The output signal of the subtracter 44 indicates a gain of the variable gain amplifier 38.

Figure 5:
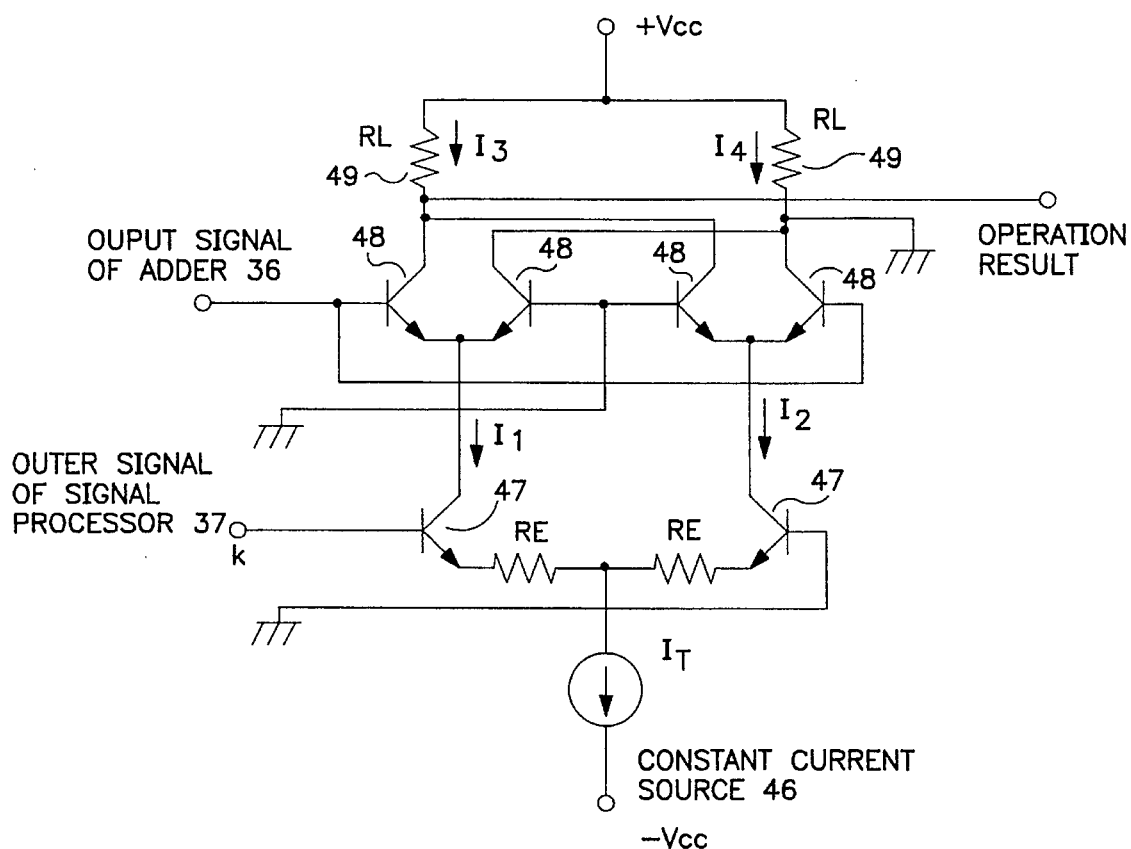
FIG. 5 shows the construction of a variable gain amplifier in the crosstalk reducing device in the first example of the invention.

FIG. 5 shows specific and exemplary circuitry of the variable gain amplifier 38 in this example. The circuit is known as a balanced modulator. The variable gain amplifier 38 multiplies the output signal of the adder 36 by the signal indicating the gain output from the signal processor 37, and outputs the multiplication result. The output signal k of the signal processor 37 is input into two transistors 47 and divides the current $I_T$ flowing to a constant current source 46 into a current $I_1$ and a current $I_2$, respectively. The output signal of the adder 36 is input into four transistors 48 and divides the currents $I_1$ and $_2$ into a current $I_3$ and a current $I_4$. Voltage drops in the currents $I_3$ and $I_4$ occur due resistances $R_L$, respectively, and the difference between the voltage drops is output as the operation result.

Figure 6:
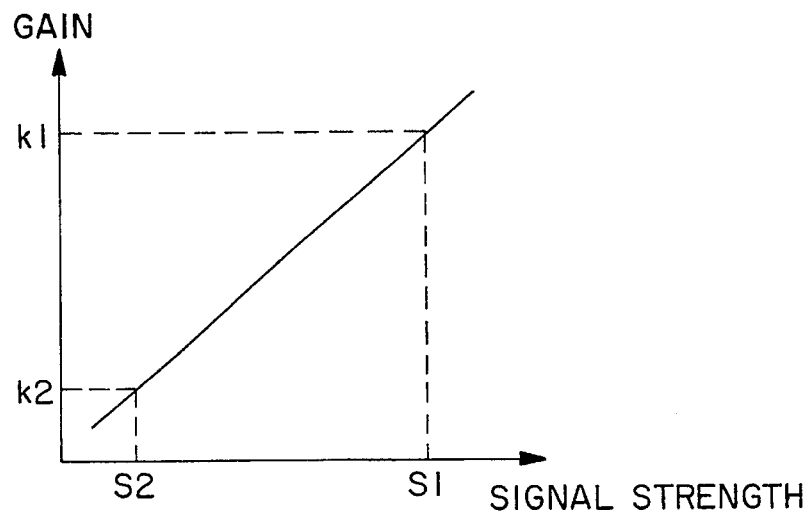
FIG. 6 shows the relationship between a gain of the variable gain amplifier and the strength of a signal input into the signal processor which controls the gain in the first example of the invention.

FIG. 6 shows the variation of the gain of the variable gain amplifier 38 as a linear function of the strength of the output signal of the amplifier 35. In FIG. 6, the horizontal axis indicates the strength of the signal output from the amplifier 35, and the vertical axis indicates the gain of the variable gain amplifier 38. In FIG. 6, S1 is the signal strength in the case where spaces are successively recorded in the desired track n, and k1 is the gain determined by the crosstalk from the adjacent tracks in the case. In FIG. 6, S2 is the signal strength in the case where marks are successively recorded in the same track n, and k2 is the gain determined by the crosstalk from the adjacent tracks in the case. In order to realize the above, the voltage v1 produced by the constant voltage source 42 is set to be S2, and the voltage v2 produced by the constant voltage source 45 is set to be −k2. In addition, the gain al of the amplifier 43 is set to be (k1−k2)/(S1−S2).

Figure 7A:
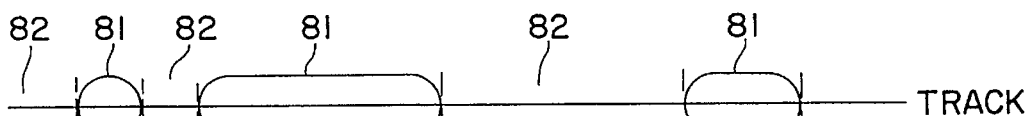
FIG. 7 shows the relationship among information recorded on the information recording medium (a), the strength of a signal input into the signal processor which controls a gain (b), and the gain of the variable gain amplifier (c) in the first example of the invention.
Figure 7B:
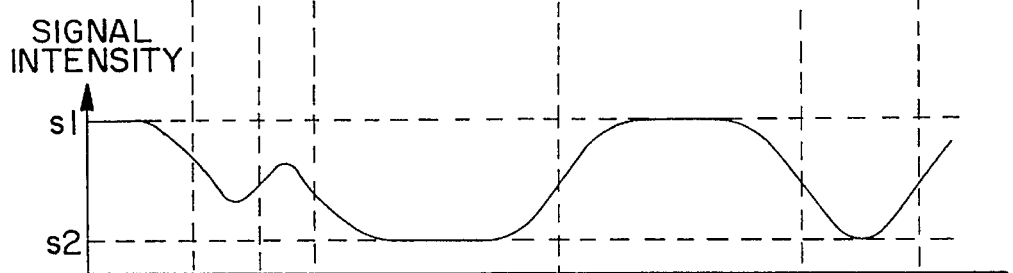
Figure 7C:
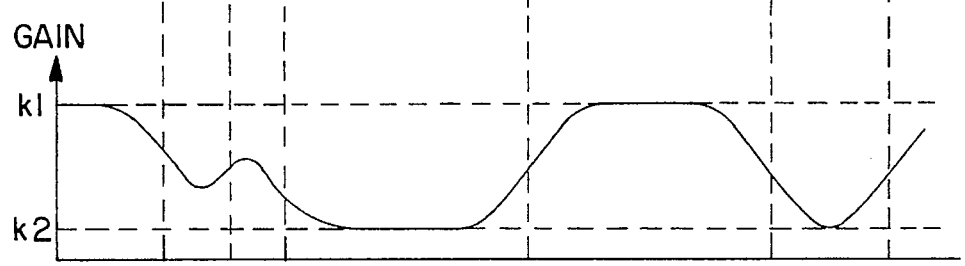

FIG. 7 shows the relationship among (a) a mark 81 and a space 82 located on the desired track n, (b) the signal output from the amplifier 35 when the light beam 20 moves on the track n, and (c) the gain of the variable gain amplifier 38 at this time. The symbols S1, S2, k1, and k2 are the same as those shown in FIG. 6. By controlling the gain of the variable gain amplifier 38 in the crosstalk reducing device of the present invention, the same effects can be attained as those attained by changing the coefficient in a conventional crosstalk reducing device.

Figure 8:
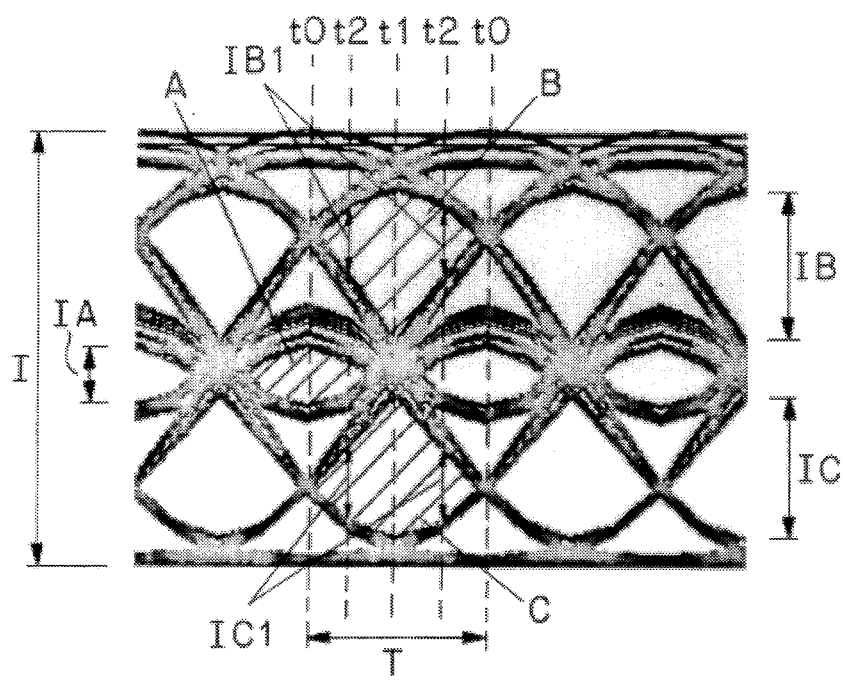
FIG. 8 shows the eye pattern obtained by using the crosstalk reducing device in the first example of the invention.
Figure 9:
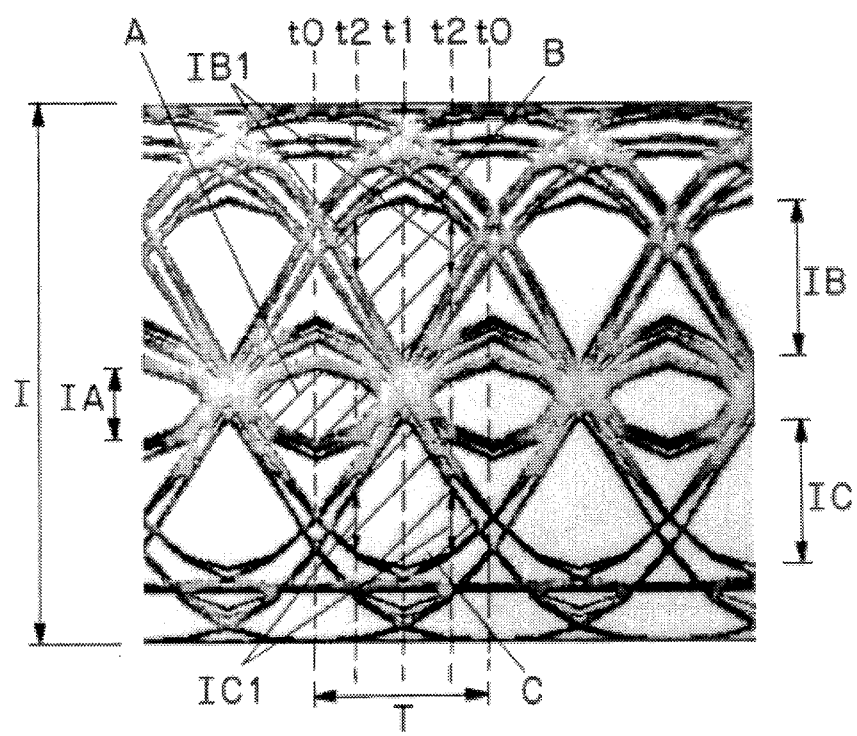
FIG. 9 shows the eye pattern obtained by using a conventional crosstalk reducing device.

FIG. 8 shows the eye pattern obtained by using the crosstalk reducing device in this example in the case where digital information which is recorded at a track pitch tp=0.5 μm, at a fundamental period T=the shortest mark length=the shortest space length =0.425 μn is to be reproduced by using light of a wave-length λ=680 mm. At this time, the numerical aperture of the object lens NA is set to be 0.6. In FIG. 8, the gain of the amplifier 35 is set to be 1, and the gains and of the variable gain amplifier 38 are set to be k1=0.17 and k2=0.08, respectively. FIG. 9 shows the eye pattern in the case where the gain of the variable gain amplifier is fixed the same as in the conventional example. In FIG. 9, k1=k2= 0.13.

In both FIGS. 8 and 9, a region A is an eye used for the usual signal detection, and regions B and C are eyes used for the signal detection in partial response. In the case where the information is digital signal, the timing at which the usual signal detection is performed is designated by t0, the timing shifted from t0 by T/2 is designated by t1, and timings shifted from t1 by ±T/4 are designated by t2. The whole amplitude of the signal is represented by I, an amplitude in the region A at the timing t0 is represented by IA, amplitudes in the regions B and C at timing t1 are represented by IB and IC, respectively, and amplitudes in the regions B and C at the timing are represented by IB1 and IC1, respectively.

The opening ratios of the eyes are represented by IA/I, IB/I, and IC/I, respectively. The opening ratios of the regions B and C at the timing t2 are represented by IB1/I and IC1/I, respectively. According to the crosstalk reducing device of this example, he opening ratios of the eyes are IA/I=13%, IB/I=34%, and IC/I=32%, respectively. According to the conventional crosstalk reducing device, the opening ratios of the eyes are IA/I=13%, IB/I=29%, and IC/I=27%, respectively. As to the opening ratios IA/I, they are the same both in this example and the conventional example. However, IB/I in this example is improved by 1.17 times as compared with that in the conventional example, and IC/I in this example is improved by 1.18 times as compared with that in conventional example. The opening ratios of the regions B and C at the timing t2 in this example are IB1/I=16% and IC1/I=17%, respectively. The opening ratios of the regions B and C at the timing t2 in the conventional example are IB1/I=12% and IC1/12%, respectively. That is, IB1/I in this example is improved by 1.33 times as compared with that in the conventional example, and IC1/I in this example is improved by 1.42 times as compared with that in the conventional example. According to the crosstalk reducing device in this example, the crosstalk is effectively removed, and the opening ratios of the eyes when the signal is detected in partial response are improved, so that the noise margin can be increased. Accordingly, the error rate when the information recorded on the information recording medium is to be reproduced is minimized. Moreover, the opening ratios of the regions B and C at the timing t2 are greatly improved. If the opening ratios of the regions B and C at a point shifted from the timing t1 (e.g., at the timing t2) are increased, the margin for the fluctuation of the detection timing in the case of the signal detection in partial response is increased. Accordingly, the error rate during the reproduction is minimized.

As is disclosed in Japanese Laid-Open Patent Publication No. 2-257474, a construction can be realized by using an optical system for emitting one beam and a semiconductor memory for storing information of two or more tracks. Such a construction is equivalent to the construction which uses three beams. If the crosstalk reducing device in this example is applied to an optical system and an electric circuit system with such a construction, the same effects can be attained.

With the construction of the optical system in which the information recording medium is irradiated with three beams, if there is large decentration in the information recording medium or a disk-like information recording medium is used, the relationship among the three beams and the respective tracks fluctuates due to the various curvatures of inner tracks and outer tracks of the information recording medium. Accordingly, there may occur a case where the crosstalk cannot be sufficiently reduced. In such a case, as is disclosed in SPIE Proceeding Vol. 1316, up. 35–39, it is effective to keep the relationship among the three beams and the respective tracks constant, by rotating the positions of the three beams with an image rotating prism. In another case where an equivalent construction to that using three beams is realized by using an optical system for emitting one beam and a semiconductor memory for storing information of two or more tracks, unlike the construction with three beams, the crosstalk can always be sufficiently reduced. In addition, irradiation of three beams and the image rotating prism are not required, so that the optical system can be simplified.

EXAMPLE 2

In the second example, the same optical system as in the first example is employed, but the variation manner of the gain of the variable gain amplifier 38 is different from that in the first example. In this example, the gain of the variable gain amplifier 38 is controlled to vary is a step function depending on whether the signal from the amplifier 35 is higher or lower than a threshold value.

Figure 10:
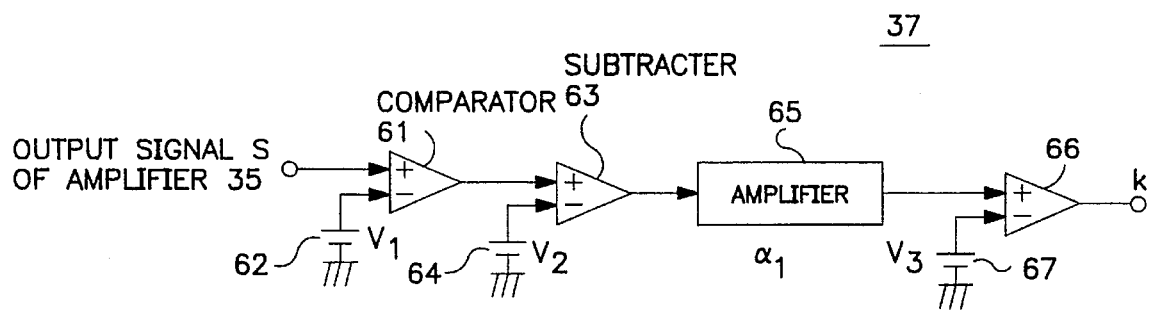
FIG. 10 shows the construction of a signal processor in a crosstalk reducing device in a second example of the invention.

FIG. 10 shows specific and exemplary circuitry of the signal processor 37 in the second example. The signal S which has been amplified in the amplifier 35 is input into a comparator 61. The comparator 61 compares the output signal S of the amplifier 35 with a voltage v1 produced by a constant voltage source 62. If S>v1, the comparator 61 outputs $v_+$. If S<v1, the comparator 61 outputs $v_-$. The output signal of the comparator 61 is input into a subtracter 63. The subtracter 63 subtracts a voltage v2 produced by a constant voltage source 64 from the output signal of the comparator 61, and outputs a signal indicating the obtained difference. The output signal of the subtracter 63 is amplified by αl in an amplifier 65. The amplified signal from the amplifier 6S is input into a subtracter 66. The subtracter 66 subtracts a voltage v3 produced by a constant voltage source 67 from the output signal of the amplifier 65, and outputs a signal indicating the obtained difference. The output signal of the subtracter 66 indicates the gain of the variable gain amplifier 38.

Figure 11:
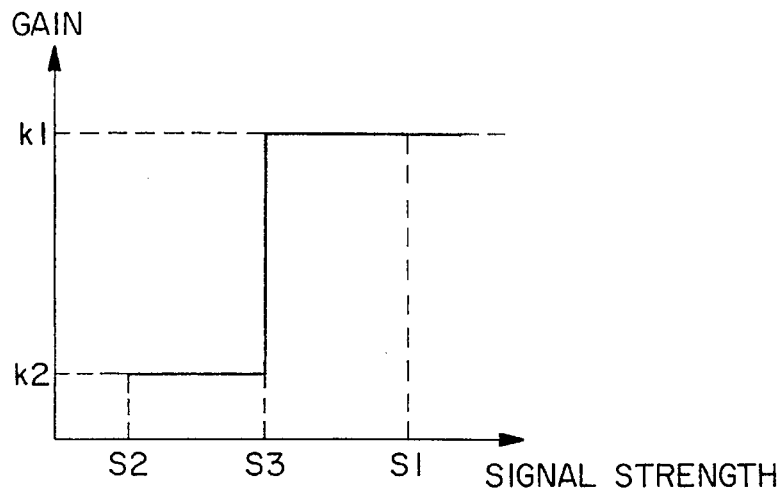
FIG. 11 shows the relationship between a gain of the variable gain amplifier and the strength of a signal input into a signal processor which controls the gain in the second example of the invention.

FIG. 11 shows the variation of the gain of the variable gain amplifier 38 as a step function in accordance with the output signal of the amplifier 35. In FIG. 11, the horizontal axis indicates a strength of the output signal of the amplifier 35, and vertical axis indicates the gain of the variable gain amplifier 38. In FIG. 11, S1 is the signal strength in the case where spaces are successively recorded in the desired track n, and k1 is the gain determined by the crosstalk from the adjacent tracks in the case. FIG. 11, S2 is the signal strength in the case where marks are successively recorded in the same track n, and k2 is the gain determined by the crosstalk from the adjacent tracks in the case. The symbol S3 indicates a threshold value which is set between S1 and S2. In order to realize the above, the voltage v1 produced by the constant voltage source 62 is set to be S3, and the voltage v2 produced by the constant voltage source is set to be $v_-$. The voltage v3 produced by the constant voltage source 67 is set to be −k2. In addition, the gain α1 of the amplifier 65 is set to be $(k1-k2)/(v_+-v_-)$.

Figure 12A:
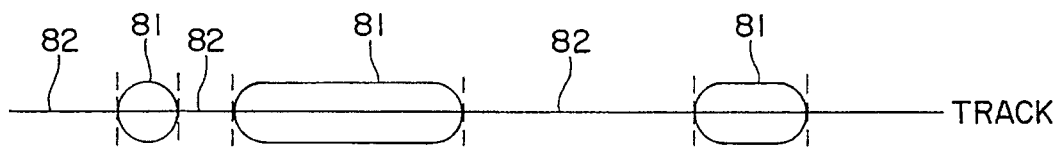
FIG. 12 shows the relationship among information recorded on an information recording medium (a), the strength of a signal input into the signal processor which controls a gain (b), and the gain of variable gain amplifier (c) in the second example of the invention.
Figure 12B:
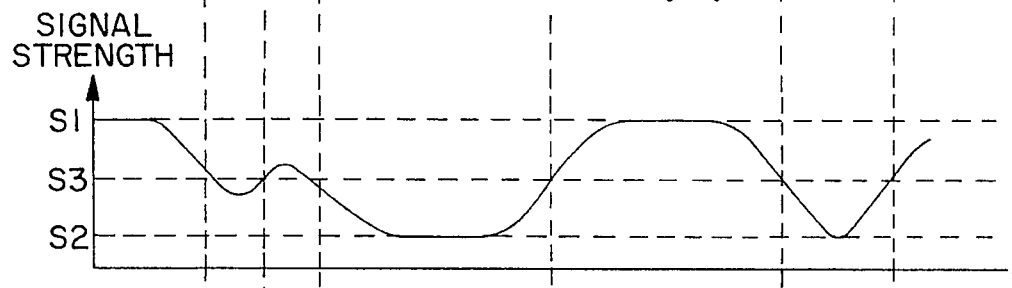
Figure 12C:
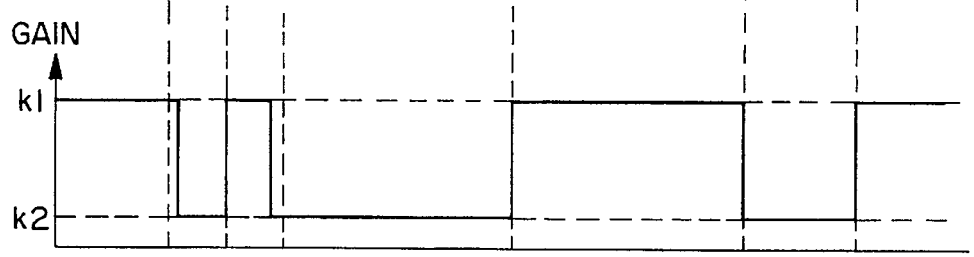

FIGS. 12(a)–12(c) shows the relationship among (a) a mark 81 and a space 82 located in the desired track n, (b) the signal output from the amplifier 35 when the light beam 20 moves on the track n, and (c) the gain of the variable gain amplifier 38 at this time. The symbols S1, S2, S3, k1, and k2 are the same as those shown in FIG. 11.

Figure 13:
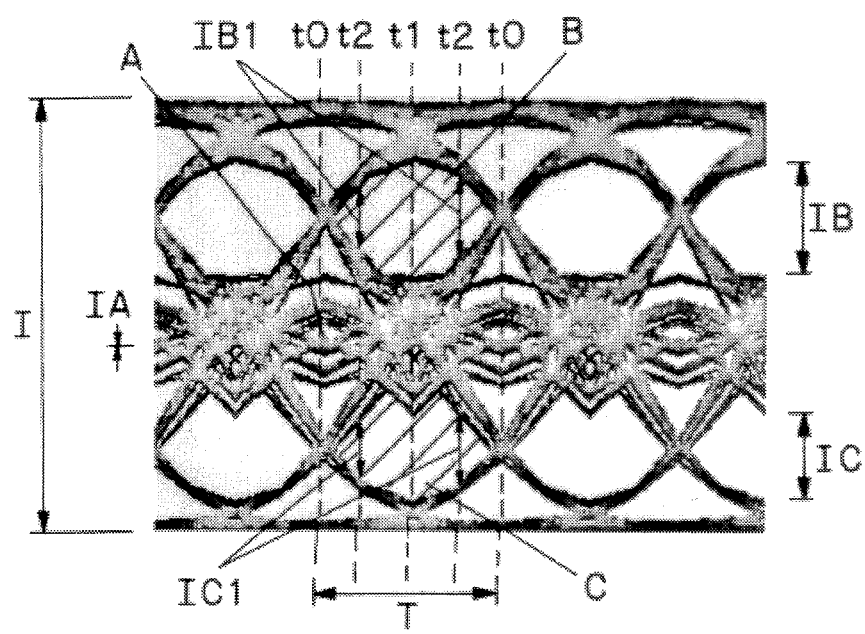
FIG. 13 shows the eye pattern obtained by using the crosstalk reducing device in the second example of the invention.

The same as in the first example, FIG. 13 shows the eye pattern obtained by using the crosstalk reducing device in this example in the case where digital information which is recorded at a track pitch tp=0.5 pm, at a fundamental period T=the shortest mark length=the shortest space length=0.425 μm is to be reproduced by using light of a wavelength λ=680 nm. At this time, the numerical aperture of the object lens NA is set to be 0.6. In FIG. 13, the gain of the amplifier 35 is set to be 1, and the gains of the variable gain amplifier 38 are set to be k1=0.17 and k2=0.08, respectively. The signal strength for mirror reflection is standardized to be S1=1.0, so that S3=0.5. In FIG. 13, a region A is an eye used for the usual signal detection, and regions B and C are eyes used for the signal detection in partial response, the same as in FIG. 8. According to the crosstalk reducing device of this example, the opening ratios of the eyes are IA/I=0%, IB/T=26%, and IC/I=20%, respectively. The opening ratios of the regions B and C at the timing t2 in this example are IB1/I=18% and IC1/I=17%, respectively. In this example, IB1/I and TC1/I are 1.5 times and 1.42 times as good as those in the conventional example, respectively. That is, they are very good. Furthermore, the opening ratios in this example are higher than the opening ratios IB1/1=16% and IC1/I=17% in the first example. Thus, according to this example, it is possible to remarkably increase the opening ratios of eyes in the case of partial response detection and the margin for the fluctuation of detection timing.

EXAMPLE 3

Figure 14:
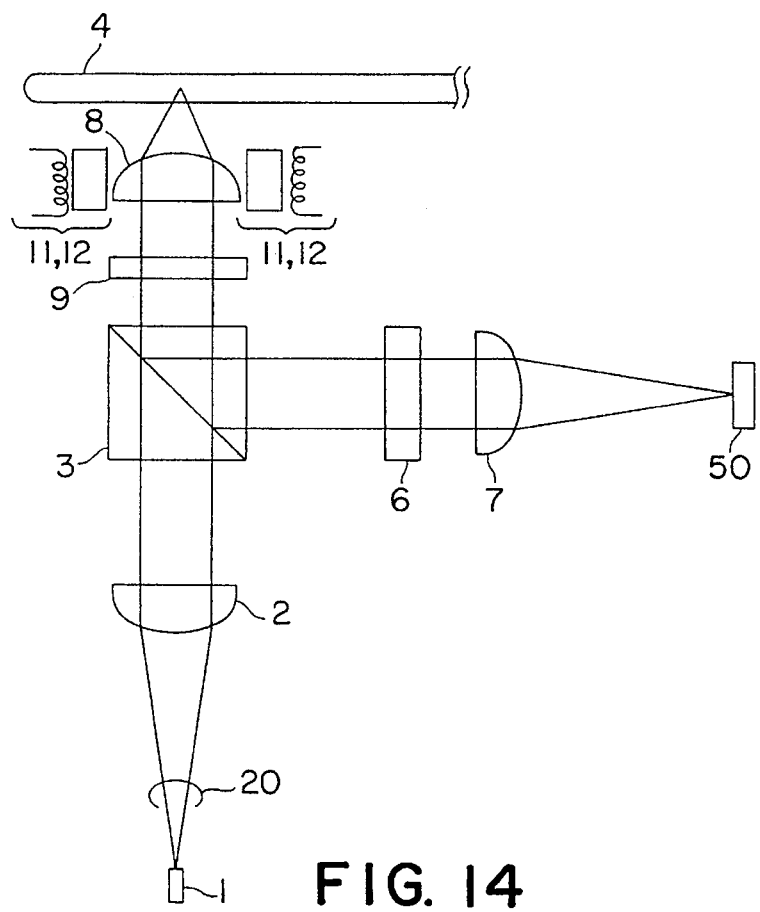
FIG. 14 shows the construction of an optical system of an optical information reproducing apparatus in a third example of the invention.

FIG. 14 shows the construction of an optical system of an optical information reproducing apparatus in the third example of the invention. In this apparatus, a desired track is irradiated with one beam, so as to reduce the crosstalk. The concept of the optical system is disclosed in Japanese Laid-Open Patent Publication No. 61-131245. In the optical system shown in FIG. 14, the same optical elements are designate by the same reference numerals as those shown in the optical system shown in FIG. 1. The optical system in this example is different from in the first example in that one beam 20 is converged on the information recording medium 4 without providing the diffracting grating 10, and that the arrangement of photodetective portions on a photodetector 50 is different from the arrangement of photodetective portions on the photodetector 5.

Figure 15:
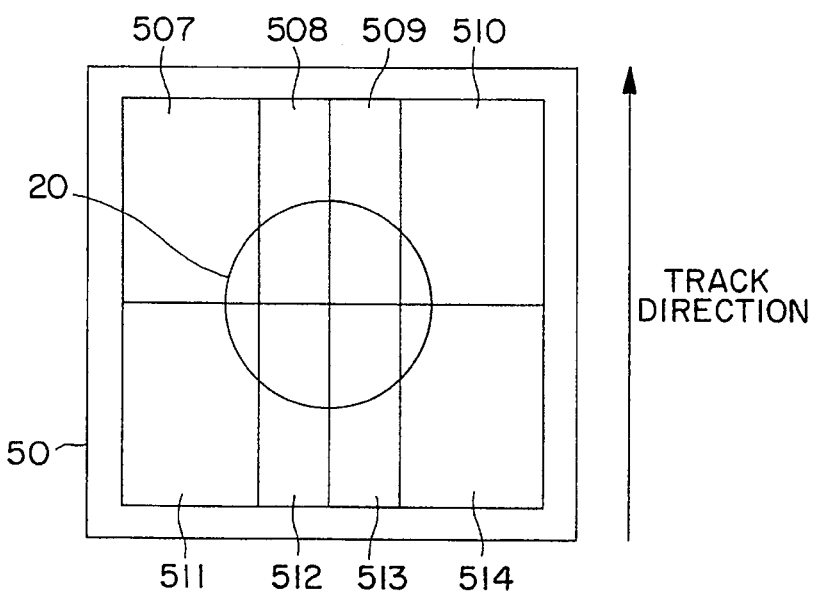
FIG. 15 shows the relationship between photo detectors and a received light beam in the third example of the invention.

The arrangement of the photodetective portions on the photodetector 50 is shown in FIG. 15. The photodetector 50 consists of eight photodetective portions 507–514. The focusing error signal is obtained by performing a differential operation between the sum of signals output from the photodetective portions 509–512 end the sum of signals output from photodetective portions 507, 508, 513, and 514. The tracking error signal is obtained by performing a differential operation between the sum of signals output from the photodetective portions 507, 508, 511, and 512 and the sum of signals output from the photodetective portions 509, 510, 513, and 514.

The crosstalk reducing device is constructed in such a manner that the sum of the signals output from the photodetective portions 508, 509, 512, and 513 is input into the amplifier 35 shown in FIG. 3, and the sum of the signals output from the photodetective portions 507, 510, 511, and 514 is input into the variable gain amplifier 38. Unlike the first example, this example uses one beam and hence the delay circuits 32–34 are not required, so that the circuitry is simplified. In addition, in the case where the rotation speed of the information recording medium 4 is varied, it is unnecessary to vary the delay time because any delay element is not provided. Accordingly, even in an optical information reproducing apparatus in which the relative speed of the information recording medium 4 to the light beam 20 varies depending on a partial region of the information recording medium 4, the crosstalk can be stably reduced.

If the optical system in this example is combined with the signal processors and the variable gain amplifiers in the first and the second examples, respectively, the same effects can be attained.

The crosstalk reducing device according to the invention is tolerable to an optical pickup head apparatus with any construction, as far as the optical pickup head apparatus outputs a signal which mainly includes information recorded in a desired track and signals which include information recorded in the adjacent tracks. It is appreciated that the detection method of the focusing error signal and the tracking error signal of the optical pickup head apparatus is not limited to any specific one.

In the first and second examples, two types of control of the gain of the variable gain amplifier have been described. Alternatively, the gain of the variable gain amplifier may be determined by using any other type of function.

In the first to third examples, after the signals including the information recorded in the adjacent Tracks are all added, the added signal is input into the variable gain amplifier. Alternatively, in the case where a plurality of signals including the information recorded in the adjacent tracks are independently obtained, the signals may be input into different variable gain amplifiers, respectively. The respectively amplified signals are then added to each other by an adder.

In the first to third examples, as the signal for controlling the variable gain amplifier, only the signal mainly including the information recorded in a desired track is used. Alternatively, it is possible to perform the control in conjunction with the control by using another signal such as a tracking error signal.

In the following fourth to tenth examples, examples in which a coefficient is automatically determined in the crosstalk reducing device of the invention will be described.

EXAMPLE 4

In the fourth example, the signal with reduced crosstalk is sampled and held at an appropriate clock, and the control of the gain of the variable gain amplifier ks performed so as to increase the opening amount of the eye pattern. The optical system and the relationship among the tracks and beams 20–22 on the information recording medium 4 are the same as those in the first example.

Figure 16:
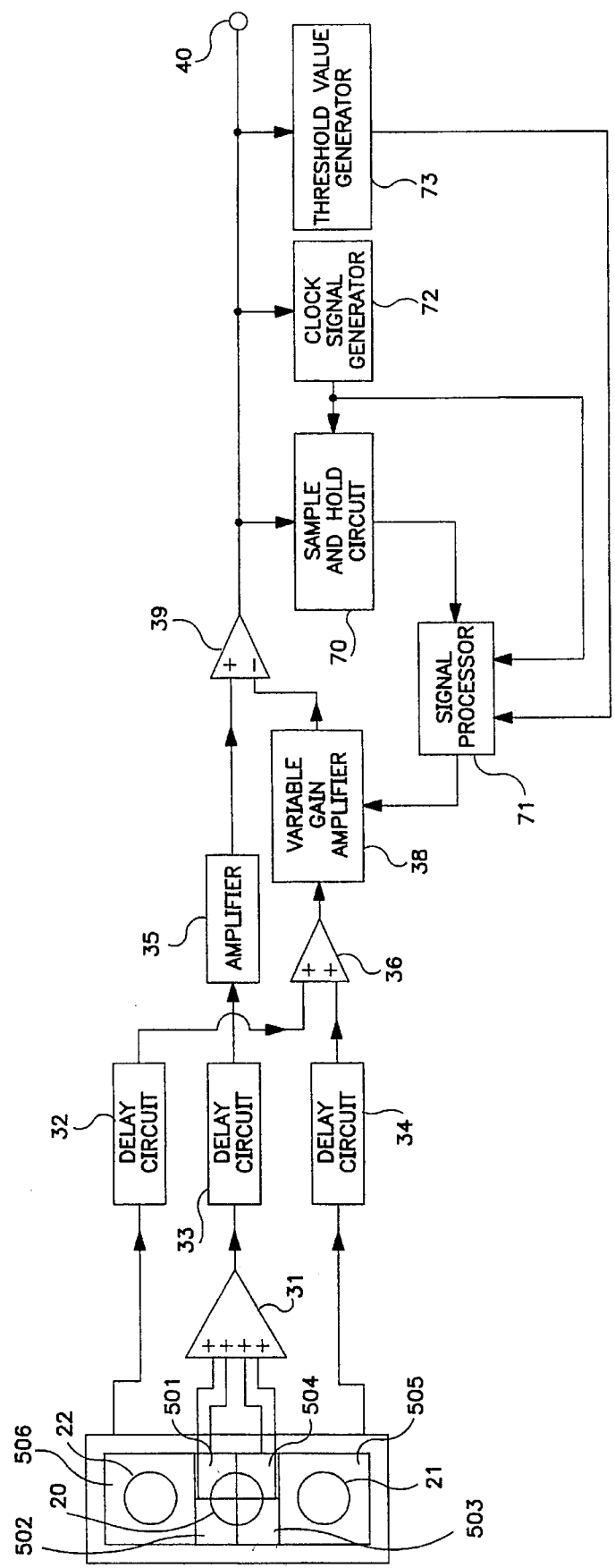
FIG. 16 shows the construction of an electric circuit system of a crosstalk reducing device in a fourth example of the invention.

FIG. 16 shows the relationship between photodetector 5 and the beams 20–22 received by the photodetector 5 in the optical system shown in FIG. 1, and shows the construction of an electric circuit system of the crosstalk reducing device. The information recorded in the desired track n on the information recording medium 4 is obtained by adding the signals output from the photodetective portions 501–504 in the adder 31. The information recorded in the adjacent tracks n−1 and n+1 is obtained from the signals output from the photodetective portions 505 and 506, respectively.

The signals output from the photodetective portion 506, the adder 31, and the photodetective portion 505 are input into the delay circuits 32–34, respectively, the same as in the first example. The delay circuits 32–34 correct time delays of information due to such an arrangement that the beam spots 20–22 on the information recording medium 4 are separated from each other by a distance L along the track direction. The signal output from the delay circuit 33 mainly includes the information recorded in the desired track.

The amplifier 35 amplifies the signal output from the delay circuit 33. The amplified signal is input into the subtracter 39. The signals output from the delay circuits 32 and 34 include the information recorded in the tracks adjacent to the desired track, respectively. The adder 36 adds the signals output from the delay circuits 32 and 34. The variable gain amplifier 38 in which the gain thereof can be adjusted from a positive one to a negative one controls the level or polarity of the signal output from the adder 36 in accordance with the output of a signal processor 71 which is described later. The subtracter 39 subtracts the output signal of the adder 36 from the output signal of the amplifier 35, and outputs a signal indicating the obtained difference. The output signal of the subtracter 39 is output to a terminal 40. At this time, the signal output from the subtracter 39 is also input into a clock signal generator 72 and a sample and hold circuit 70. The clock signal generator 72 generates a clock signal which is synchronized with the digital information recorded on the information recording medium 4. The sample and hold circuit 70 samples and holds the signal output from the subtracter 39 at a timing indicated by the clock signal generated by the clock signal generator 72. The signal sampled and held in the sample and hold circuit 70 is input into the signal processor 71. Also, the output signal of the subtracter 39 is input into a threshold value generator 73. The threshold value generator 73 generates a threshold value Vt for reproducing a digital code.

The signal processor 71 receives the signal output from the sample and hold circuit 70 and the signal output from the threshold value generator and controls the gain of the variable gain amplifier 38.

Figure 17:
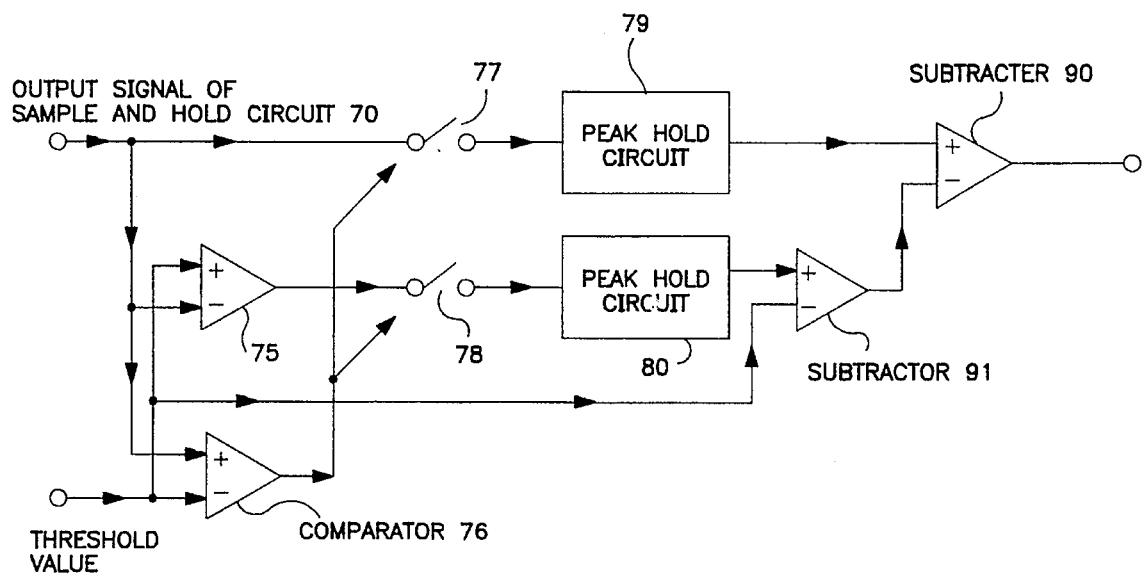
FIG. 17 shows the construction of part of an electric circuit system of a signal processor in the fourth example of the invention.

FIG. 17 shows an exemplary circuit, in the signal processor 71, for outputting a signal by which the opening amount of the eye pattern is determined, based on the signal held in the sample and hold circuit 70. The signal s which is output from the sample end hold circuit 70 is input into a peak hold circuit 79 via a switch 77. The signal s is also input into a subtracter 75 and a comparator 76. The subtracter 75 subtracts the signal s from the threshold value which is the output signal of the threshold value generator 73, and outputs a signal indicating the obtained difference. The output signal is input into a peak hold circuit 80 via a switch 78. The comparator 76 compares the signal s with the threshold value If s>Vt, the comparator 76 outputs $V_+$. If s<Vt, the comparator 76 outputs $V_-$. The output from the comparator 76 is a control signal for controlling the open/close of the switches 77 and 78. The switch 77 is opened so as not to be conductive when the output of the comparator 76 is $V_+$, end closed so as to be conductive when the output of the comparator 76 is $V_-$. Therefore, the peak, hold circuit 78 holds the maximum value of the signal s when s<Vt. The switch 78 is closed so as to be conductive when the output of the comparator 76 is $V_+$, and opened so as not to be conductive when the output of the comparator 76 is $V_-$. Therefore, the peak hold circuit 80 holds the maximum value of (Vt−s) when s>Vt. The output signal of the peak hold circuit 80 is input into a subtracter 91 where the output signal is subtracted from the threshold value Vt. A subtracter 90 subtracts the output signal of the peak hold circuit 79 from the output signal of the subtracter 91, and outputs the result. The opening amount of the eye pattern is determined on the basis of the signal obtained by the peak hold circuit 79.

Figure 18:
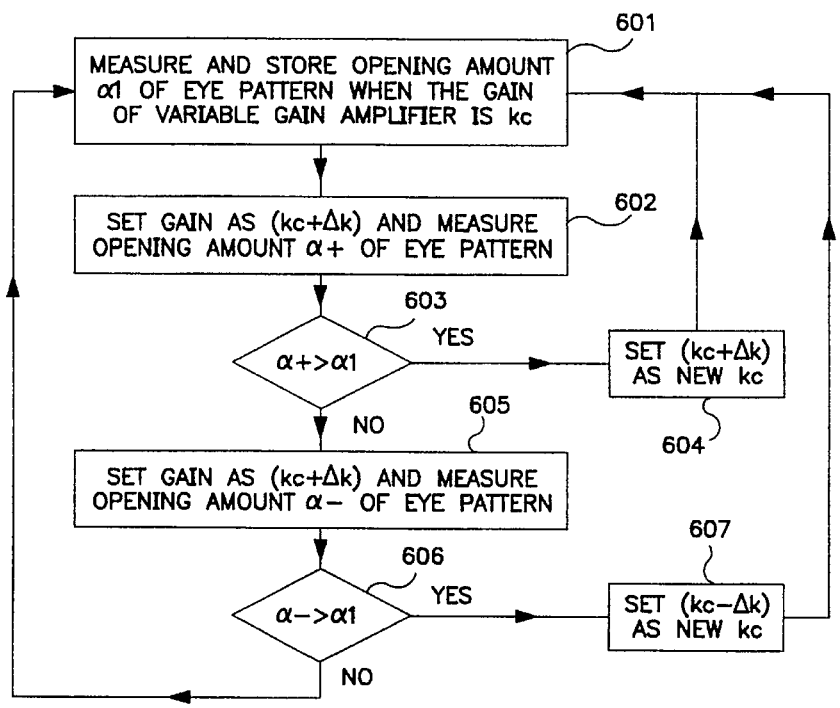
FIG. 18 is a flowchart by which the signal processor determines the gain of a variable gain amplifier in the fourth example of the invention.

FIG. 18 shows the algorithm for determining the gain of the variable gain amplifier 38 by receiving the output signal which provides the opening amount of the eye pattern. In step 601, the opening amount is measured for a predetermined time period by setting the gain of the variable gain amplifier to be kc. The measured opening amount is defined as a1, and is temporarily stored, and the process proceeds to step 602. In step 602, the gain of the variable gain circuit 38 is increased by a small amount $\Delta k$, i.e., the gain is set to be (kc+$\Delta k$), and the opening amount of the eye pattern is measured for a predetermined time period. The measured opening amount is defined as a+. The process proceeds to step 603 where $a_+$ is compared with al. If $a_+$>al, the process proceeds to step 604. If $a_+$a1, the process proceeds to step 605. In step 604, (kc+$\Delta k$) is newly set as kc, and the process returns to step 601. In step 605, the gain of the variable gain amplifier 38 is decreased by a small amount $\Delta k$, i.e., the gain is set to be (kc−$\Delta k$), end the opening amount of the eye pattern is measured for a predetermined time period. The measured opening amount is defined as $a_-$, and the process proceeds to step 606. In step 606, $a_-$ is compared with a1. If $a_-$>a1 process proceeds to step 607. If $a_- \leq$a1, the process returns to step 601. In step 607, (kc−$\Delta k$) is newly set as kc, and the process returns to step 601. By repeating the foregoing cycle, kc is converged into a value at which the opening amount of the eye is the largest.

Figure 19:
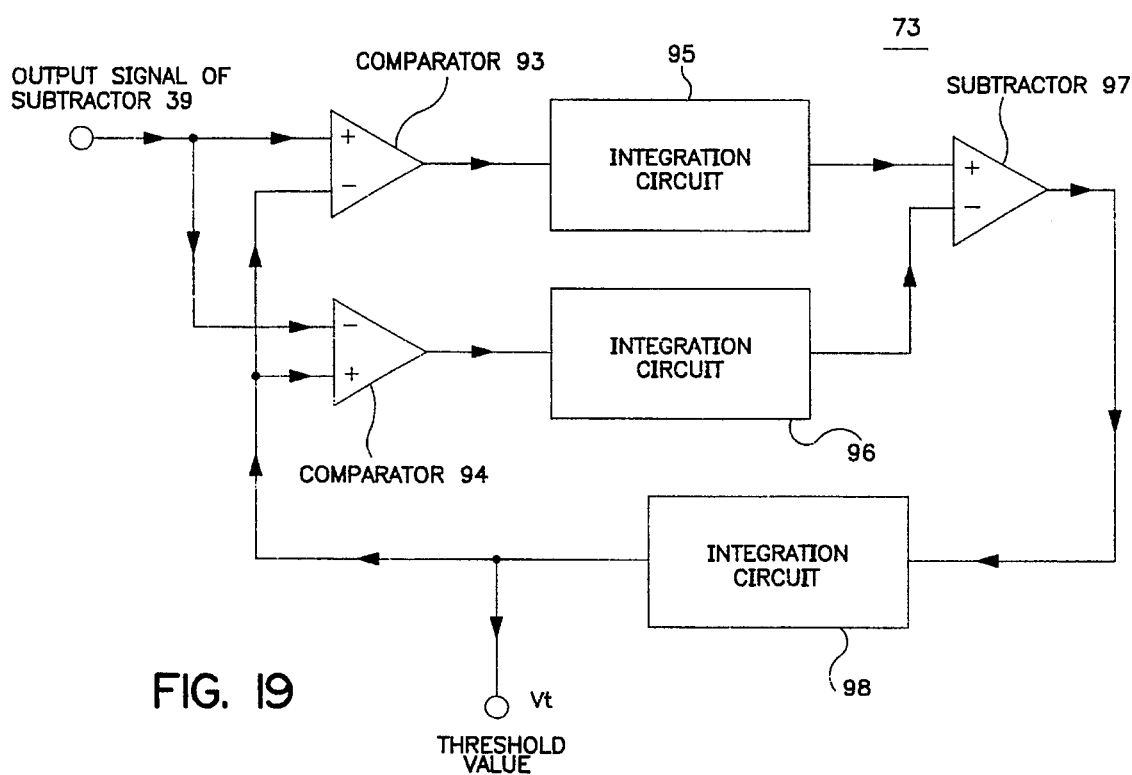
FIG. 19 shows the construction of an electric circuit of a threshold value generator in the fourth example of the invention.

The threshold value generator is shown in FIG. 19. The circuit shown in FIG. 19 is an exemplary one in which the threshold value is automatically generated when the information recorded on the information recording medium does not include a direct current component. The output signal s of the subtracter 39 is input to a positive input of a comparator 93 and to a negative input of a comparator 94. To a negative input of the comparator 93 and to a positive input of comparator 94, the output signal Vt of an integration circuit 98 is input. Each of the comparators 93 and 94 outputs $V_+$ when the positive input is larger than the negative input, and outputs 0 when the negative input is larger than the positive input. The integration circuit 95 receives the output signal of the comparator 93, and integrates the input signals for an appropriate time period. Only when the signal s is larger than the comparator 93 outputs $V_+$, which is integrated by the integration circuit 95. Accordingly, the output of he integration circuit 95 is in proportion to the length of time period of s>Vt. The integration circuit 96 receives the output signal of the comparator 94, and integrates the input signals by using the same time constant as that of the integration circuit 95. Only when the signal s is smaller than Vt, the comparator 94 outputs $V_+$, which is integrated by the integration circuit 96. Accordingly, the output of the integration circuit 96 is in proportion to the length of time period of s<VT. A subtracter 97 subtracts the output signal of the integration circuit 96 from the output signal of the integration circuit 95, and outputs a signal indicating the obtained difference. An integration circuit 98 integrates the output signal of the subtracter 97. The output signal Vt of the integration circuit 98 is the threshold voltage.

Figure 20:
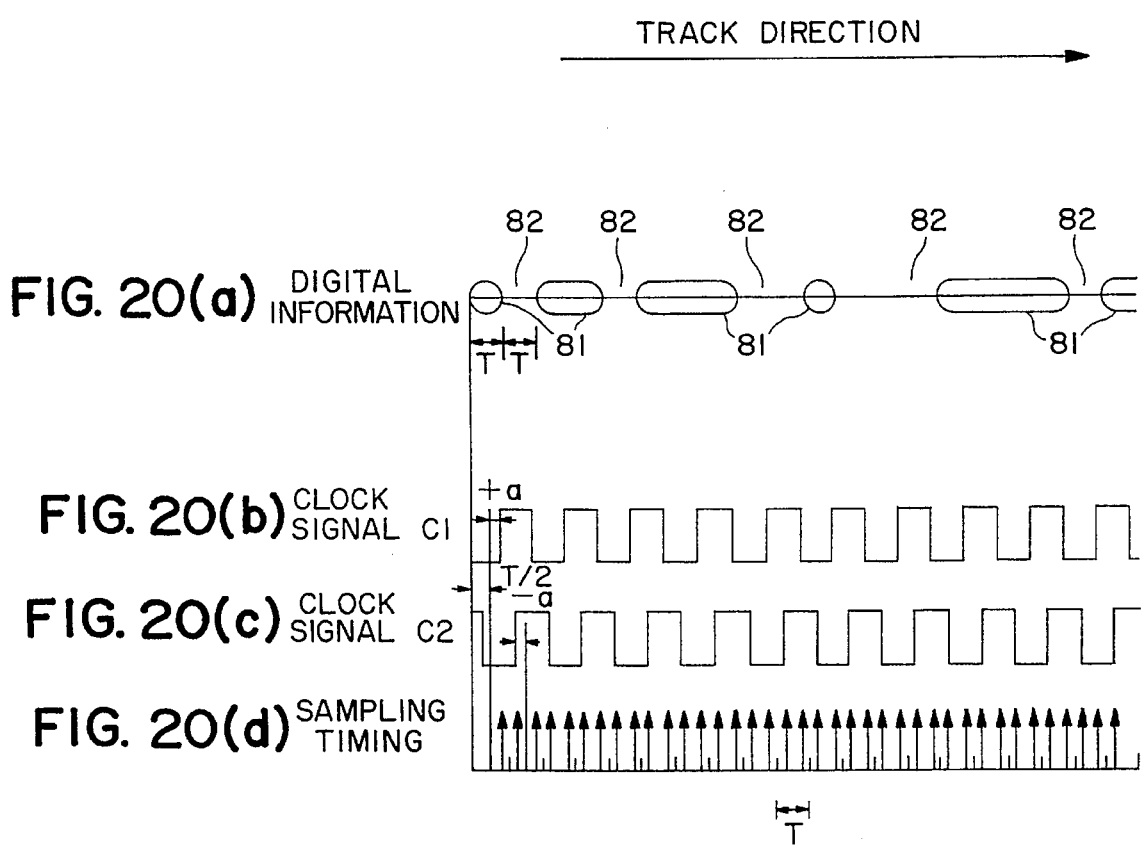
FIG. 20 shows the relationship between digital information and clock signals in the fourth example of the invention.

FIG. 20 shows the relationship among the digital information (a) recorded on the information recording medium 4, a clock signal C1 (b), a clock signal C2 (c), and the sampling timing (d). On the information recording medium 4, information is digitally recorded as marks 81 or spaces 82 by a discrete length of the integer multiple of T, where the fundamental period is indicated by T. Herein, for the fundamental period T, the shortest period of the marks 81 or spaces 82 is set to be T. In some actual cases, for example in the case where the correction of duty is performed, the sum of the lengths of the shortest mark and the shortest space is 2T, but the length of the shortest mark is 0.8T and the length of the shortest space is 1.2T. However, in the implementation of the invention, such cases are equivalent to the case where the lengths of the shortest mark and the shortest space The clock signal C1 and the clock signal C2 are generated from the digital information recorded on the information recording medium 4. The clock signal C1 is a signal indicating a position shifted by +Ta from a position having a distance corresponding to the length of integer multiple of T from a position shifted by T/2 from the end of the digital information recorded as the mark 81 or space S2. The position shifted by +Ta is indicated by the rising edge and the falling edge of the clock signal C1. The clock signal C2 is a signal indicating a position shifted by −Ta from a position having a distance corresponding to a length of integer multiple of T from a position shifted by T/2 from the end of the digital information. The position shifted by −Ta is indicated by the rising edge and the falling edge of the clock signal C2. The sample and hold circuit 70 samples the input signal at the timings of the rising edges and the falling edges of the clock signals C1 and C2. In this example, the positions of signals which are sampled at the timings shown in FIG. 20 are regarded as signal detection points. The gain of the variable gain amplifier 38 is controlled so that the opening amount of the eye pattern at the signal detection points are the largest.

More specifically, the signal processor 71 includes one reference value in the vicinity of the center of the eye pattern, and selects a signal which is higher than the reference value and has the smallest difference from the reference value among the signals output from the sample and hold circuit 70, as an upper-side signal. Also, a signal which is lower than the reference value and has the smallest difference from the reference value among the signals output from the sample and hold circuit 70 is selected as a lower-side signal. The signal processor 37 control the gain of the variable gain amplifier 38 so that the difference between the upper-side signal and the lower-side signal is the largest. The control of the gain of the variable gain amplifier in the crosstalk reducing device of the invention is equivalent to the change a coefficient in a conventional crosstalk reducing device.

Figure 21:
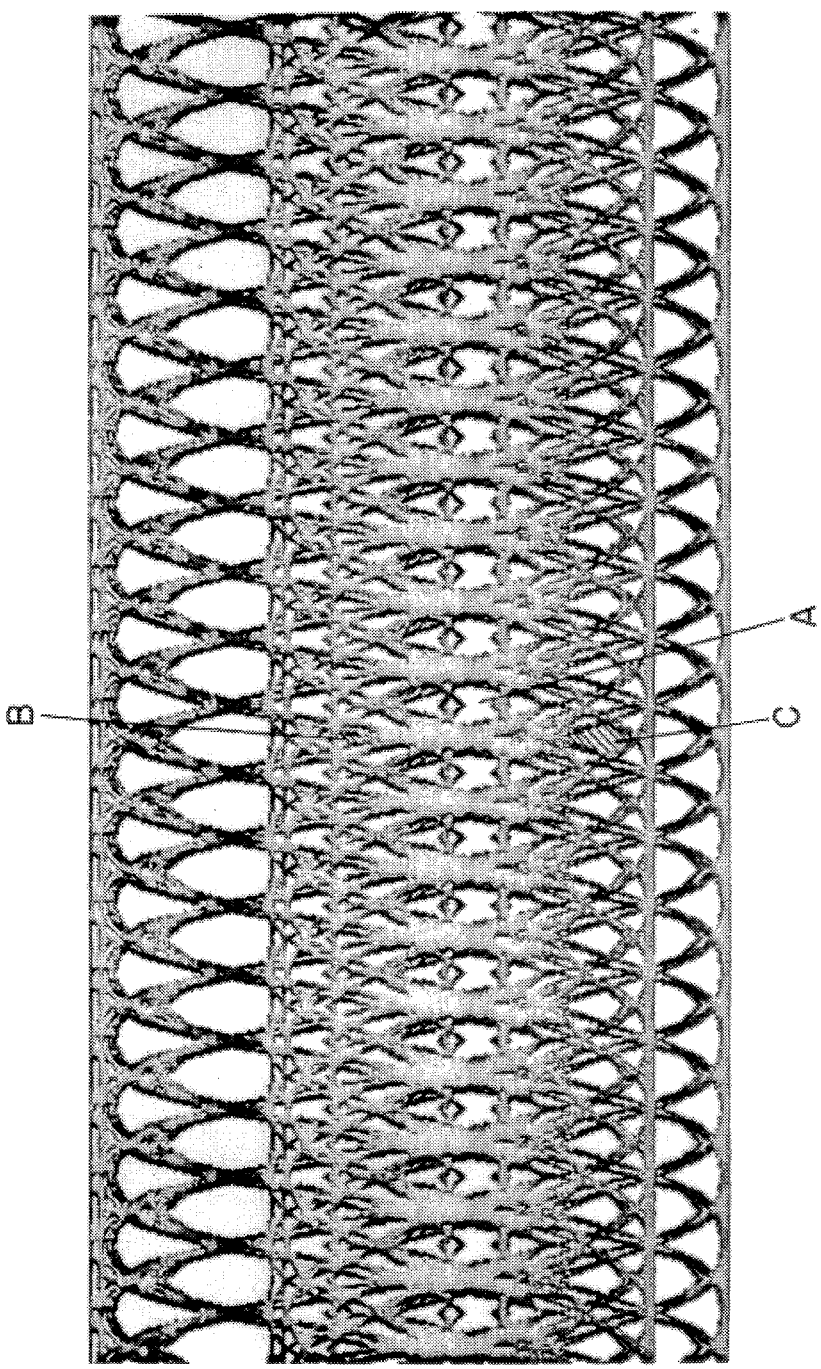
FIG. 21 shows the eye pattern obtained by using a conventional reproducing apparatus.
Figure 22:
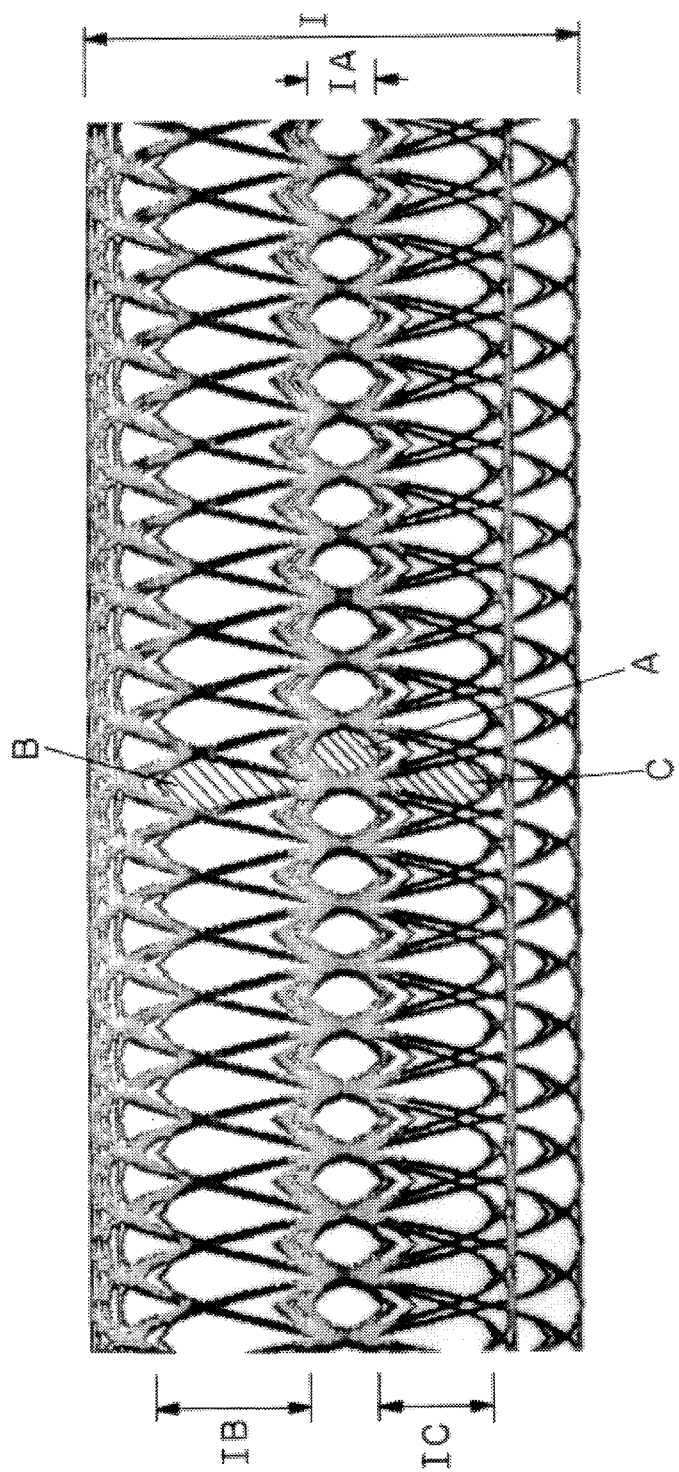
FIG. 22 shows the eye pattern obtained by using the crosstalk reducing device in the fourth example of the invention.

FIG. 21 shows the eye pattern obtained without the crosstalk reducing device, in the conditions of the light source wavelength λ=680 nm, the numerical aperture of the object lens NA=0.6, a track pitch tp=0.5 μm, a fundamental period T=the shortest mark length=the shortest space length =0.425 μm, end a distance relating to the sampling timing Ta=T/4. FIG. 22 shows the eye pattern obtained by using the crosstalk reducing device in this example in the same conditions. In FIGS. 21 and 22, a region A is an eye used for the usual signal detection, and regions B and C are eyes used for the signal detection in partial response. A whole amplitude of the signal is represented by I, amplitudes in the regions A, B, and C are represented by IA, IB, and IC, respectively. The opening ratios of the eyes are represented by IA/I, IB/I, and IC/I, respectively. The opening ratios of the eyes in the case of the conventional example without a crosstalk reducing device are IA/I=6.4%, IB/I =6.0%, and IC/I=10.2%, respectively. The opening ratios of the eyes in the case of using the crosstalk reducing device in this example are IA/I=14.4%, IB/I =31.3%, and IC/I=24.3%, respectively. As is seen from the results, the value of IA/I in this example is positive while the value thereof in the conventional example is negative. In this example, IB/I is improved by 5.2 times as compared with that in the conventional example, and IC/I is improved by 2.4 times as compared with that in the conventional example. As described above, according to the crosstalk reducing device in this example, all of the opening ratios of the eyes are remarkably improved.

In addition, at this time, the gain of the variable gain amplifier 38 is controlled by using the desired digital information usually recorded on the information recording medium, so that any additional preamble signal is not required. Accordingly, the information amount which can be recorded on the information recording medium cannot be reduced. Moreover, a reference signal which is the same as that in the recording is not required for the reproduction, so that it becomes possible to reproduce information with reduced crosstalk for any information recording medium, such as an information recording medium of read-only type which can be duplicated in mass production. Thus, the applicability of the crosstalk reducing device of the present invention is remarkably widened.

In the crosstalk reducing device in this example, Ta is set to be nearly equal to dj, where dj is the distance on the information recording medium 4 converted from the temporal fluctuation tj of detection timing which optically and electrically occurs when a code detection of digital information recorded on the information recording medium 4 is to be performed. Accordingly, it is possible to obtain information signals with the widest margin against the fluctuation of detection timing, and the error rate during the signal detection can be minimized. In the case of no fluctuation of detection timing, Ta is set to be 0, so that the opening ratio of the eye can be maximized.

The series of operations for determining a coefficient shown in FIG. 18 is performed at first only one time, every time when an information recording medium to which the reading is performed is exchanged, and thereafter the coefficient may be fixed. Alternatively, during the reading for one information recording medium, the coefficient is reviewed for every predetermined time period.

According to this example, it is possible to realize a construction which is equivalent to the construction with three beams, by using an optical system for emitting one beam and a semiconductor memory for storing information of two or more tracks. If the crosstalk reducing device in this example is applied to an optical system and an electric circuit system with such a construction, the same effects can be attained. In such a case, unlike the construction in which the information recording medium is irradiated with three beams, the crosstalk can always be sufficiently reduced. Moreover, since there is no necessity to provide three beams, the optical system can be simplified.

EXAMPLE 5

The fifth example describes an exemplary case where, when the code detection is performed in partial response, a coefficient is determined so that the opening amount of the eye for the partial response is increased.

The code detection in partial response positively utilizes the intersymbol interference. The minimum inverse interval between a mark and a space can be set to be smaller than a half of the reciprocal of the optical cut-off spatial frequency of the optical pickup head apparatus. Accordingly, in the case where such minimum inversion continues, the level of an RF signal is not varied. However, if marks or spaces of 2 bits or more are formed to be sufficiently larger than the half of the reciprocal of the optical cut-off spatial frequency of the optical pickup head apparatus, an RF signal with a larger amplitude can be obtained. In such a case, the code detection is performed by using two threshold values. The code detection is performed at the timings corresponding to an edge of a mark or space and a position shifted by integer multiple of the fundamental period T from the edge. At timing of code detection, if the level of the RF signal is higher than the higher threshold value, it is judged that spaces are successively formed. If the level of the RF signal is intermediate between the higher and the lower threshold value, it is judged that a space and a mark are adjacent to each other. If the level of he RF signal is lower than the lower threshold value, it is judged that marks are successively formed.

The construction of the optical system in this example is the same as that in the fourth example, and the circuitry is the same as that in the fourth example. The fifth example is different from the fourth example in that the threshold value generator 73 outputs two threshold values SL1 and SL2, and in that the signal processor 71 includes two circuits, one of which is shown in FIG. 17. The threshold value SL1 is larger than the threshold value SL2. By using the threshold values SL1 and SL2, the circuits shown in FIG. 17 output the difference between a minimum value which is higher than the threshold values and a maximum value which is lower than the threshold value. On the basis of the output difference, the opening amount of the eye for partial response on the upper side and the opening amount of the eye for partial response on the lower side are determined. The signal processor 71 uses the position of a signal which is sampled at the timing shown in FIG. 20 as the signal detection point, and controls the gain of the variable gain amplifier 38 so that a smaller one of the opening amounts of the eyes for partial response on the upper and lower sides at the signal detection point is maximized.

By the above method, it is possible to determine a coefficient of the variable gain amplifier so that the opening amount of the eye for the signal detection of partial response is maximized. Since the opening amounts of the eyes for partial response in the code detection are large, the information which is recorded in high density can be reproduced at a reduced error rate. Specifically, the opening ratios in this example are approximately the same as those in fourth example, so that high effects can be attained.

In this example, the gain of the variable gain amplifier is determined so that a smaller one of the opening amounts of eyes for partial response on upper and lower sides is maximized. Alternatively, if the gain of the variable gain amplifier is determined so that the average of the opening amounts of eyes for partial response on the upper and the lower sides is maximized, the same effects can be attained. In another case where it was previously found that the eyes for partial response on the upper and lower sides are asymmetry, the control can be performed only by using the smaller one of the opening amounts of eyes for partial response. In such a case, the signal processor 71 can be simplified.

EXAMPLE 6

Figure 23:
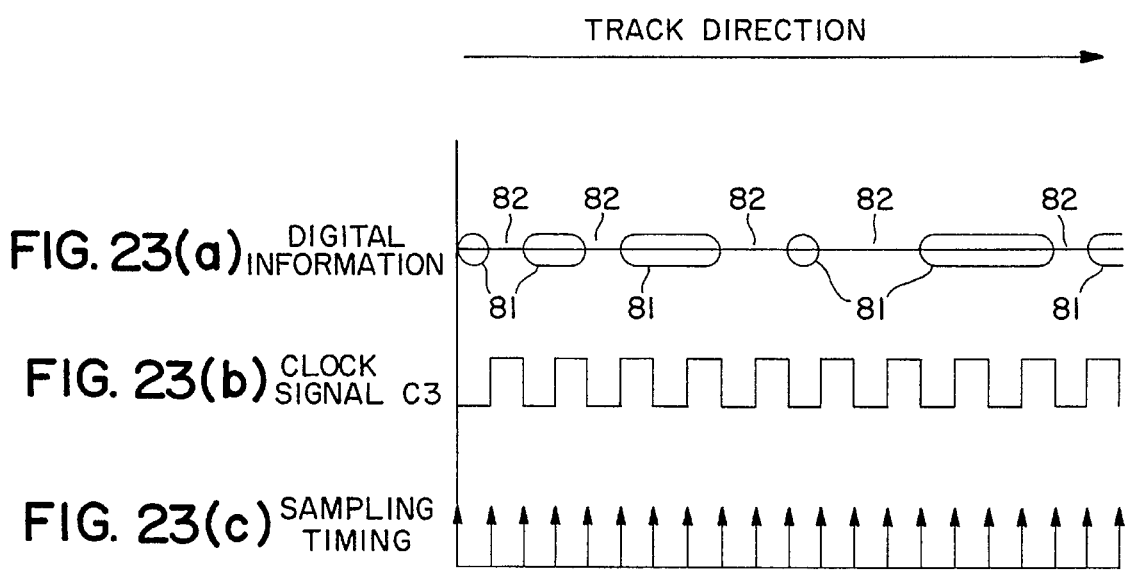
FIG. 23 shows the relationship between digital information and block signals in a sixth example of the invention.

The sixth example describes another method for determining a coefficient. FIG. 23 shows the relationship among the digital information (a) recorded on the information recording medium, a clock signal C3 (b), and the sampling timing (c). The structure of the information recording medium and the constructions of the optical system and the crosstalk reducing device are basically the same as those shown in the fourth example. The sixth example is different from the fourth example in the sampling timing, and the signal processing method and the algorithm for determining a coefficient in the signal processor 71 shown in FIG. 16. In this example, the clock signal C3 is generated from the digital information recorded on the information recording medium 4, the same as in the fourth example. The edge of a mark 81 or space 82 recorded on the information recording medium 4 corresponds to a rising edge or a falling edge of the clock signal C3. In this example, the sample and hold circuit 70 samples and holds the signals input thereto at the timing of the rising and falling edges of the clock signal C3. The signal processor 71 uses the position of the signal which is sampled at the timing shown in FIG. 23 as the signal detection point. In addition, for the signal h which is sampled at the signal detection point, two threshold values SL1 and SL2 are provided, and a signal h the level of which exists between the two threshold values is referred to as a signal D. The crosstalk reducing device is constructed such that the gain of the variable gain amplifier 38 is controlled so as to minimize the variation of the level of the signal D.

Figure 24:
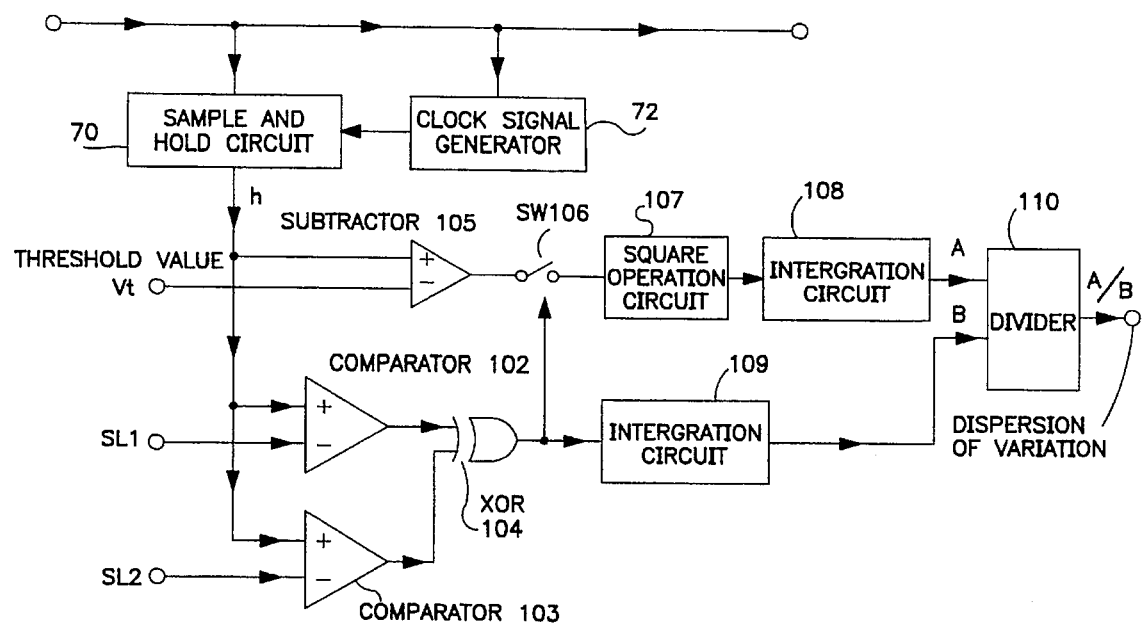
FIG. 24 shows the construction of part of an electric circuit system of a signal processor in the sixth example of the invention.

In this example, as the index of the variation of a signal D, the standard deviation of the signal D is used, and the process is performed so as to minimize 1t. In the signal processor 71, an exemplary construction of a circuit for outputting the standard deviation is shown in FIG. 24. The signal h held in the sample and hold circuit 70 is input into the positive inputs of a subtracter 105, a comparator 102 and a comparator 103. The subtracter 105 subtracts the threshold value Vt from the signal h, and outputs a signal indicating the obtained difference. The comparator 102 compares the signal h with the threshold value SL1. If the signal h is larger than the threshold value SL1, the comparator 102 outputs $V_+$. If the signal h is equal to or smaller than the threshold value SL1, the comparator 102 outputs 0. The comparator 103 compares the signal h with the threshold value SL2. If the signal h is larger than the threshold value SL2, the comparator 103 outputs $V_+$. If the signal h is equal to or smaller than the threshold value SL2, the comparator 103 outputs 0. An exclusive-OR (XOR) operation circuit 104 outputs $V_+$ when one input signal is V and the other input signal is 0, and outputs 0 when both of the input signals are 0, or when both of the input signals are $V_+$. The output signal of the subtracter 105 is input into a square operation circuit 107 via a switch 106. The switch 106 is controlled by the output of the XOR operation circuit 104. When the output of the XOR operation circuit 104 is $V_+$, the switch 106 is closed, and hence the signal can be fed through the switch 106. When the output of the XOR operation circuit 104 is 0, the switch 106 is opened, and hence the signal cannot be fed through the switch 106. The square operation circuit 107 squares the input signal, and outputs the squared signal. An integration circuit 108 receives and integrates the output signal of the square operation circuit 107. An integration circuit 109 receives and integrates the output signal of the XOR operation circuit 104. A divider 110 divides the output signal of the integration circuit 108 by the output signal of the integration circuit 10g, and outputs the quotient. The output signal of the divider 110 provides the dispersed variation in signals of the signals h between SL1 and SL2. The standard deviation is the square root of the dispersion. When the dispersion is the minimum, the standard deviation is also the minimum.

Figure 25:
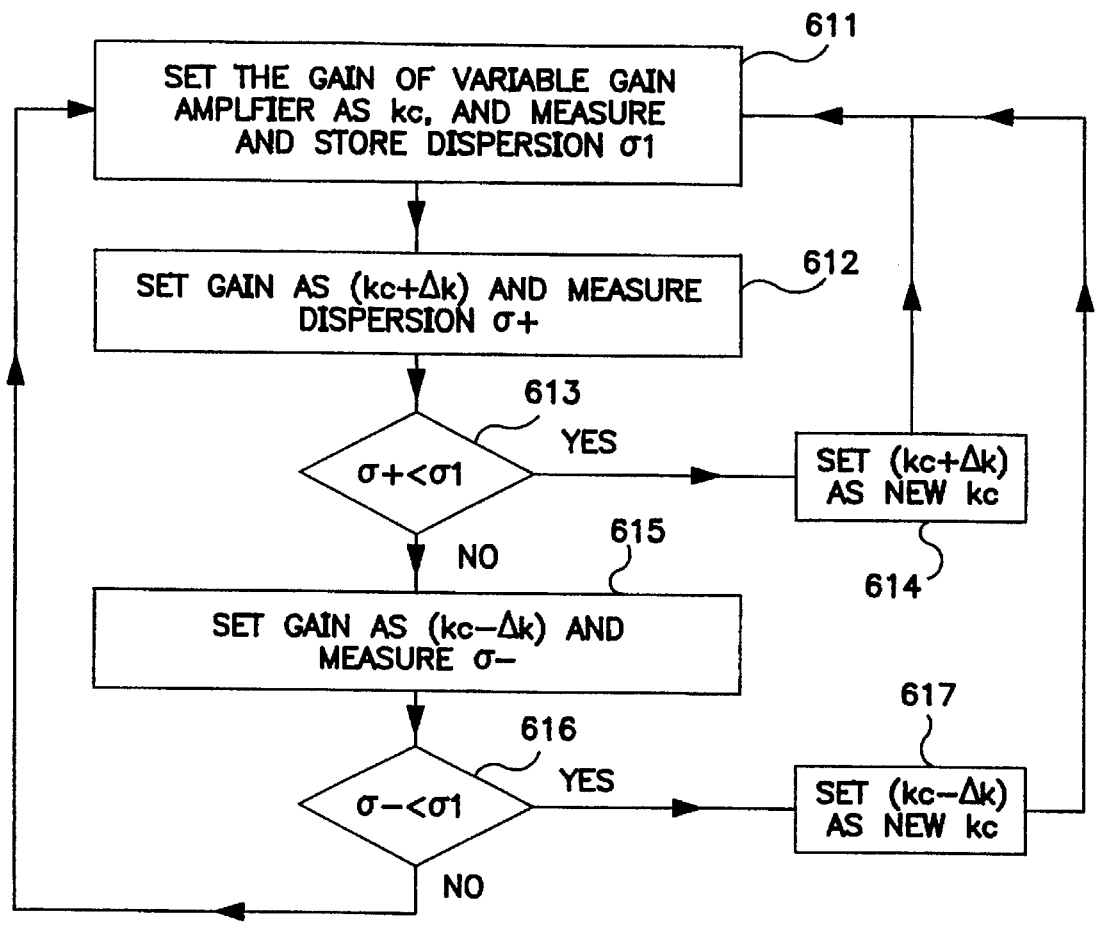
FIG. 25 is a flowchart by which the signal processor determines the gain of a variable gain amplifier in the sixth example of the invention.

FIG. 25 shows the algorithm for determining the gain of the variable gain amplifier 38 which executed in the signal processor 71 which receives the output signal providing the signal dispersion. In step 611, the gain of the variable gain amplifier 38 is set to be kc, and the dispersion of signals is measured for a predetermined time period. The measured dispersion is defined as σ1, and the dispersion σ1 is temporarily stored. Then, the process proceeds to step 612. In step 612, the gain of the variable gain amplifier 38 is increased by a small amount Δk, so that the gain is set to be (kc+Δk), and the dispersion of signals is measured for a predetermined time period. The dispersion is defined as $\sigma_+$, and the process proceeds to step 613. In step 613, $\sigma_+$ is compared with σ1. If $\sigma_+<\sigma1$, the process proceeds to step 614. If $\sigma_+\geq\sigma1$, the process proceeds to step 615. In step 614, (kc+Δk) is set as the new value of kc, and then the process returns to step 611. In step 615, the gain of the variable gain amplifier 38 is decreased, by a small amount Δk, so that the gain is set to be (kc−Δk), and the dispersion of signals is measured for a predetermined time period. The dispersion is defined as $\sigma_-$, and then the process proceeds to step 616. In step 616, $\sigma_-$ is compared with σ1. If $\sigma_-<\sigma1$, the process proceeds to step 617. If $\sigma_-\geq\sigma1$, the process returns to step 611. In step 617, (kc−Δk) is set as the new value of kc, and then the process returns to step 611. By repeatedly performing this process, the value of kc is converged so as to be a value for maximizing dispersion.

Figure 26:
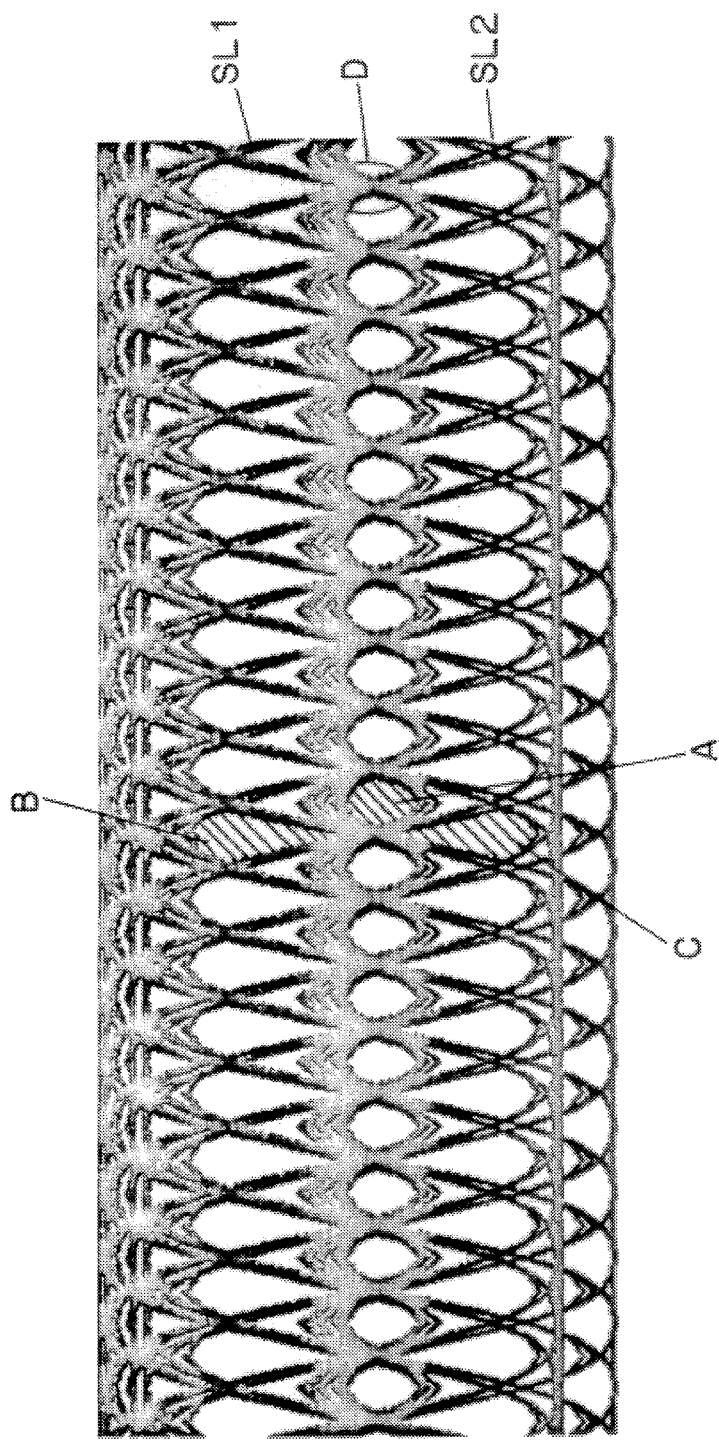
FIG. 26 shows the eye pattern obtained by using a crosstalk reducing device in the sixth example of the invention.

FIG. 26 shows the relationship among the eye pattern obtained by using the crosstalk reducing device in this example, the two threshold values SL1 and SL2, and the signal D. In this example, the conditions such as the wavelength of the light source, NA of the object lens and the track pitch are the same as those in the first example. As the dispersion index of signal D, the standard deviation is used. In the case where the crosstalk reducing device in This example is used, the opening ratios of the eyes A, M, and C are IA/I=13.9%, IB/I=29.8%, and IC/I=26.8%, respectively this means that all eyes open well. In This example, the same as in the first example, any preamble signal and reference signal are not required. Thus, the applicability of the crosstalk reducing device in this example is remarkably widened. According to the crosstalk reducing device in this example, the usual eye A used for the usual signal detection as, well as the eyes B and C which are used for signal detection in partial response open very well. That is, only by specifically viewing the dispersion index of one signal D, both the eyes B and C which are used for signal detection in partial response can be optimized. Accordingly, as compared with examples using other cross-talk reducing devices, the circuit scale can be greatly reduced, and the circuit can be produced at a lower In this example, the disperse index of the signal D is processed as the standard deviation. Alternatively, if the disperse index may be processed as a difference between the maximum value and the minimum value of the signal D, the same effects can be attained. In another case where there is a strong correlation between the digital information recorded in a desired track on the information recording medium and the digital information recorded in tracks adjacent to the desired track, it is preferable to process dispersion as the difference between the maximum value and the minimum value of the signal D, in order to stably open the eyes well.

EXAMPLE 7

Figure 27:
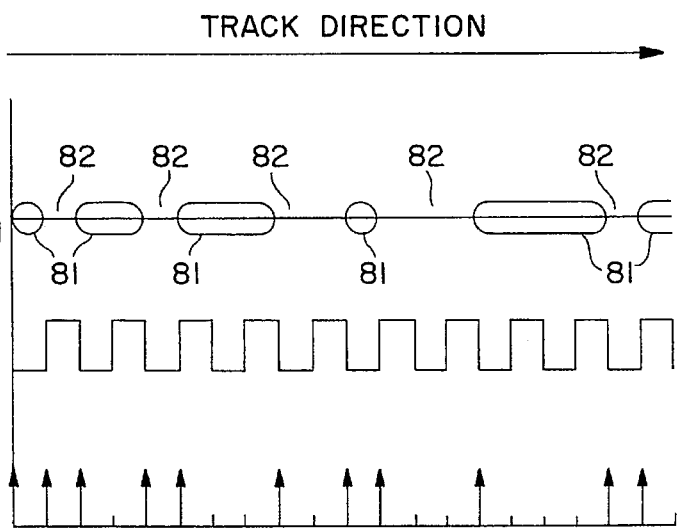
FIG. 27 shows the relationship between digital information and clock signals in a seventh example of the invention.

As the seventh example, FIG. 27 shows the relationship between the digital information (a) recorded on the information recording medium 4 and the sampling timing (c). The crosstalk reducing device in this example is constructed in substantially the same manner as in the sixth example. The seventh example is different from the sixth example in the following point. In the sixth example, the sample and hold circuit 70 performs the sample and hold operation at the timing indicated by the rising and falling edges of the clock signal C3. In this example, the sample and hold operation is not performed at all of the timings indicated by the rising and falling edges of the clock signal C3. The sample and hold operation is performed at timings corresponding to the edge of digital information which is recorded as a mark 81 or space 82 on the information recording medium 4. In order to judge whether the timing corresponds to the edge of the digital information or not, the slope (rate of change) of the signal output from the subtracter 39 shown in FIG. 16 is detected in the clock signal generator 72. The clock signal generator 72 supplies a trigger signal (a clock signal) indicated by the sampling timing shown in FIG. 27 to the sample and hold circuit 70.

Figure 28:
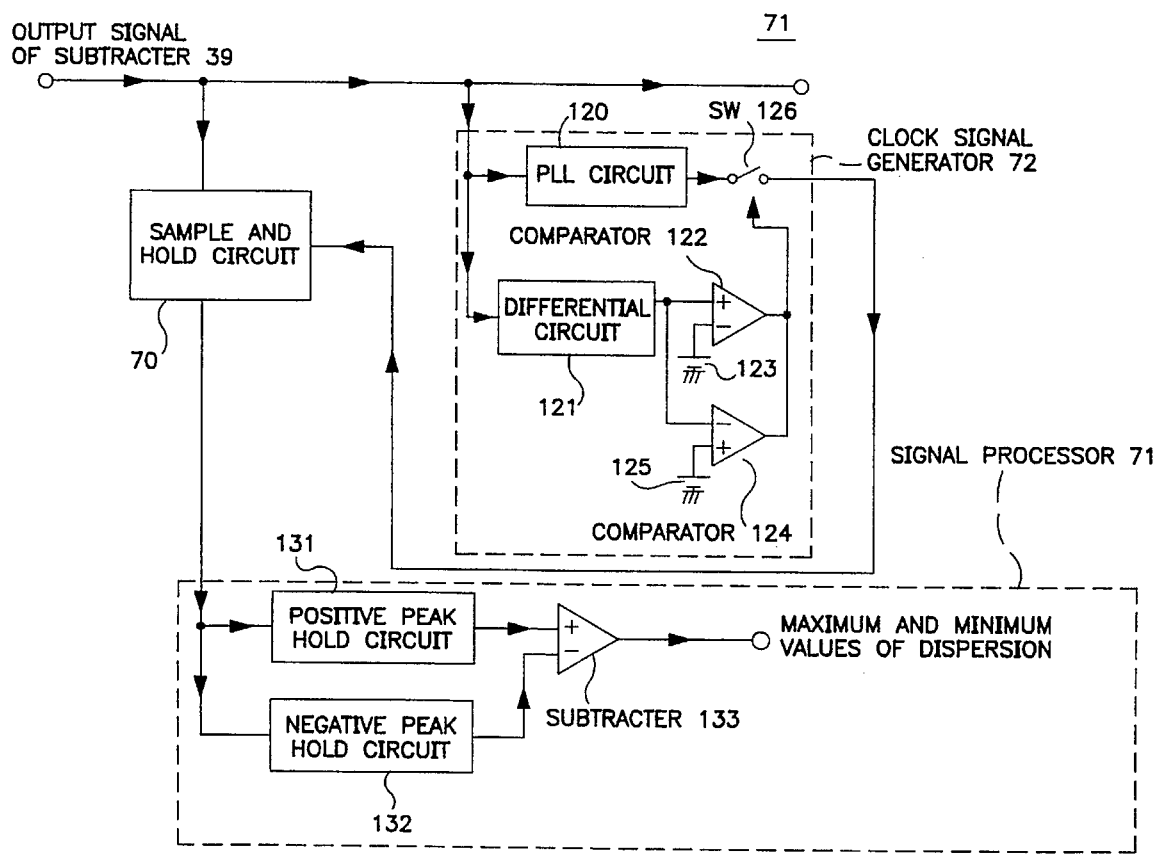
FIG. 28 shows the construction of an electric circuit system of a signal processor in the seventh example of the invention.

FIG. 28 shows the Construction of circuits in the clock signal generator 72 and the construction of a circuit for obtaining a difference between the maximum value and the minimum value as the dispersion index. In the clock signal generator 72, a PLL circuit 120 receives the output signal s from the subtracter 39, and generates a clock whose phase is synchronized with the phase of the signal s. A differential circuit 121 receives the signal s, and outputs a signal obtained by performing a differential operation to the signal s. The output signal from the differential circuit 121 is input into comparators 122 and 124, and is compared with a voltage v1 produced by a constant voltage source 123 and a voltage v2 produced by constant voltage source 125, respectively. The output signals of the comparators 122 and 124 control open/close of a switch 126 for connecting or disconnecting the output of the PEL circuit 120 to the external.

If the output signal of the differential circuit 121 is larger than v1 or smaller than v2, the switch 126 is closed, so that the clock signal is output the external. If the output signal of the differential circuit 121 is smaller than v1 and larger than v2, the switch 126 is opened, so that the clock signal is not output to the external. The clock signal output from the clock signal generator 72 is input into the sample and hold circuit 70, and controls the sampling period and the holding period.

The signal h output from the sample and hold circuit 70 is input into the signal processor 71. In the signal processor 71, the signal h is input into a positive peak hold circuit 131 and a negative peak hold circuit 132 which outputs the maximum value and the minimum value of the signal h, respectively. A subtracter 133 subtracts the output signal of the negative peak hold circuit 132 from the output signal of the positive peak hold circuit 131, and outputs a signal indicating the obtained difference. The signal output from the subtracter 133 provides the difference between the maximum value and the minimum value of the signal dispersion. The signal processor 71 optimizes the gain kc of the variable gain amplifier 38 so that the output signal of the subtracter 133 is minimized in accordance with the same algorithm as that shown in FIG. 25 in the sixth example.

With the construction shown in this example, the signal processor 71 does not necessitate the threshold values, so that the construction of the signal processor 71 can be simplified. In the signal processor 71, it is sufficient to minimize the signal dispersion by using all the signals output from the sample and hold circuit 70.

In addition, since the signal processor 71 has no threshold value in this example, it is possible to stably increase the opening ratio of the eye and the margin against the fluctuation of detection timing with high reliability, even when the intensity of the beam emitted from the light source is varied. In addition, since the process is performed by using the difference between the maximum value and the minimum value of the signal dispersion, it is not necessary to standardize the signals based on the number of crossings of the threshold value. Thus, the signal processor 71 can be simplified.

EXAMPLE 8

As the eighth example, an exemplary case where the output of the sample and hold circuit 70 is supplied to the signal processor 71 only when the light spot passes the edge of the mark 81 or space 82 recorded on the information recording medium 4 is described. The clock signal generator 72 generates a clock signal at the timing shown in FIG. 23 in the sixth example. The sample and hold circuit 70 samples and holds the signal s at the timing. In this example, as the signal disperses, an averaged value of absolute values of the signal is used.

Figure 29:
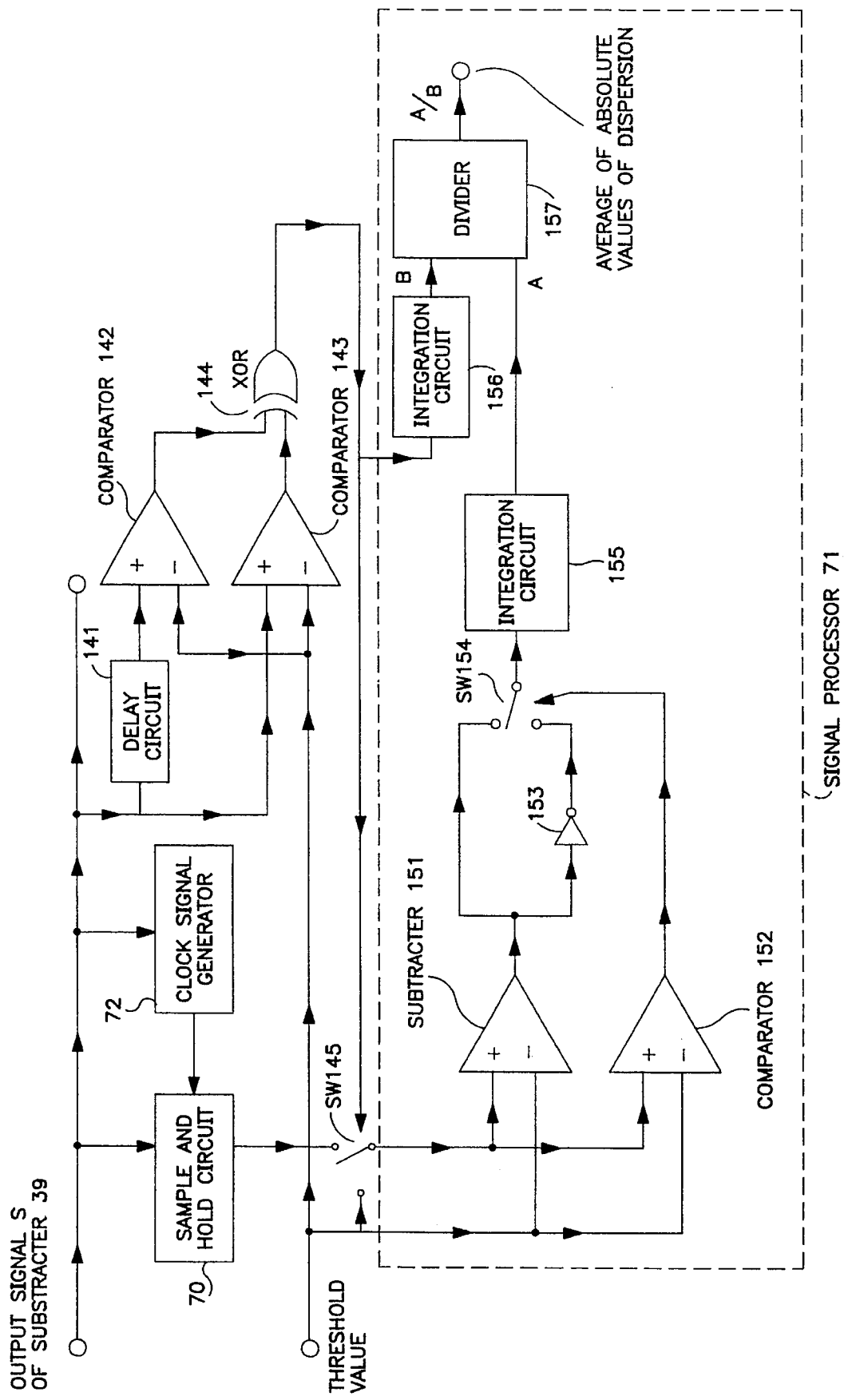
FIG. 29 shows the construction of an electric circuit system of a signal processor in an eighth example of the invention.

FIG. 29 shows the construction including a switch 145 for connecting or disconnecting the output signal h of the sample and hold circuit 70 to or from the signal processor 71, a circuit for controlling the open/close of the switch 145, and a circuit for calculating an averaged value of absolute values of dispersion in the signal processor 71. The signal s is input into a delay circuit 141 where the signal is delayed by $\tau$ ($\tau$=T/v:v is the relative speed of the optical pickup head apparatus with respect to the information recording medium, and T is the fundamental period of the information recorded on the information recording medium). The output signal of the delay circuit 141 and the signal s are input into positive inputs of comparators 142 and 143, respectively. To negative inputs of the comparators 142 and 143, a threshold value Vt in the reproduction of digital codes is input. Each of the comparators 142 and 143 outputs $V_+$ when the positive input is larger than the negative input, and outputs 0 when the positive input is equal to or smaller than the negative input. An XOR operation circuit 144 performs an XOR operation between the output signals of the comparators 142 and 143. The XOR operation circuit 144 outputs $V_+$ when one input signal is $V_+$ and the other input signal is 0, and outputs 0 when both of the signals are $V_+$ or when both of the input signals are 0. The switch 145 is controlled by the output signal of the XOR operation circuit 144.

The switch 145 receives the output signal h of the sample and hold circuit 70 and the threshold signal Vt, and outputs them to the signal processor the switch 145 transmits the output signal h of the sample and hold circuit 70 to the signal processor 71 when The output signal of the XOR operation circuit 144 is $V_+$, and transmits the threshold signal Vt to the signal processor 71 when the output signal of the XOR operation circuit 144 is 0. The signal processor 71 receives the selected signal from the switch 145 which is then input into positive inputs of a subtracter 151 end a comparator 152. To negative inputs of the subtracter 151 and the comparator 152, the threshold value Vt is input. The subtracter 151 subtracts the threshold value Vt from the output signal of the switch 145, and outputs e signal indicating the obtained difference. The output signal of the subtracter 151 is fed through two paths. In one path, the output signal directly input to a switch 154. In the other path, the positive or minus sign of the output signal is first inverted by an inverter 153 and then the inverted signal is input into the switch 154. The comparator 152 compares the output signal of the switch 145 with the threshold value Vt. The comparator 152 outputs $V_+$ when the output signal of the switch 145 is larger than the threshold value Vt, and outputs 0 when the output signal of the switch 145 is equal to or smaller than the threshold value Vt.

The switch 154 is controlled by the output signal of the comparator 152. The switch 154 transmits the output signal of the subtracter 151 to an integration circuit 155 when the output of the comparator 152 is $V_+$, and transmits the output signal of the subtracter 151 which has been inverted by the inverter 153 to the integration circuit 155 when the output of the comparator 152 is 0. The integration circuit 155 integrates the signals through the switch 154, and outputs the integration result. The integration result from the integration circuit 155 is input into a divider 157. The divider 157 also receives the integration result of an integration circuit 156. The integration circuit 156 receives and integrates the output signal of the XOR operation circuit 144, and outputs integration result. A divider 157 divides the output signal of the integration circuit 155 by the output signal of the integration circuit 156, and outputs the quotient.

The signal processor 71 optimizes the gain kc of the variable gain amplifier 38 so that the output signal of the divider 157 is minimized, in accordance with the same algorithm as that shown in FIG. 25 in the sixth example. In this example, the output of the sample and hold circuit is transmitted to the signal processor, only when the light spot passes the edge of the mark 81 or space 82 recorded on the information recording medium 4. Accordingly, it is sufficient for the clock signal generator to generate a clock signal at a given frequency, and for the sample and hold circuit to periodically sample and hold at the frequency. In this example, the signal dispersion is calculated as the average of absolute values of differences between the threshold value and the signal, so that the signal processor does not include a square operation circuit. Thus, the signal processor can be simplified. As to the accuracy, the degree of accuracy which is the same as attained in the case of standard deviation can be attained.

EXAMPLE 9

Figure 30:
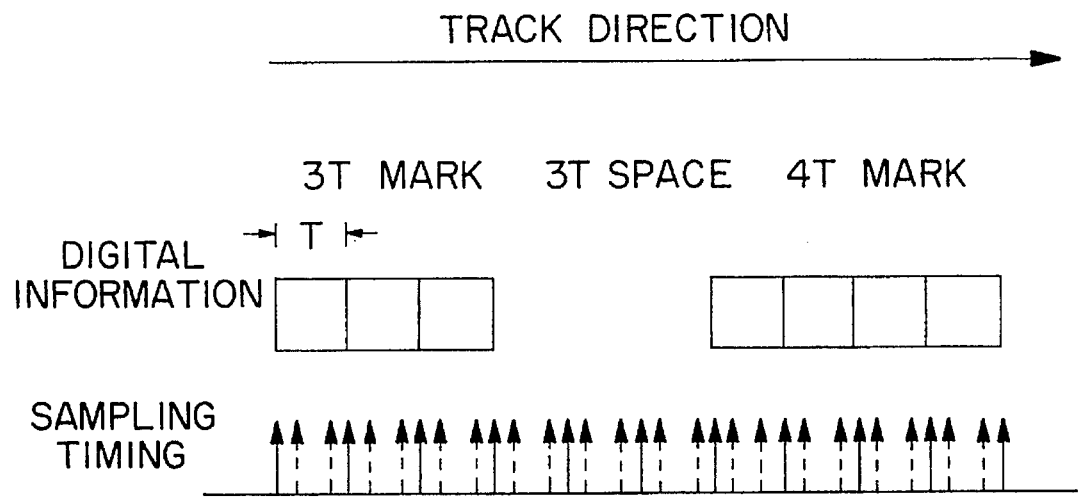
FIG. 30 shows the relationship between digital information and clock signals in a ninth example of the invention.

As the ninth example of the invention, FIG. 30 shows the relationship between the digital information recorded on the information recording medium and the sampling timing. Also in this example, information is digitally recorded as a mark or a space with a discrete length of integer multiple of T, where T is a fundamental period. In this example, specifically, the shortest period of the mark or space is 3T. In FIG. 30, in order to assist the understanding, a mark is indicated by rectangles. If the lengths of the marks or spaces recorded on the information recording medium are 3T, 4T, ..., 11T, the marks or spaces are regarded as a code which is generally referred to as EFM. In this example, if the crosstalk reducing device in the fourth example is used, the clock signals C1 and C2 are generated from the digital information recorded on the information recording medium 4, and it is sufficient to sample signals which are obtained at positions shifted by ±Ta with the positions T/2, 3T/2, ..., $(2n+1)T/2$ as centers shifted from the edges of marks or spaces. The sampling timings in this case are indicated by broken lane arrows in FIG. 30.

If the crosstalk reducing device in the sixth example is used, it is sufficient to sample signals which are obtained at positions 0, T, 2T, ..., nT from the edges of marks or spaces. The sampling timings An this case are indicated by arrows of solid line in FIG. 30.

The crosstalk reducing device according to the invention has no limitations in modulation methods. If, for example, the crosstalk reducing device is applied to information recording media on which information is recorded by various digital modulation methods, such as 1–7 and 2–7 modulations, good results can be attained.

EXAMPLE 10

As a tenth example of the invention, a crosstalk reducing device for reducing the crosstalk by irradiating a desired track with one beam is described. The construction of the optical system is the same as that shown in FIG. 14 in the third example. The arrangement of the photodetective portions on the photodetector 50 is the same as that shown in FIG. 15. The photodetector 50 consists of eight photodetective portions 507–514. The focusing error signal is obtained by performing a differential operation between the sum of signals output from the photodetective portions 509, 510, 511, and 512, and the sum of signals output from the photodetective portions 507, 508, 513, and 514. The tracking error signal is obtained by performing a differential operation between the sum of signals output from the photodetective portions 507, 508, 511, and 512 and the sum of signals output from the photodetective portions 509, 510, 513, and 514. The crosstalk reducing device in this example is constructed so that the sum of signals output from the photodetective portions 508, 509, 512, and 513 is input into the amplifier 35 as shown in FIG. 16, and the sum of signals output from the photodetective portions 507, 510, 511, and 514 is input to the variable gain amplifier 38. In this example, the delay circuits 32–34 are not required, so that the circuitry can be simplified. In the case where the rotation speed of the information recording medium 4 is changed, delay elements are not required and hence it is unnecessary to make the delay time variable. Accordingly, it is possible to stably reduce the crosstalk in an optical disk reproducing apparatus in which the relative speed of the information recording medium 4 with respect to 25 the light beam 20 varies depending on partial regions of the information recording medium 4.

If the optical system in this example is applied to any one of the fourth to ninth examples, the same effects can be attained. The crosstalk reducing device according to the invention is tolerable to an optical pickup head apparatus of any construction, insofar as the optical pickup head apparatus outputs a signal which mainly includes information recorded in a desired Track and signals which include information recorded in the adjacent tracks. It is appreciated that the detection method of the focusing error signal and the tracking error signal of the optical pickup head apparatus is not limited to any specific one.

EXAMPLE 11

Figure 31:
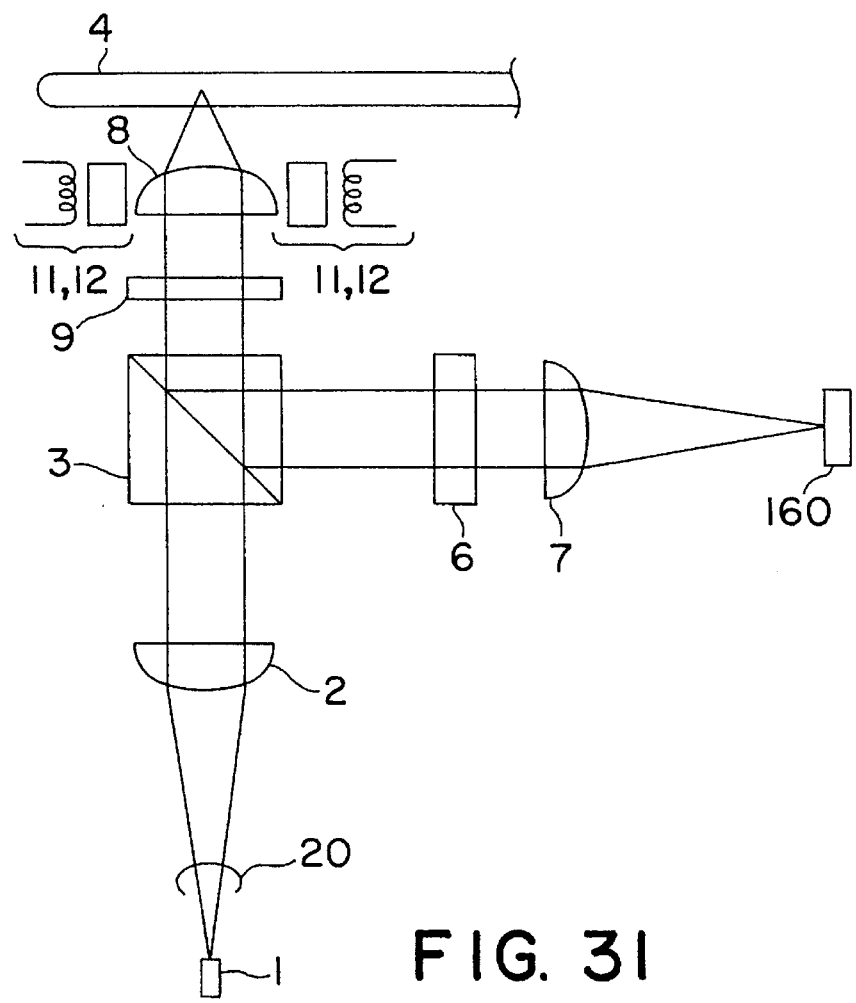
FIG. 31 shows the construction of an optical system of an optical information reproducing apparatus in an eleventh example of the invention.

As the eleventh example of the invention, an example for determining an optimum coefficient in an equalizer in an optical pickup head apparatus is described. FIG. 31 shows the construction of an optical system in this example. In the optical system shown in FIG. 31, the optical elements which can be the same as those in the optical system shown in FIGS. 1 and 14 are indicated by the same reference numerals as those used in FIGS. 1 and 14. In this example, the same as in the third example, the information recording medium 4 is irradiated by only one beam. However, this example is different from the third example with the arrangement of the photodetective portions of the photodetector 160.

Figure 32:
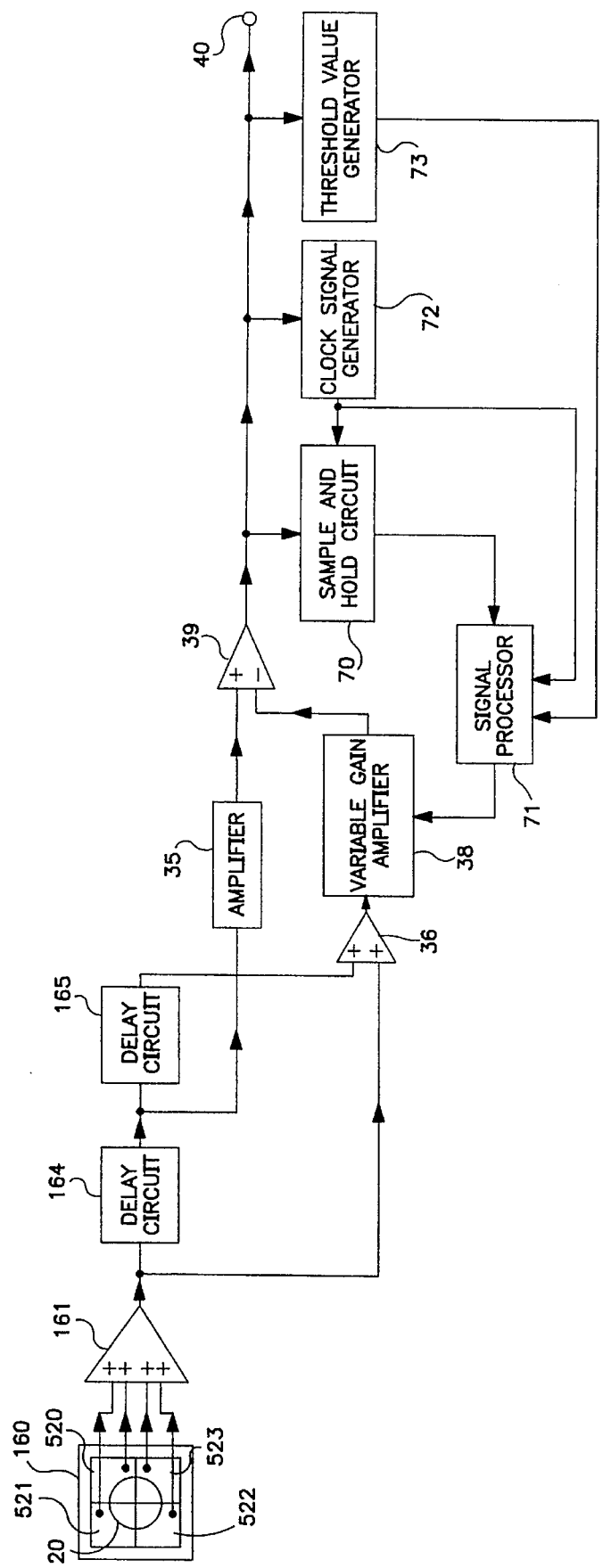
FIG. 32 shows the construction of a circuit system of the equalizer in the eleventh example of invention.

FIG. 32 shows the relationship between the arrangement of photodetective portions on the 160 and the light beam 20 received by the photodetector 160, and the construction of a circuit system. The photodetector 160 consists of photodetective portions 520–523. The light beam 20 is received by the photodetective portions 520–523. By performing the desired operations with signals output from the photodetective portions 520–523, the focusing error signal and the tracking error signal are obtained. Herein, the focusing error signal is obtained by an astigmatic method, and the tracking error signal is obtained by a push-pull method. The operation circuits for obtaining the focusing error signal and the tracking error signal are not shown. The focusing error signal is obtained by performing a differential operation between the sum of signals output from the photodetective portions 520 and 522 and the sum of signals output from the photodetective portions 521 and 523. The tracking error signal is obtained by performing a differential operation between the sum of signals output from the photodetective portions 520 and 521 and the sum of signals output from the photodetective portions S22 and 523. The focusing error signal and the tracking error signal are supplied to actuators 11 and 12 as shown in FIG. 31, respectively, so as to perform the focusing and tracking controls.

The information recorded in a desired track on the information recording medium 4 is obtained by adding the signals output from the photodetective portions 520–523 in an adder 161. The output from the adder 161 is input into a delay circuit 164 where the signal is delayed by a time τ. The output signal from the delay circuit 164 is input into a delay circuit 165 where the signal is delayed by a time τ. The fundamental time period t is determined by $\tau=T/v$, where v is the relative speed of the optical pickup head apparatus with respect to the information recording medium, and T is the fundamental, period of the information recorded on the information recording medium. An adder 36 receives and adds the output signals of the adder 161 and the delay circuit 165, and outputs the added result. An amplifier 35 receives and amplifies the output signal of the delay circuit 164, and outputs the amplified signal. The amplified signal is input into a subtracter 39. The subtracter 39 also receives an output from a variable gain amplifier 38. The variable gain amplifier 38 in which the gain thereof can be adjusted from a positive one to a negative one outputs a signal which is obtained by controlling the level or polarity of the output signal of the adder 36. The subtracter 39 subtracts the output signal of the variable gain amplifier 38 from the output signal of the amplifier 35, and outputs a signal indicating the obtained difference. The output signal of the subtracter 39 is output to a terminal 40. At this time, the signal output from the subtracter 39 is also input into the clock signal generator 72 and the sample and hold circuit 70. The clock signal generator 72 generates a clock signal which is synchronized with the digital information recorded on the information recording medium 4. The sample and hold circuit 70 samples and holds the signal output from the subtracter 39 at the timing indicated by the clock signal generated by the clock signal generator 72. The signal which is sampled and held in the sample and hold circuit 70 is input into the signal processor 71. The threshold value generator 73 receives the output signal of the subtracter 39 and generates a threshold value Vt for reproducing digital codes.

The signal processor 71 receives the signal output from the sample and hold circuit and the output signal of the threshold value generator 73, and outputs a control signal for controlling the gain of the variable gain amplifier 38.

The timing of the clock signal output from the clock signal generator 72 and the method by which the signal processor 71 controls the gain of the variable gain amplifier are the same as those in the crosstalk reducing devices in the optical information reproducing apparatus shown in the fourth to tenth examples. By determining a coefficient of the equalizer so that the opening amount of the eye pattern is increased or the signal dispersion at the crossing points of the signal and the threshold value is reduced, the information can be reproduced at a reduced error rate.

When both the equalizer and the cross-talk reducing device are used, the determinations of coefficients for the respective devices may be performed under the same conditions, or under the different conditions.

In the following twelfth to sixteenth examples, examples in which a coefficient is periodically varied in a synchronous manner with the signals recorded on the information recording medium in the equalizer according to the invention will be described.

EXAMPLE 12

Figure 33:
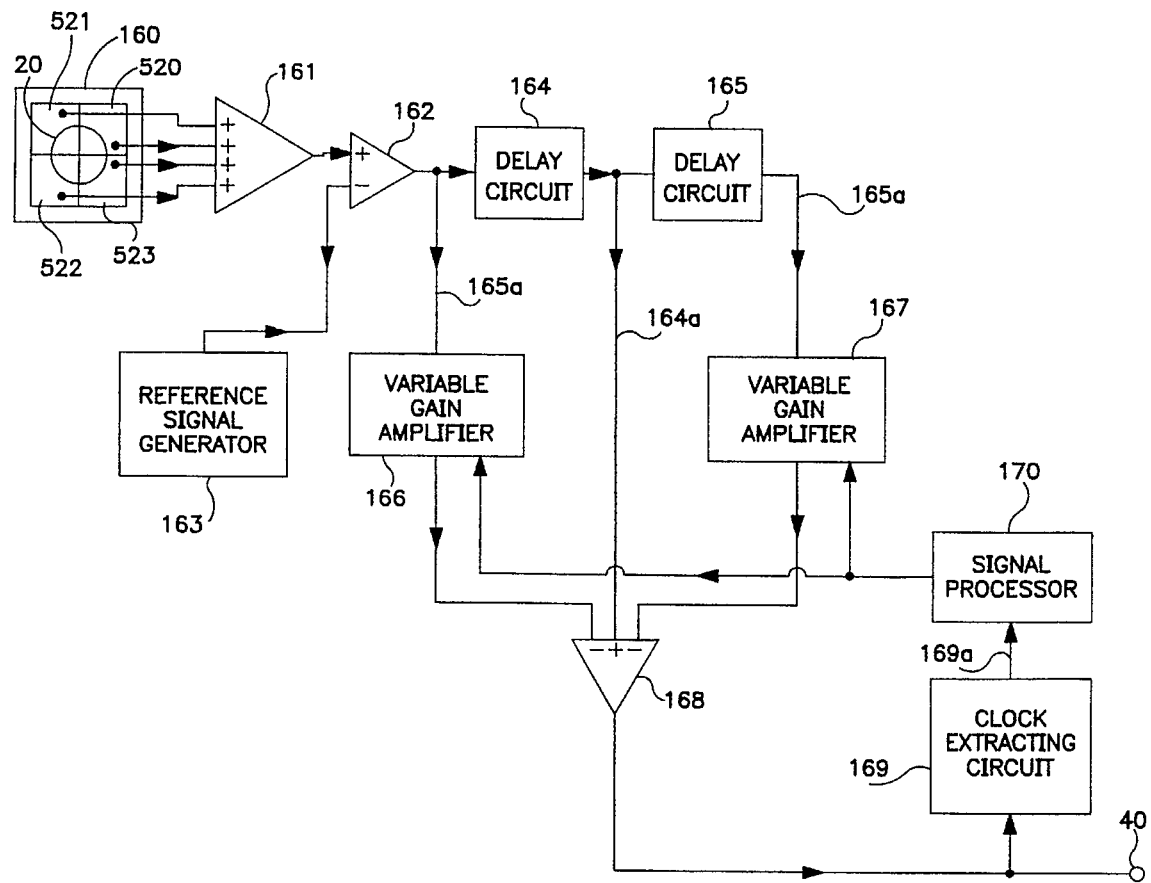
FIG. 33 shows the construction of a circuit system of an equalizer in a twelfth example of the invention.

As the twelfth example of the invention, an example in which the DC components are removed from signals, and the coefficient of the delay circuit is periodically varied by trigonometric functions. The optical system is the same as shown in the eleventh example and the construction thereof is shown in Figure 31. FIG. 33 shows the relationship between the arrangement of photodetective portions on the photodetector 160 and the light beam 20 received by the photodetector 160, and the construction is a circuit system. The photodetector 150 is constituted of photodetective portions 520–523. The light beam 20 is received by the photodetective portions 520–523. By performing desired operations to the signals output from the photodetective portions 520–523, the focusing error signal and the tracking error signal are obtained.

The information recorded in a desired track on the information recording medium 4 is obtained by adding the signals output from the photodetective portions 520–523 by an adder 161.

The output signal of the adder 161 is input into a subtracter 162. A signal from a reference signal generator 163 is also input into the subtracter 162 where the subtracting is performed. As a result, the DC components are removed from the signal output from the adder 161. The output of the subtracter 162 is input into a delay circuit 164 where the signal is delayed by a time $\tau$. The output signal of the delay circuit 164 is input into a delay circuit 165 where the signal is delayed by a time $\tau$. The fundamental time period $\tau$ is determined by $\tau=T/v$, where v is the relative speed of the optical pickup head apparatus to the information recording medium, and T is the fundamental period of the information recorded on the information recording medium. The output signal from the delay circuit 164 is a main signal 164a, and the signal from the delay circuit 165 and the output signal from the subtracter 162 which is not delayed constitute an adjacent signal group 165a.

The output signal from the subtracter 162 is input into a variable gain amplifier 166 in which the signal is multiplied by a coefficient k. The output signal from the delay circuit 165 is input into a variable gain amplifier 167 in which the signal is multiplied by the coefficient k. The main signal 164a and the output signals from the variable gain amplifiers 166 and 167 are input into an operation circuit 168. The operation circuit 168 subtracts the adjacent signal group 165a which is multiplied by k from the main Signal 164a. The signal output from the operation circuit 168 is obtained from the output terminal 40. The signal output from the operation circuit 168 is also input into a clock signal generator 169 which generates a clock signal 169a having a period t which is synchronized with the information recorded on the information recording medium 4. The clock signal 169a is input into a signal processor 170. The signal processor 170 controls the variable gain amplifiers 166 and 167 so that the gains of the variable gain amplifiers 166 and 167 are periodically varied in a synchronous manner with the clock signal 169a.

Figure 34:
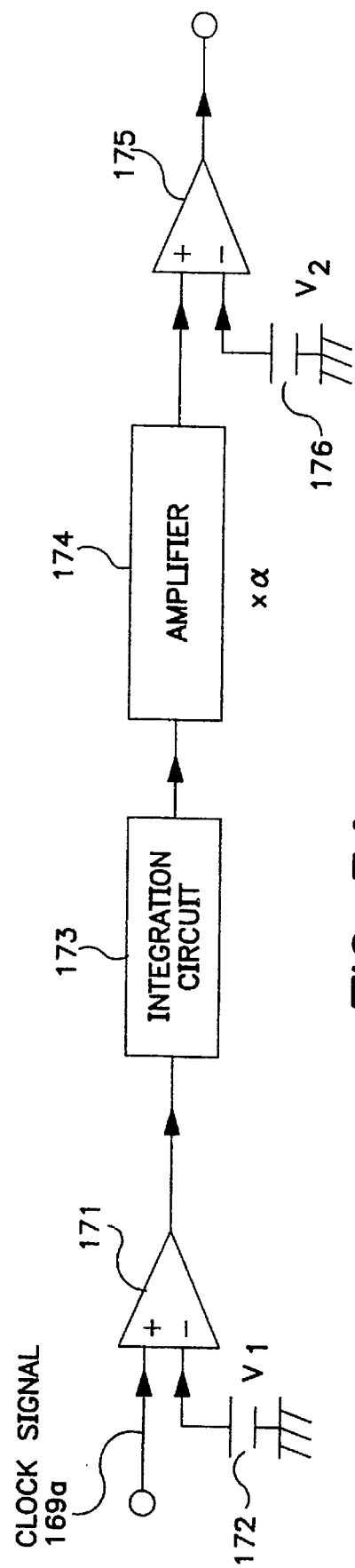
FIG. 34 shows the construction of a signal processor of the equalizer in the twelfth example of the invention.
Figure 35A:
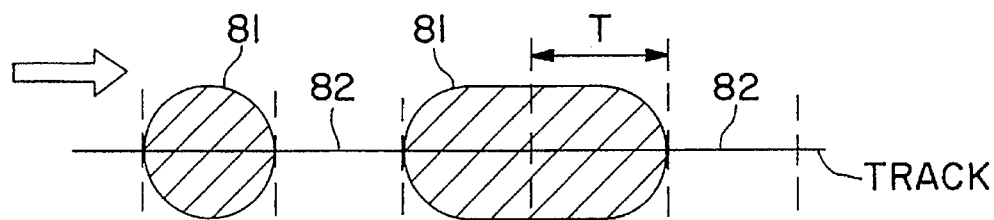
FIG. 35 shows the relationship among information recorded on an information recording medium, a signal input into a clock signal generator, a clock signal output from the clock signal generator, and the gain of a variable gain amplifier in the twelfth example of the invention.
Figure 35B:
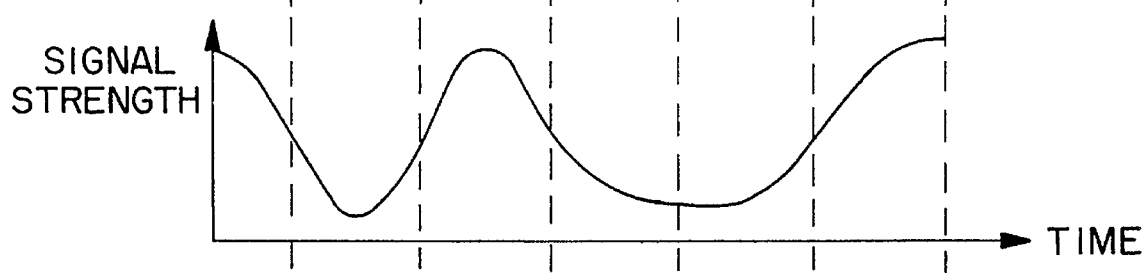
Figure 35C:
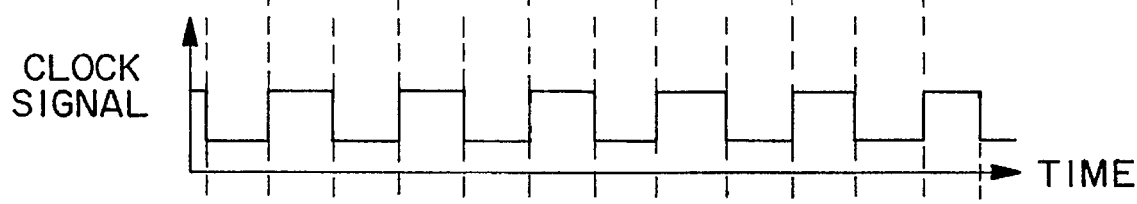
Figure 35D:
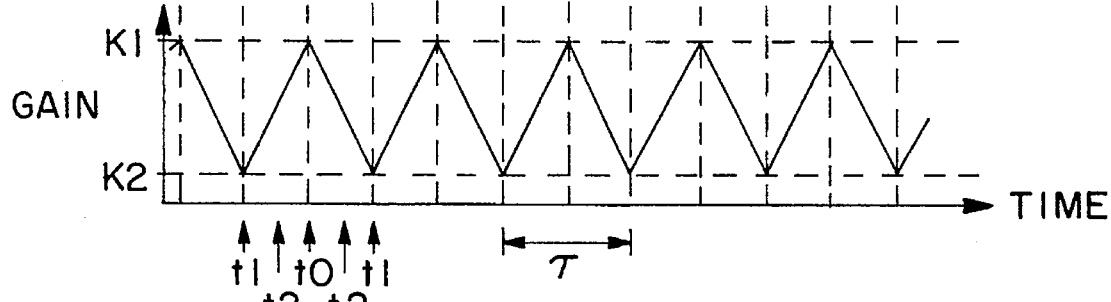

The construction of the signal processor 170 is shown in FIG. 34. The clock signal 169a generated by the clock signal generator 169 is input into a subtracter 171. A voltage V1 produced by a constant voltage source 172 is also input into the subtracter 171. The subtracter 171 subtracts the voltage V1 from the clock signal 189a, and outputs a signal indicating the obtained difference. Herein, it is assumed that the clock signal has the period $\tau$, and the periods of the voltages $V_+$ and $V_-$ are equal to each other, i.e., 50% each. The voltage V1 is the averaged value of $V_+$ and $V_-$. Accordingly, the signal output from the subtracter 171 has no DC component. An integration circuit 173 receives and integrates the output signal of the subtracter 171, and outputs the integration result. The output signal of the integration circuit 173 has a triangular waveform. An amplifier 174 receives the output signal of the integration circuit 173 and multiplies the output by $\alpha$. A subtracter 175 subtracts a voltage V2 produced by a constant voltage source 176 from the output signal of the amplifier 174, and outputs a signal indicating the obtained difference. The output signal of the subtracter 175 is the gains of the variable gain amplifier 166 and 167. The gain $\alpha$ of the amplifier 174 is given by $\alpha=(k1-k2)/Vs$, where Vs is the amplitude of the output signal of the integration circuit 173, and k1 and k2 are the maximum and minimum gains of the variable gain amplifiers 166 and 167. The voltage V2 produced by the constant voltage source 176 is obtained by V2=−k2.

The variation manner of the gains of the variable gain amplifiers 166 and 167 is shown in FIG. 35. Marks 81 or spaces 82 are arranged in a track as shown in (a) of FIG. 35. When the optical spot is moved in the direction indicated by an arrow, the signal obtained from the terminal 40 is varied as shown in (b) of FIG. 35 in which the horizontal axis indicates the time and the vertical axis indicates the signal strength. The clock signal 169a generated by the clock signal generator 169 is shown in (c) and the gains of the variable gain amplifiers 166 and 167 are shown in (d). The horizontal axis indicates the time and the vertical axis indicates the gain. The timing at which a desired position is located apart from the edge of a mark or space recorded on the information recording medium by an odd multiple of T/2 is represented by t0, a timing shifted from to by τ/2 is represented by t1, and timings shifted from t1 by ±τ/4 are represented by t2.

In this example, the control is performed in such a manner that the output signal of the subtracter 175 has a triangular waveform so that the gain at the timing to is k1 and the gain at the timing t1 is k2 (k1>k2).

Figure 36:
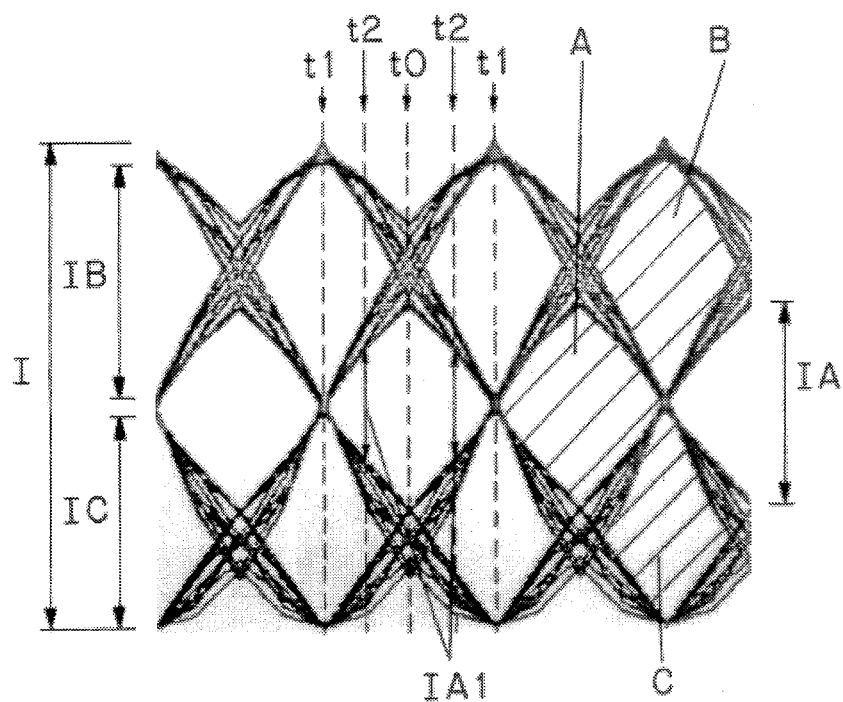

FIG. 36 shows the eye pattern obtained by using the equalizer in this example in the case where digital information which is recorded at a fundamental period T=the shortest mark length m the shortest space length=0.425 µm is to be reproduced by an optical system with the light source wavelength λ=680 nm, and the numerical aperture of the object lens NA=0.6. In FIG. 36, the gains of the variable gain amplifiers 166 and 167 are set to be k1=0.30 and k2=0.05. The delay time in the delay circuits 164 and 165 is set to be z which corresponds to T. In FIG. 36, a region A is an eye used for the usual signal detection, and regions B and C are eyes used for the signal detection in partial response. Herein, the usual code detection means a code detection method in which the digital information is judged by whether the signal at the timing t0 is larger or smaller than a certain threshold value. The whole amplitude of the signal is represented by I, an amplitude in the region A at the timing to is represented by IA, amplitudes in the regions B and C at the timing t1 are represented by IB and IC, respectively, and an amplitude in the region A at the timing t2 is represented by IA1. The opening ratios of the eyes are represented by IA/I, IB/I, and IC/I, respectively. The opening ratio of the region A at the timing t2 is represented by IA1/I. According to the equalizer of this example, the opening ratios of the eyes are IA/I=41%, IB/I=49%, and IC/I=43%, respectively. The opening ratio of the region A at he timing t2 is IA1/I=23%.

FIGS. 37A and 37B show exemplary eye patterns obtained as the result of equalization without changing the gain along the time axis, in the case where digital information which is recorded at a fundamental period T=the shortest mark length=the shortest space length=0.425 µm is to be reproduced by an optical system with the light source wavelength λ=680 nm, and the numerical aperture of the object lens NA=0.6. In FIG. 37A (a conventional example a), the gains of the variable gain amplifiers 166 and 167 are set to be k1=k2=0.05. In FIG. 37B.(a conventional example b), the gains of the variable gain amplifiers 166 and 167 are set to be k1=k2=0.30. The delay time in the delay circuits 164 and 65 is determined to be τ which corresponds to T. According to the conventional example a, the opening ratios of the eyes are IA/I=29%, IB/I=49%, and IC/I=43%, respec- tively. In the conventional example a, the opening ratio of the region A at the timing t2 is IA1/I =20%. According to the conventional example b, the opening ratios of the eyes are IA/I=43%, IB/I=13%, and IC/I=7%, respectively. In the conventional example b, the opening ratio of the region A at the timing t2 is IA1/I=12%. Therefore, IA/I in this example is improved 1.41 times compared with the conventional example a, and is as good as that in the conventional example b. The opening ratio IA1/I in this example is improved 1.15 times compared with the conventional example a and is improved 1.92 times compared with the conventional example b. The opening ratio IB/I in this example is as good as that in the conventional example a and is improved 3.77 times compared with the conventional example b. The opening ratio IC/I in this example is as good as that in the conventional example a, and is improved 6.14 times compared with the conventional example b.

Also in the conventional example a, the region A is not so large at both timings t0 and t2. In the conventional example b, the opening ratio of the eye at the timing t0 of the region A is high, but when the timing is shifted to t2, the opening ratio of the eye is rapidly reduced.

As is seen from the above description, in the case of the use of the equalizer in this example, the opening ratio of the region A at the timing t0 is slightly inferior to that in the conventional example b, but is remarkably improved as compared with the conventional example a. Accordingly, the noise margin during the code detection is increased. In addition, the opening ratio at the timing t2 is greatly improved as compared with both of the conventional examples. That is, the opening ratio of the eye at the timing t2 can be increased, while the opening ratio at the timing t0 is kept high. If the opening ratio of the eye at the position shifted from the timing t0 in the region A (e.g., at the timing t2) is increased, the margin against the fluctuation of detection timing during the code detection can be increased. As described above, the error rate in the reproduction of the information recorded on the information recording medium is reduced.

Moreover, the opening ratios of the eyes in the regions B and C are as high as those in the conventional example a in which the opening ratios of the eyes are sufficiently high. Therefore, the noise margin during the code detection in partial response is increased, and the error rate in the reproduction of the information recorded on the information recording medium is reduced. Thus, the information can be reproduced with high reliability.

As a specific effect of this example, it is sufficient to vary the gain so as to have a triangular waveform. Accordingly, the signal processor 170 and the variable gain amplifiers 166 and 167 can be implemented by simple circuits.

In this example, a DC component is removed from the signal prior to the input to the variable gain amplifiers. Accordingly, if the signal from the optical pickup head apparatus includes a DC offset signal, the offset can be previously removed. Therefore, the margin against the fluctuation of detection timing cannot be deteriorated, even if the gains of the variable gain amplifiers are varied along the time axis.

In this example, the optical pickup head apparatus uses only one beam, so that the constructions of the optical system and the light source can be simplified. In addition, by implementing the delay circuit in an analog manner, the circuit system can be realized with a reduced number of circuit elements.

In this example, the subtraction from the reference signal is performed in order to remove the DC component. Alternatively, if a signal generated from the reference signal generator 163 is changed depending on the conditions, various offsets can be accommodated. Thus, a signal with good quality can be obtained.

Alternatively, it is possible to vary the gain in a sine manner. In this case, the signal processor 170, and the variable gain amplifiers 166 and 167 can be implemented by simple circuitry. The resulting opening ratios of eyes can be as high as those in the case of triangular waveform.

In this example, the equalization ks performed based on the information recorded at three different positions by using two delay circuits. It is appreciated that the equalization may be performed based on the information recorded at a larger number of different positions by using a larger number of delay circuits. Alternatively, it is possible to perform the equalization based on the information recorded at two different positions by using only one delay circuit. The equalization in such a case is represented by mathematical expressions. Herein, N is an arbitrary natural number, and i is an integer equal to or smaller than N. It is assumed that the ith variable gain amplifier outputs a signal which is obtained by multiplying the input signal by $k_i$, the main signal mainly including the information recorded at a desired position in a desired track is represented by S(0), and a signal obtained by removing low-frequency components from the signal including the information recorded at a position located apart from the desired position by x is represented by S'(x). In addition, $n_1$ to $n_N$ are integers excluding 0 which are not overlapped, and adjacent signal groups are represented by $S'(n_1 \cdot T), S'(n_2 \cdot T), \ldots, S'(n_N \cdot T)$. When a signal represented by the following expression is output, the equalization can be performed.

$$S(0)-k_1 \cdot S'(n_1 \cdot T)-k_2 \cdot S'(n_2 \cdot T) \ldots -k_N \cdot S'(n_N \cdot T)$$

In general, it is preferable that an amplitude and an average value of the change of a coefficient k by which a signal including the information recorded remotely from the desired position among the adjacent signal groups is multiplied are smaller than those of the change of a coefficient k by which a signal including the information recorded close to the desired position is multiplied. Accordingly, the equalizing method end the equalizer of the invention are effective in a case where the intersymbol interference widely occurs, end a case where the intersymbol interference asymmetrically occurs forwardly and backwardly.

In this example, the delay circuit which outputs a signal delayed by a given time performs the process in an analog manner. In an alternative effective example, a signal is digitized by an analog/digital converter, and stored in a memory. After a given time has elapsed, the signal is read out from the memory, and converted into an analog signal which is output. Alternatively, the time delay can be implemented by a digital value operation circuit in which the digitized signal is used as the digital data and the same operations as those described in the invention are performed to the digital data.

In this example, the variable gain amplifiers perform the amplification without inversion, and the signals are subtracted in the operation circuit 168. It is appreciated that if the variable gain amplifiers may perform the amplification with inversion, and signals may be added in the operation circuit 168, the same effects can be attained. Moreover, the operation circuit and the variable gain amplifiers can be implemented as a single element.

In this example, the control of the gain of the variable gain amplifier is equivalent to the control of a coefficient by which the adjacent signal groups are multiplied.

EXAMPLE 13

As the thirteenth example, another variation of the gain of the variable gain amplifier is described. The constructions of the optical system and the circuit system are the same as those in the twelfth example. The same reference numerals are used as those in FIGS. 31 and 34.

Figure 38:
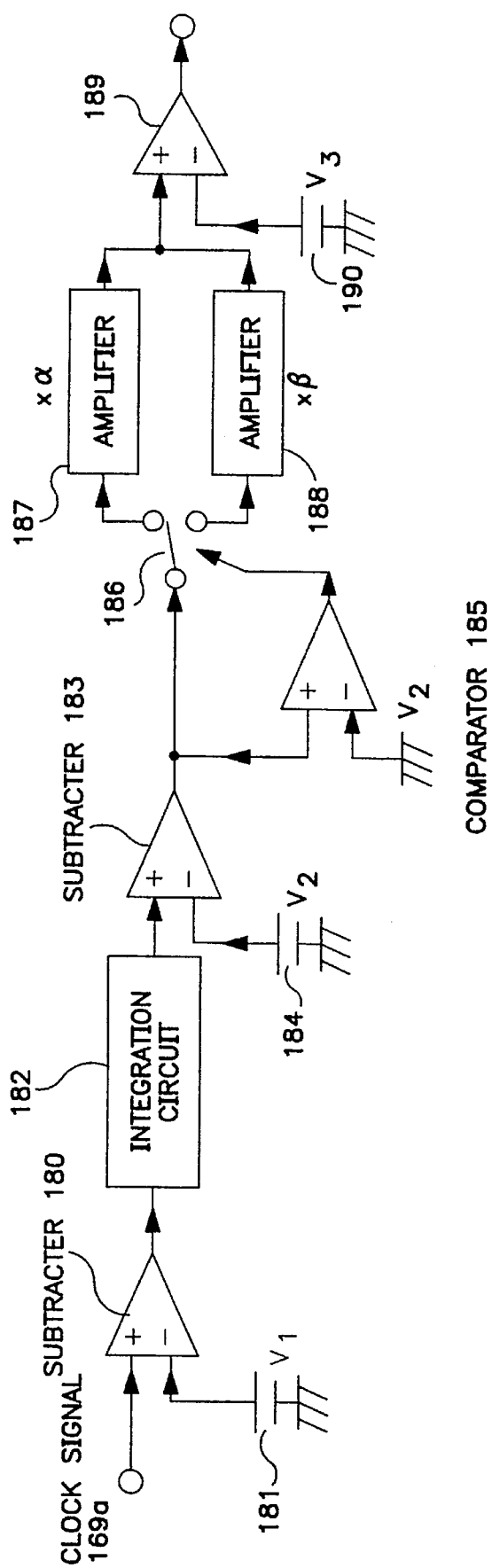
FIG. 38 shows the construction of a signal processor in an equalizer in a thirteenth example of the invention.
Figure 39A:
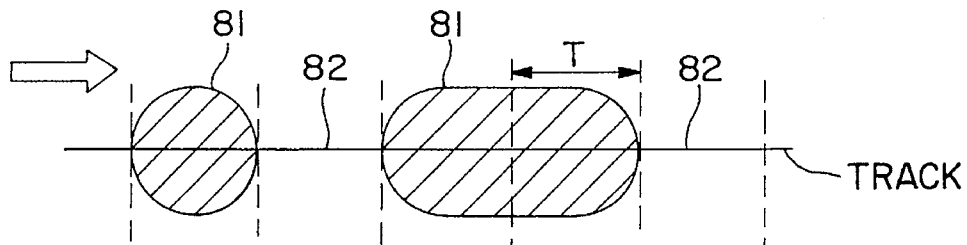
FIG. 39 shows the relationship among information ion recorded on an information recording medium, a signal input into a clock signal generator, a clock signal output from the clock signal generator, and the gain of a variable gain amplifier in the thirteenth example of the invention.
Figure 39B:
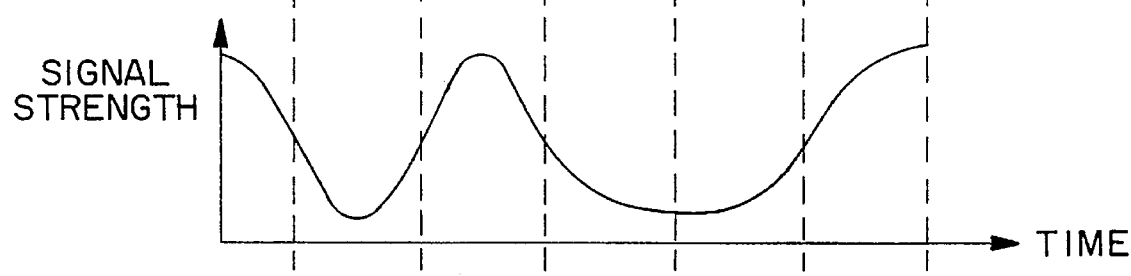
Figure 39C:
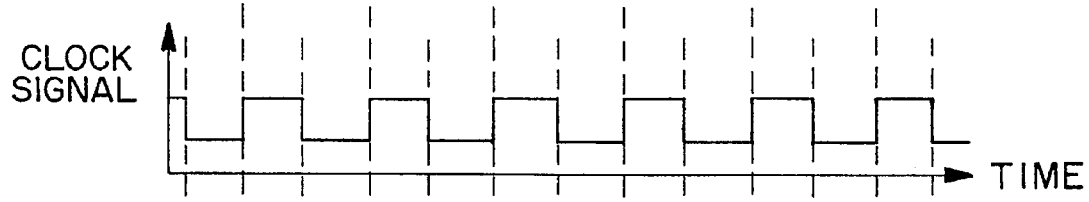
Figure 39D:
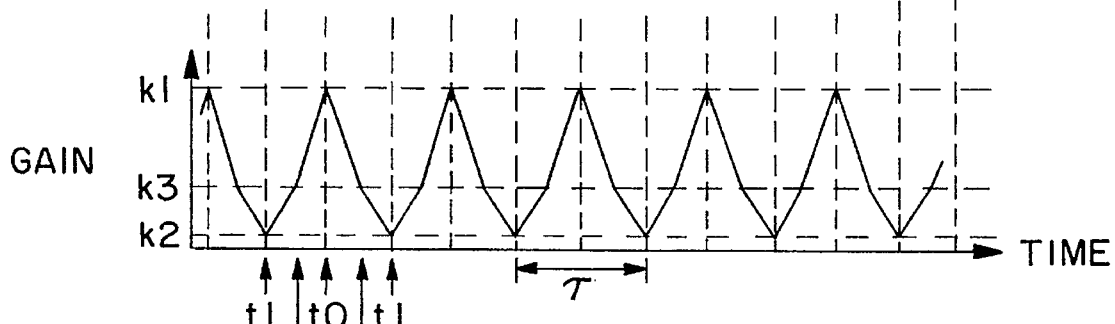

In this example, the signal processor 170 is controlled so that the gains of the variable gain amplifiers 166 and 167 are varied as a polygonal line in a synchronous manner with the clock signal 169*a*. The construction of the signal processor 170 in this example is shown in FIG. 38. The clock signal 169*a* generated by the clock signal generator 169 is input into a subtracter 180. A voltage V1 produced by a constant voltage source 181 is also input into the subtracter 180. The subtracter 180 subtracts the voltage V1 from the clock signal 169*a*, and outputs a signal indicating the obtained difference. An integration circuit 182 receives and integrates the output signal of the subtracter 180, and outputs the integration result. The integration result is input into the positive input terminal of a subtracter 183. The subtracter 183 subtracts a voltage V2 produced by a constant voltage source 184 from the output from the integration circuit 182, and outputs a signal indicating the obtained difference. A comparator 185 receives the output signal of the subtracter 183, and compares the output signal with a voltage of 0. The comparator 184 outputs $V_+$ when the output signal of the subtracter 183 is equal to or larger than 0, and outputs $V_-$ when the output signal is smaller than 0. A switch 186 receives the output of the comparator 185 and switches the destination of the output signal of the subtracter 183. The switch 186 sends the output signal of the subtracter 183 to an amplifier 187 when the output signal of the comparator 185 is $V_+$, and sends output signal of the subtracter 183 to an amplifier 188 when the output signal of the comparator 185 is $V_-$. The amplifier 187 outputs a signal obtained by multiplying the input signal by $\alpha$. The amplifier 188 outputs a signal obtained by multiplying the input signal by $\beta$. A subtracter 189 subtracts a voltage V3 produced by a constant voltage source 190 from the output signal of the amplifier 187 or 188, and outputs a signal indicating the obtained difference. The output signal of the subtracter 189 is the gains of the variable gain amplifiers 166 and 167.

With the construction of the signal processor 170 shown in FIG. 38, the gains of the variable gain amplifiers 166 and 167 are varied as is shown in FIG. 39. In FIG. 39, (a) to (c) are the same as those in FIG. 35. The variation of the gains of the variable gain amplifiers 166 and 167 in this example is shown in (d) of FIG. 39. In (d) of FIG. 39, the horizontal axis indicates the time and the vertical axis indicates the gain. The timing at which a desired position is located apart from the edge of a mark or space recorded on the information recording medium by an odd multiple of T/2 is represented by t0, a timing shifted from t0 by $\tau/2$ is represented by t1, and timings shifted from t1 by $\pm\tau/4$ are represented by t2. In this example, there are a gain k1 at the timing t0, a gain k2 at the timing t1 (k1>k2), and a gain k3 at the timing t2. In this example, as shown in FIG. 38, V1 is the average of the levels of clock signals. It is assumed that an amplitude of the output signal of the integration circuit 182 is indicated by Vs, and the voltage V2 produced by the constant voltage source 184 is determined by V2=Vs/2. The gain $\alpha$ of the amplifier 187 is given by $\alpha=(k1-k3)/(Vs-V2)$. The gain $\beta$ of the amplifier 188 is given by $\beta=(k3-k2)/V2$. The voltage V3 produced by the constant voltage source 190 is determined by V3=−k2.

Figure 40:
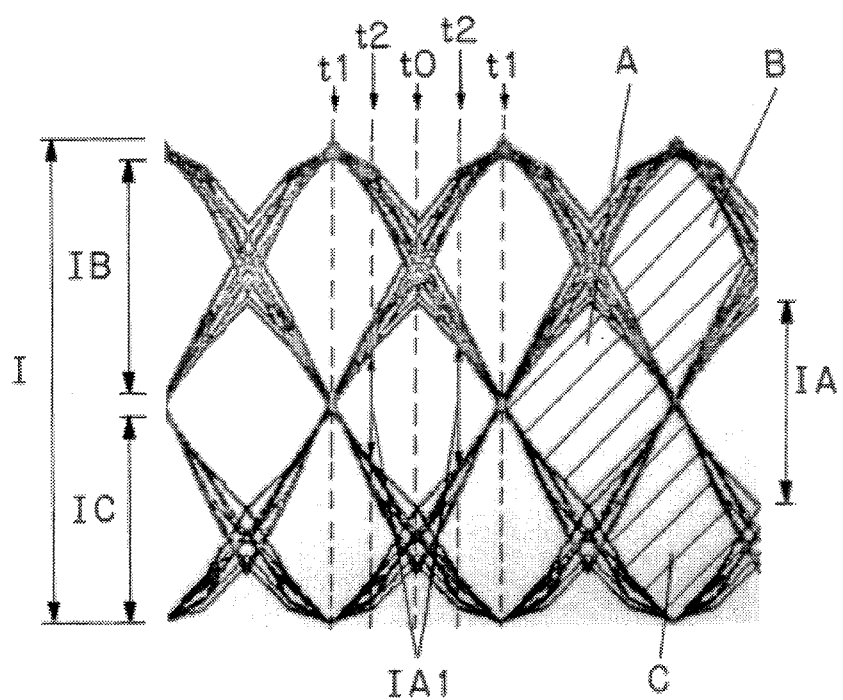
FIG. 40 shows the eye pattern obtained by using the equalizer in the thirteenth example of the invention.

The eye pattern which is obtained by using the equalizer in this example under the same conditions in the twelfth example is shown in FIG. 40. In FIG. 40, the gains are varied as a polygonal line so that k1=0.30, k2=0.05, and k3=0.20. In FIG. 40, the symbols A, B, C, I, IA, IB, IA1 are the same as those in FIGS. 36, 37A and 37B. The opening ratios of the eyes in the case of the equalizer in this example are IA/I=41%, IB/I=49%, and IC/I=43%, respectively. The opening ratio of the eye at the timing t2 in the region A is IA/I=24% in this example.

In the case of the equalizer in this example, the opening ratios of the eyes is various regions are as good as those in the twelfth example, and the opening ratio of the eye at the timing t2 in the region A is improved as compared with the twelfth example. Accordingly, the noise margin in the code detection is increased, and the margin against the fluctuation of detection timing during the code detection is increased as compared with the twelfth example. Therefore, the error rate in the reproduction of the information recorded on the information recording medium is reduced as compared with the twelfth example.

The opening ratios of the eyes in the regions B end C are as good as those in the twelfth example. Accordingly, the noise margin in the code detection in partial response is increased, and the error rate in the reproduction of the information recorded on the information recording medium is reduced.

Variations of gain other than the specific ones shown in the twelfth and thirteenth examples can attain the same effects. If the gain is smoothly varied as the desired position is moved, the obtained opening of the eye has the strong resistance against the fluctuation of detection timing, while the construction of the circuit system is complicated.

EXAMPLE 14

Figure 41:
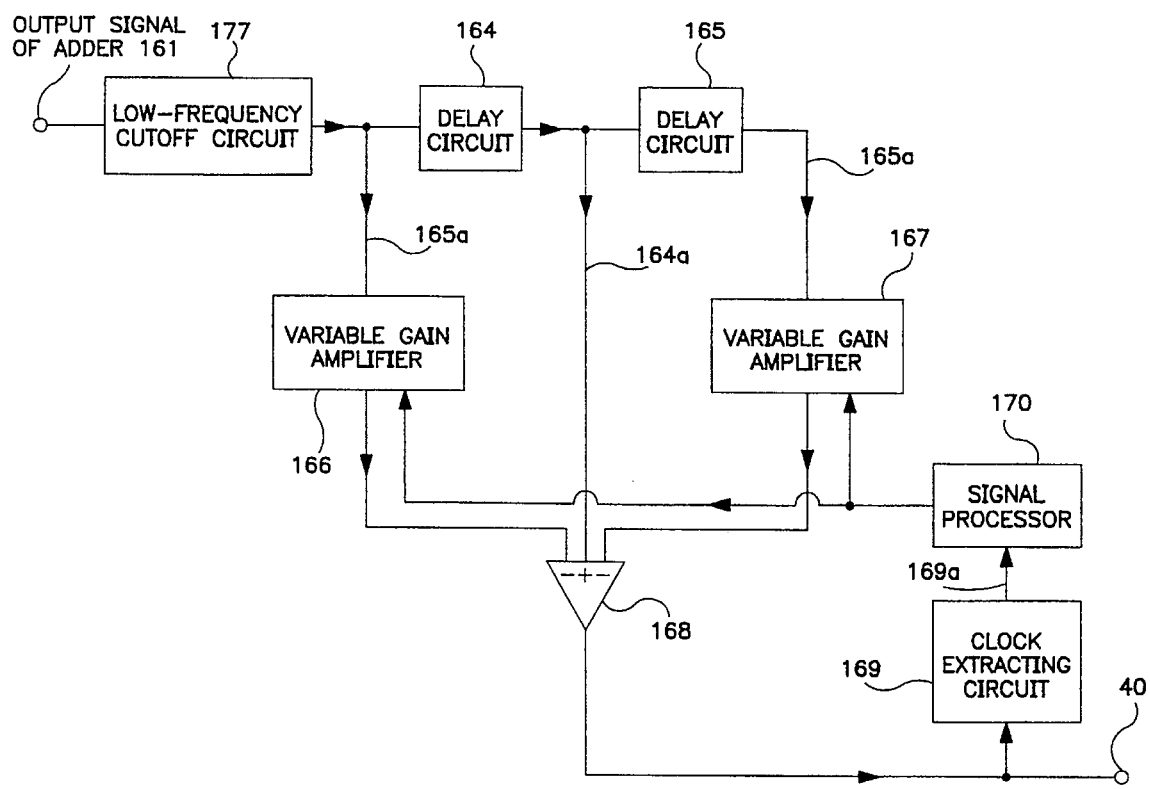
FIG. 41 shows the construction of a circuit system of an equalizer in a fourteenth example of the invention.

As the fourteenth example, an example in witch the lower-frequency components of the signal are removed by using a low-frequency cutoff circuit is described. The construction of the circuit system is shown in FIG. 41. The optical system in this example is the same as that in the twelfth example. The arrangement of the photodetective portions on the photodetector 160 is the same as shown in FIG. 33. The sum of the signal output from the photodetective portions 520–523 is obtained by an adder 161. To a low-frequency cutoff circuit 177, the output signal of the adder 161 is input. In the low-frequency cutoff circuit 177, the DC component is removed from the input signal, and then the signal is output. The output from the low-frequency cutoff circuit 177 is input into a delay circuit 184 where the signal is delayed by the time τ. The output signal of the delay circuit 164 is input into a delay circuit 185 where the signal is delayed by the time τ. Herein, the output signal of the delay circuit 164 is a main signal 164a. The output signal of the delay circuit 165 and the output signal of the low-frequency cutoff circuit 177 which is not delayed constitute an adjacent signal group 165a.

The output signal of the low-frequency cutoff circuit 177 is input into a variable gain amplifier 166 where the signal is multiplied by a coefficient k. The output signal of the delay circuit 165 is input into a variable gain amplifier 167 where the signal is multiplied by a coefficient k. The main signal 164a and the output signals of the variable gain amplifiers 166 and 167 are input into an operation circuit 168. The operation circuit 168 subtracts the adjacent signal group 165a which is multiplied by k from the main signal 164a. The signal output from the operation circuit 168 is obtained from the terminal 40. The signal from the operation circuit 168 is also input into a clock signal generator 169 which generates a clock signal 169a having a period τ which is synchronized with the information recorded on the information recording medium 4. The clock, signal 169a is input into a signal processor 170. The signal processor 170 controls the variable gain amplifiers 166 and 167 so that the gains of the variable gain amplifiers 166 and 167 are periodically varied in a synchronous manner with the clock signal 169a.

In this example, the low-frequency cutoff circuit is used for removing the low-frequency components. Thus, the DC component can be removed with very simple circuitry. In addition, without reducing the margin against the fluctuation of detection timing, it is possible to obtain the opening ratios of eyes which are as good as those in the twelfth or thirteenth example.

EXAMPLE 15

Figure 42:
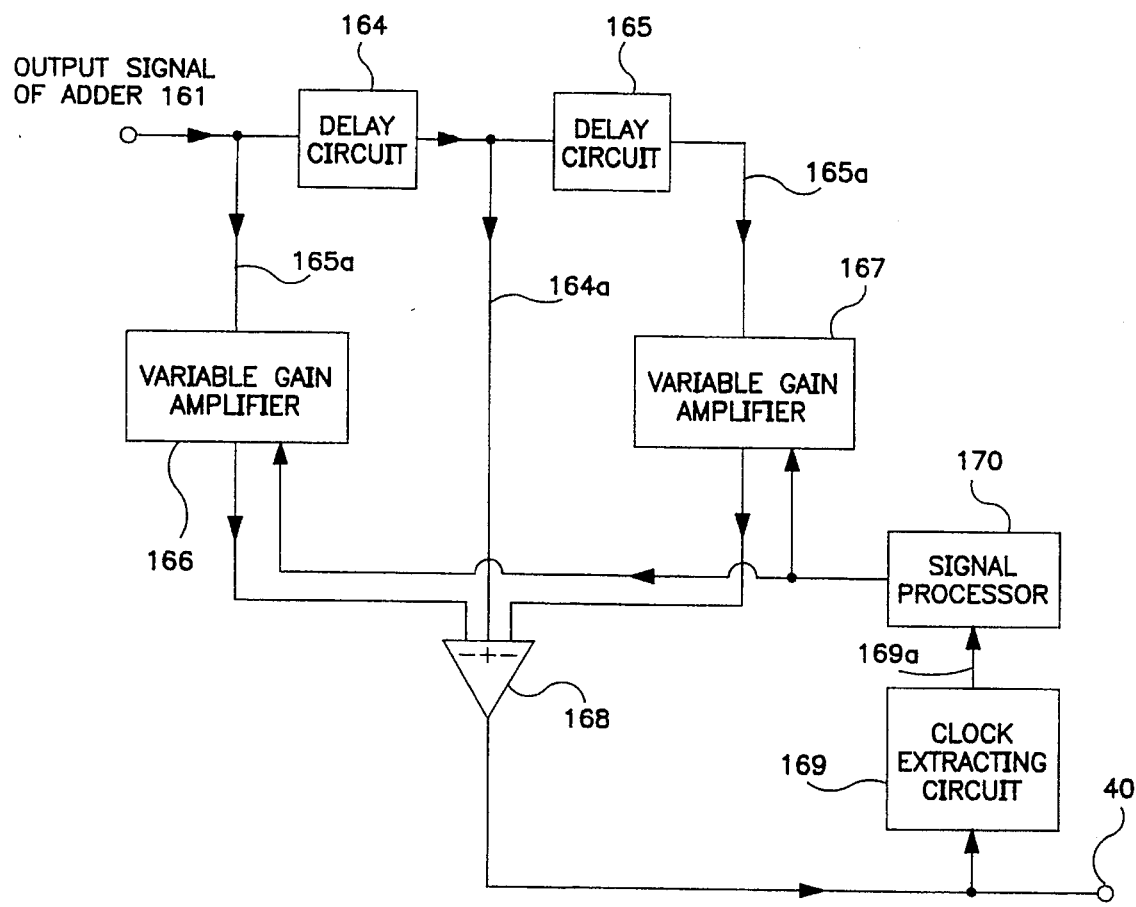
FIG. 42 shows the construction of a circuit system of an equalizer in a fifteenth example of the invention.

As the fifteenth example, an example in which the low-frequency component of signal is not removed is described. The construction of the circuit system in this example is shown in FIG. 42.

The optical system is the same as that in the twelfth example. The sum of signals output from the photodetective portions 520–523 of the photodetector 160 is input into a delay circuit 164 and a variable gain amplifier 166 without removing the low-frequency component of the signal. Thereafter, the signal is processed in the same manner as in the twelfth to fourteenth examples.

According to this example, it is possible to effectively remove the intersymbol interference with simple circuitry, in cases where the DC component of the signal obtained from the optical pickup head apparatus is smaller than the amplitude of modulation by a code. The specific opening ratios of eyes are substantially the same as those in the twelfth and fourteenth examples, so that great effects can be attained.

In this example in which the low-frequency component is not removed, the number of signal positions used for the equalization is not limited to three. The equalization in such a case is represented by mathematical expressions. Herein, N is an arbitrary natural number, and i is an integer equal to or smaller than N. It is assumed that the ith variable gain amplifier outputs a signal which is obtained by multiplying the input signal by $k_i$, the main signal mainly including the information recorded at a desired position in a desired track is represented by $S(0)$, and a signal obtained by removing low-frequency components from the signal including the information recorded at a position located apart from the desired position by x is represented by $S(x)$. In addition, $n_1$ to $n_N$ are integers excluding 0 which are not overlapped, and adjacent signal groups are represented by $S(n_1 \cdot T)$, $S(n_2 \cdot T)$, . . . , $S(n_N \cdot T)$. When a signal represented by the following expression is output, the equalization can be perfumed.

$$S(0) - k_1 \cdot S(n_1 \cdot T) - k_2 \cdot S(n_2 \cdot T) \ldots k_N \cdot S(n_N \cdot T)$$

In general, it is preferable that an amplitude and an average of the change of a coefficient k by which a signal including the information recorded remotely from the desired position among the adjacent signal groups is multiplied are smaller than those of the change of a coefficient k by which a signal including the information recorded close to the desired position is multiplied. Accordingly, the equalizing method and the equalizer of the invention are effective in a case where the intersymbol interference widely occurs, and in the case where the intersymbol interference asymmetrically occurs forwardly and backwardly.

EXAMPLE 16

As the sixteenth example, an example in which the burden of the circuit system is reduced by using a multi-beam optical pickup head apparatus is described.

Japanese Laid-Open Patent Publication No. 2-282937 discloses the concept of a method in which a plurality of spots of light beams from the multi-beam optical pickup head apparatus are formed on a track in an information recording medium, and the light beams reflected from the respective spots are simultaneously but separately detected and weighted, so as to perform the operation.

Figure 43:
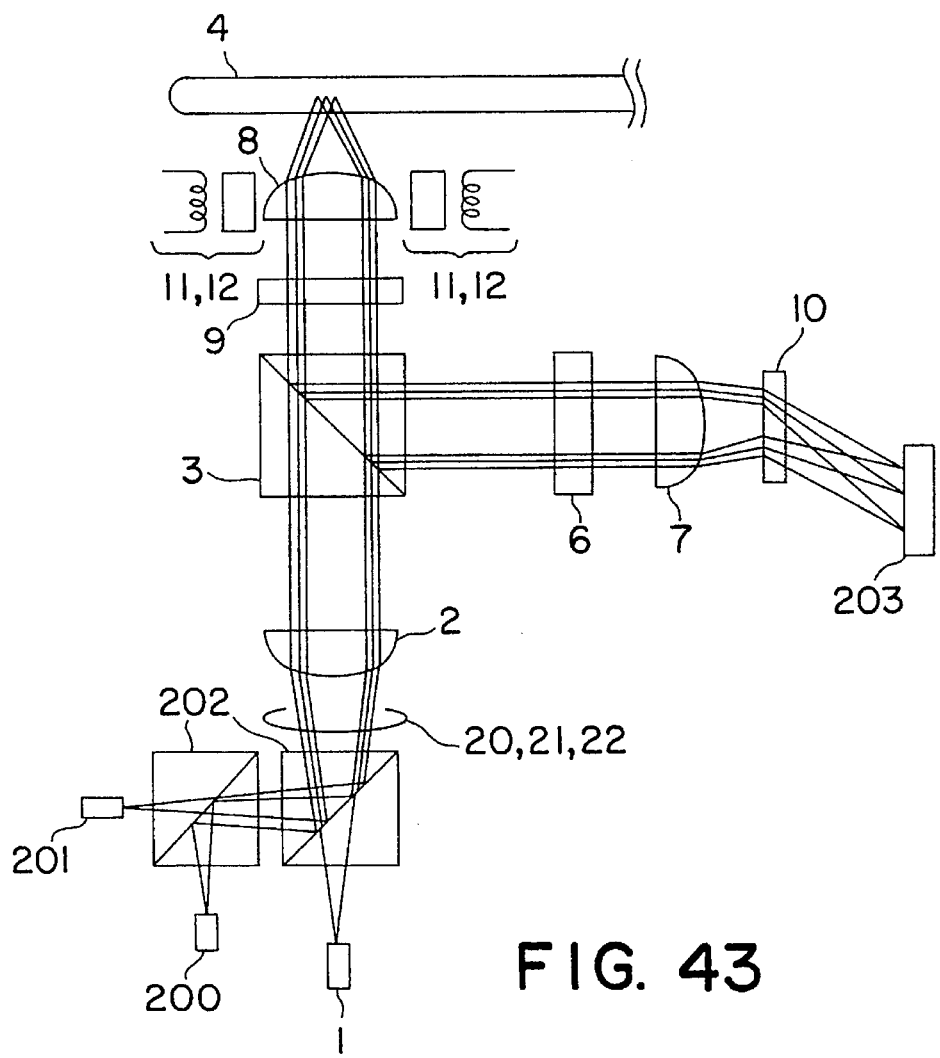
FIG. 43 shows the construction of an optical system of an optical information reproducing apparatus in a sixteenth example of the invention.

In the optical system shown in FIG. 43, optical elements which can be the same as those of the optical system shown in FIGS. 1 and 14 are indicated by the same reference numerals as those used in FIGS. 1 and 14. The optical system in this example is different from the optical systems shown in the twelfth to fifteenth examples in that an information recording medium is irradiated with three beams 20–22 emitted from laser diodes 1, 200, and 201 each of which emits a light beam having a wavelength different from those of the other two light sources.

The optical system in this example is designed in the following manner. The light beams including linearly polarized light emitted from the laser diodes 1, 200, and 201 each of which emits a light beam having a wavelength different from those of the other two light sources are transmitted through two beam splitters 202 so that the beams are arranged to be adjacent to each other. The light beams 20–22 are transmitted through a collimate lens 2, so as to be parallel beams. After the beams are transmitted through a polarizing beam splitter 3, the beams are transmitted through a quarter-wave plate 9, so as to be beams of circularly polarized light. Then, the beams are transmitted through an object lens 8 and converged on an information recording medium 4. On the information recording medium 4, information is recorded as marks or spaces, so as to form tracks. The light beams 20–22 converged by the lens 8 are positioned on one and the same track. The light beams 20–22 which are reflected and diffracted by the information recording medium 4 are transmitted through the lens 8, and then transmitted through the quarter-wave plate 9, so as to be beams of linearly polarized light having a polarization direction different from that of the light beams emitted from the light sources 1, 200 and 201, by 90 degrees. Then, the light beams enter the polarizing beam splitter 3. The light beams 20–22 entering the polarizing beam splitter 3 are reflected toward a cylindrical lens 6. The light beams 20–22 which are transmitted through the cylindrical lens 6 become light beams including astigmatic. Then, the beams are converged by a lens 7, and transmitted through a diffraction grating 10. Thereafter, the beams are received by a photodetector 203. The three beams 20–22 have different wavelength from each other, so that the diffraction angles by the diffraction grating 10 are also different from each other. Thus, the three light beams are largely separated from each other, so that the three beams do not overlap each other, and they can be detached by different photodetective portions of the photodetector 203.

Figure 44:
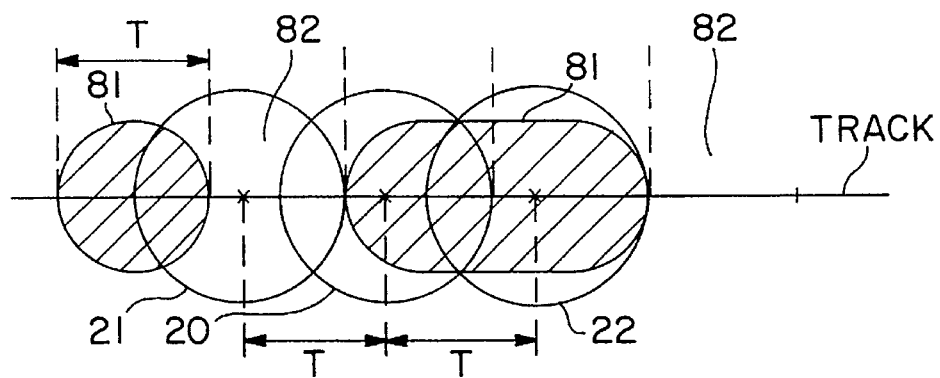
FIG. 44 shows the relationship between positions of light beam spots on an information recording medium in the sixteenth example of the invention.

The relationship between a track on the information recording medium 4 and the light beams 20–22 is shown in FIG. 44. In FIG. 44, the information recording medium 4 is shown in an enlarged manner. In FIG. 44, marks 81 and spaces 82 are formed on the track, and the light beams 20–22 are converged on the track. The intervals between the converged light beams on the information recording medium are set to be substantially the integer multiple of the fundamental period T of the recorded information. In FIG. 44, the beam interval is set to be substantially equal to T.

Figure 45:
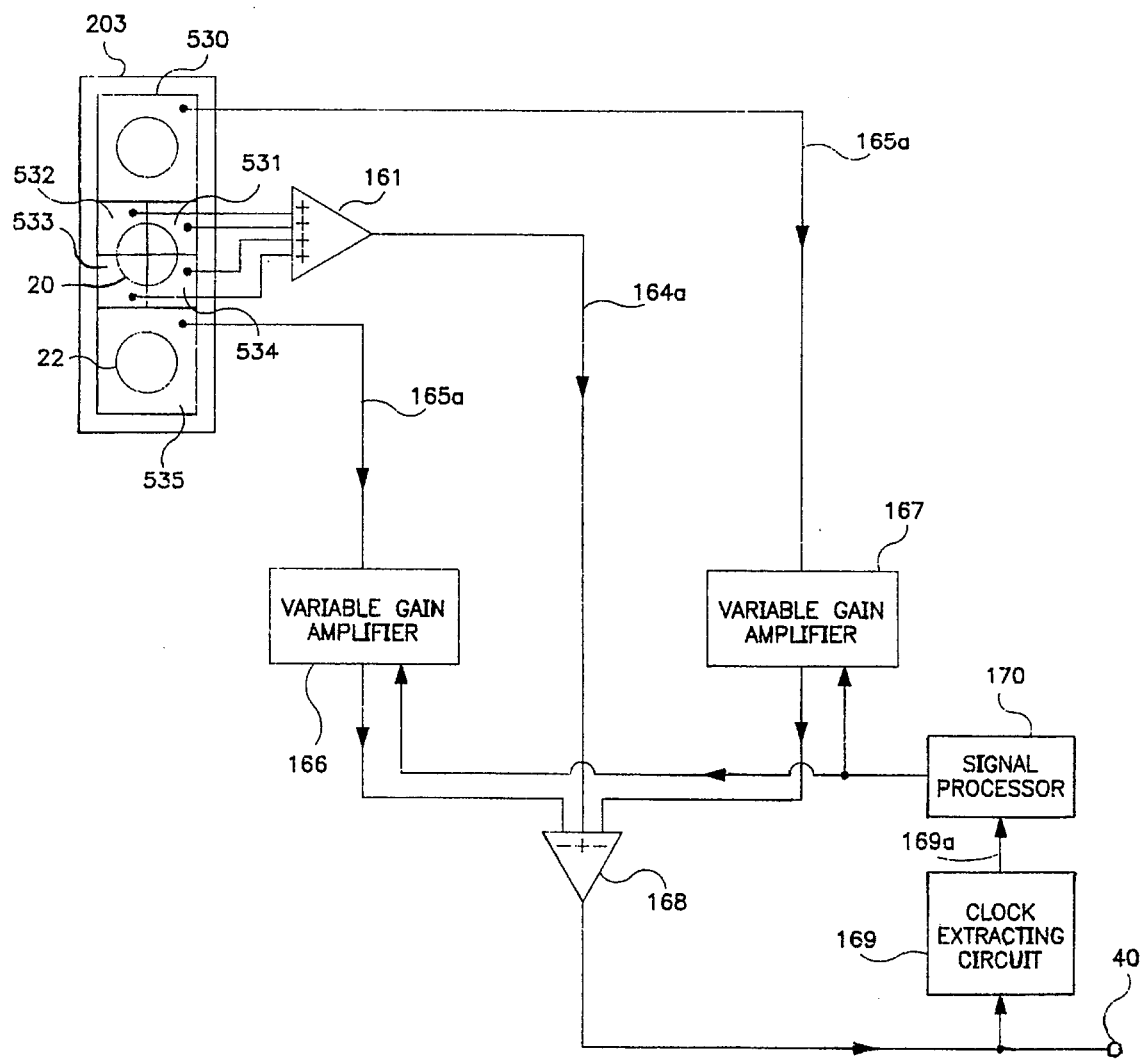
FIG. 45 shows the construction of a circuit system of an equalizer in the sixteenth example of the invention.

FIG. 45 shows the relationship between photodetector 203 and the light beams 20–22 received by the photodetector 203 in the optical system shown in FIG. 43. FIG. 45 also shows the construction of a circuit system of an equalizer. The photodetector 203 is constituted of photodetective potions 530–535. The light beam 20 is received by the photodetective portions 531–534. The light beam 21 is received by the photodetective portion 530, and the light beam 22 is received by the photodetective portion 535. By performing desired operations to the signal output from the photodetective portions 531–534, the focusing error signal and the tracking error signal are obtained. In this example, the focusing error signal is obtained by an astigmatic method, and the tracking error signal is obtained by a push-pull method.

The signals output from the photodetective portions 531–534 are added to each other by an adder 161. The signal from the photodetective portion 530 is input into a variable gain amplifier 167 where the signal is multiplied by a certain coefficient k. The signal from the photodetective portion 535 is input into a variable gain amplifier 166 where the signal is multiplied by a coefficient k. The output signal of the adder 161 is the main signal 164a. The signals from the photodetective portions 530 and 535 constitute an adjacent signal group 165a. The main signal 164a end the output signals from the variable gain amplifiers 166 and 167 are input into an operation circuit 168. The operation circuit 168 subtracts the adjacent signal group 165a which is multiplied by k from the main signal 164a. The signal output from the operation circuit 168 is obtained from the terminal 40. The signal from the operation circuit 168 is input into a clock signal generator 169. The clock signal generator 169 generates a clock signal 169a having a period r which is synchronized with the information recorded on the information recording medium 4. The clock signal 169a is input into a signal processor 170. The signal processor 170 controls the variable gain amplifiers 166 and 167 so that the gains of the variable gain amplifiers 166 and 167 are periodically varied in a synchronous manner with the clock signal 169a.

In this example, a delay circuit is not required, so that the burden of the circuit system can be greatly reduced. In addition, the intersymbol interference can be effectively eliminated.

In this example, three laser diodes each emitting a light beam having a wavelength different from that of the other two light sources are used. Even in the case where the information recording medium is irradiated with two or more light beams, as far as the light beams can be sufficiently separately detected, a method which utilizes an array-type laser diode emitting light beams having respectively different wavelengths or other methods, or any optical pickup head apparatus other than those shown in this example can be used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus capable of optically reproducing information from a recording medium, the apparatus comprising:

an optical pickup head for outputting a first signal mainly including information recorded at a desired position and a second signal including information recorded at positions adjacent to the desired position, when informations are to be reproduced by a light beam from the recording medium having tracks in which the informations are recorded;

an operation circuit for receiving the first and second signals and for performing an adding or subtracting operation;

a variable gain amplifier for controlling the level or polarity of the first or second signal which is input into the operation circuit; and a signal processing means for receiving the first signal or a signal output from the operation circuit and for outputting a signal for adjusting a gain of the variable gain amplifier.

2. An apparatus according to claim 1, wherein the information recorded at the positions adjacent to the desired position is information recorded in adjacent tracks.

3. An apparatus according to claim 1, wherein signal processing means adjusts a gain of the variable gain amplifier to vary as a linear function of first signal.

4. An apparatus according to claim 1, wherein the signal processing means adjusts a gain of the variable gain amplifier to vary as a step function depending on whether the first signal is larger or smaller than a threshold value.

5. An apparatus capable of optically reproducing information from a recording medium, the apparatus comprising:

an optical pickup head for outputting a first signal mainly including information recorded at a desired position and a second signal including information recorded at positions adjacent to the desired position, when informations are to be reproduced by a light beam from the recording medium having tracks in which the informations are recorded by digitally and selectively forming optically readable marks having discrete lengths substantially corresponding to integer multiples of T, where T is a fundamental period of the marks;

an operation circuit for receiving the first and second signals and for performing an adding or subtracting operation;

a variable gain amplifier for controlling the level or polarity of the first or second signal which is input into the operation circuit;

a clock signal generator for generating a clock signal indicating a timing which is synchronized with edges of digital information recorded as marks or spaces on the recording medium;

a sample and hold circuit for repeatedly sampling and holding a signal output from the operation circuit at the timing indicated by the clock signal; and a signal processing means for receiving a signal output from the sample and hold circuit and for adjusting a gain of the variable gain amplifier based on two or more signals at a signal detection point which is a position indicated by the cluck signal.

6. An apparatus according to claim 5, wherein the clock signal generator generates a clock signal indicating a timing at a position shifted by ±Ta from a position located by a length corresponding to an integer multiple of T apart from a position shifted by T/2 from an edge of digital information recorded as a mark or space on the recording medium (0≦Ta>T/2), and wherein the signal processing means outputs a control signal which adjusts the gain of the variable gain amplifier to provide a largest opening amount of an eye pattern at the point indicated by the clock signal.

7. An apparatus according to claim 6, wherein the signal processing means has one reference value and receives the signal output from the sample and hold circuit, and in the signal processing means, the position indicated by the clock signal is defined as the signal detection point, a signal, among the signals detected at the signal detection points, which is larger than the reference value and has the smallest difference from the reference value is defined as an upper signal, and a signal, among the signals output from the sample and hold circuit, which is smaller than the reference value and has the smallest difference from the reference value is defined as a lower signal, whereby the signal processing means adjusts the gain of the variable gain amplifier so that a difference between the upper signal and the lower signal is maximized.

8. An apparatus according to claim 6, wherein the clock signal generator generates a clock signal indicating a timing at a position shifted by ±Ta from a position located by a length corresponding to an integer multiple of T apart from a position shifted by T/2 from an edge of digital information recorded as a mark or space on the recording medium (0≦Ta<T/2), and wherein Ta is nearly equal to dj, where dj is a distance on the recording medium which is converted from a temporal fluctuation tj of detection timing which optically and electrically occurs when a code detection of digital information recorded on the recording medium is performed.

9. An apparatus according to claim 6, wherein the signal processing means has two reference values and receives the signal output from the sample and hold circuit, and in the signal processing means, the position indicated by the clock signal is defined as the signal detection point, a signal, among the signals detected at the signal detection points, which is larger than each reference value and has the smallest difference from the reference value is defined as an upper signal, and a signal, among the signals output from the sample and hold circuit, which is smaller than each reference value and has the smallest difference from the reference value is defined as a lower signal, whereby the signal processing means calculates a difference between the upper signal and the lower signal for each of the two reference values, and adjusts the gain of the variable gain amplifier so that a smaller one of the calculated differences is maximized.

10. An apparatus according to claim 9, wherein the clock signal generator generates a clock signal indicating a timing at a position shifted by ±Ta from a position located by a length corresponding to an integer multiple of T apart from a position shafted by T/2 from an edge of digital information recorded as a mark or space on the recording medium (0≦Ta<T/2), and wherein Ta is nearly equal to dj, where dj is a distance on the recording medium which is converted from a temporal fluctuation tj of detection timing which optically and electrically occurs when a code detection of digital information recorded on the recording medium is performed.

11. An apparatus according to claim 6, wherein the signal processing means has two reference values and receives the signal output from the sample and hold circuit, and in the signal processing means, the position indicated by the clock signal is defined as the signal detection point, a signal, among the signals detached at the signal detection points, which is larger than each reference value and has the smallest difference from the reference values is defined as an upper signal, and a signal, among the signals output from the sample and hold circuit, which is smaller than each reference value and has the smallest difference from the reference value is defined as a lower signal, whereby the signal processing means calculates a difference between the upper, signal and the lower signal for each of the two reference values, and adjusts the gain of the variable gain amplifier so that an average of the calculated differences is maximized.

12. An apparatus according to claim 5, wherein the clock signal generator generates a clock signal indicating a timing at a position located by a length corresponding to an integer multiple of T apart from an edge of digital information recorded as a mark or space on the recording medium, and wherein the signal processing means has two threshold values, and calculates an index by using two or more output signals output from the sample and hold circuit between the two threshold values, whereby the gain of the variable gain amplifier is adjusted based on the index.

13. An apparatus according to claim 12, wherein the signal processing means uses a standard deviation of the output signals output from the sample and hold circuit as the index, and outputs a control signal for adjusting the gain of the variable gain amplifier so that the standard deviation is reduced.

14. An apparatus according to claim 12, wherein the signal processing means uses a difference between a maximum value and a minimum value of the output signals output from the sample and hold circuit as the index, and outputs a control signal for adjusting the gain of the variable gain amplifier so that the difference between the maximum value and the minimum value is reduced.

15. An apparatus according to claim 12, wherein the signal processing means uses an average of absolute values of the output signals output from the sample and hold circuit as the index, and outputs a control signal for adjusting the gain of the variable gain amplifier so that the average of the dispersion absolute values is reduced.

16. An apparatus according to claim 12, wherein signal processing means adjusts the gain so that, if the improvement amount of the index is equal to or lower than a predetermined value as the result of the change of the gain, the gain is not further varied.

17. An apparatus according to claim 5, wherein the clock signal generator generates a clock signal indicating a timing at a position corresponding to an edge of digital information recorded as a mark or space on the recording medium, the sample and hold circuit repeatedly samples and holds the signal output from the operation circuit at the timing indicated by the clock signal, and the signal processing means calculates an index by using two or more output signals output from the sample and hold circuit and outputs a control signal for adjusting the gain of the variable gain amplifier based on the index.

18. An apparatus according to claim 17, wherein the signal processing means uses a standard deviation of the output signals output from the sample and hold circuit as the index, and outputs a control signal for adjusting the gain of the variable gain amplifier so that the standard deviation is reduced.

19. An apparatus according to claim 17, wherein the signal processing means uses a difference between a maximum value and a minimum value of the output signals output from the sample and hold circuit as the index, and outputs a control signal for adjusting the gain of the variable gain amplifier so that the difference between the maximum value and the minimum value is reduced.

20. An apparatus according to claim 17, wherein the signal processing means uses an average of absolute values of the output signals output from the sample and hold circuit as the index, and outputs a control signal for adjusting the gain of the variable gain amplifier so that the average of the dispersion absolute values is reduced.

21. An apparatus according to claim 17, wherein the signal processing means adjusts the gain so that, if the improvement amount of the index is equal to or lower than a predetermined value as the result of the change of the gain, the gain is not further varied.

22. An apparatus according to claim 5, wherein the clock signal generator generates a clock signal indicating a timing at a position located by a length corresponding to an integer multiple of T apart from an edge of digital information recorded as a mark or space on the recording medium, and the signal processing means calculates an index by using two or more output signals which are output from the sample and hold circuit and held at the edges of the digital information recorded as marks or spaces on the recording medium, and outputs a control signal for adjusting the gain of the variable gain amplifier based on the index.

23. An apparatus according to claim 22, wherein the signal processing means uses a standard deviation of output signals which are output from the sample and hold circuit and held at the edges of the digital information recorded as marks or spaces on the recording medium as an index, and outputs a control signal for adjusting the gain of the variable gain amplifier so that the standard deviation is reduced.

24. An apparatus according to claim 22, wherein the signal processing means uses a difference between a maximum value and a minimum value of output signals which are output from the sample and hold circuit and held at the edges of the digital information recorded as marks or spaces on the recording medium as an index, and outputs a control signal for adjusting the gain of the variable gain amplifier so that the difference between the maximum value and the minimum value is reduced.

25. An apparatus device according to claim 22, wherein the signal processing means uses an average of absolute values of output signals which are output from the sample and hold circuit and held at the edges of the digital information recorded as marks or spaces on recording medium as an index, and outputs a control signal for adjusting the gain of the variable gain amplifier so that the average of the dispersion absolute values is reduced.

26. An apparatus according to claim 22, wherein the signal processing means adjusts the gain so that, if the improvement amount of the index is equal to or lower than a predetermined value as the result of the change of the gain, the gain is not further varied.

27. An apparatus capable of optically reading information recorded at a desired position on a recording medium, the apparatus comprising:

optical pickup means for converging light on the recording medium and for generating a first signal and a second signal based on an intensity of the light reflected from the recording medium, the first signal mainly including a component representing information recorded at the desired position, the second signal including information recorded at positions adjacent to the desired position; and signal processing means for removing information other than the information recorded at the desired position from the first signal by using the second signal, wherein the signal processing means includes means for subtracting a product of the second signal and a predetermined coefficient from the first signal and means for adjusting the predetermined coefficient depending on the ratio of the information recorded at the desired position included in the first signal to the other information included in the first signal.

28. An apparatus according to claim 27, wherein the first signal mainly includes information recorded in a desired track on the recording medium, and the second signal mainly includes information recorded in tracks adjacent to the desired track.

29. An apparatus according to claim 27, wherein the desired position is a position on a desired track on the recording medium, and the positions adjacent to the desired position are positions adjacent to the desired position on the desired track.

* * * * *

UNITED STATES PATENT AND TRADEMARK OFFICE
CERTIFICATE OF CORRECTION

PATENT NO. : 5,587,985
DATED : December 24, 1996
INVENTOR(S) : Sano et al

It is certified that error appears in the above-indentified patent and that said Letters Patent is hereby corrected as shown below:

Column 35, line 25, delete "are" and insert therefor --is--.

Column 35, line 47, delete "cluck" and insert therefor --clock--.

Column 35, line 54, delete ($0 \leq Ta > T/2$) and insert therefor --($0 \leq Ta < T/2$)--.

Column 36, line 34, delete "shafted" and insert therefor --shifted--.

Column 36, line 53, after "upper" delete the comma ",".

Signed and Sealed this

Twenty-second Day of July, 1997

*Attest:*

*Attesting Officer*

BRUCE LEHMAN

*Commissioner of Patents and Trademarks*